US012576980B2

(12) United States Patent
Klinker et al.

(10) Patent No.: US 12,576,980 B2
(45) Date of Patent: Mar. 17, 2026

(54) HYDROFOIL EQUIPPED SEAGLIDER TAKEOFF

(71) Applicant: Regent Craft, Inc., North Kingstown, RI (US)

(72) Inventors: Michael Klinker, Hollis, MA (US); Daniel Cottrell, Centreville, VA (US); William Bryan Baker, Cohasset, MA (US); Andrew Gregg, Roslindale, MA (US); Andrew Levin, Cambridge, MA (US)

(73) Assignee: Regent Craft, Inc., North Kingstown, RI (US)

( * ) Notice: Subject to any disclaimer, the term of this patent is extended or adjusted under 35 U.S.C. 154(b) by 0 days.

(21) Appl. No.: 18/913,529

(22) Filed: Oct. 11, 2024

(65) Prior Publication Data

US 2025/0033783 A1     Jan. 30, 2025

Related U.S. Application Data

(63) Continuation of application No. 17/885,463, filed on Aug. 10, 2022, now Pat. No. 12,116,139.

(51) Int. Cl.
B64C 3/16          (2006.01)
B63B 1/24          (2020.01)
(Continued)

(52) U.S. Cl.
CPC .............. B64D 27/357 (2024.01); B64C 3/16 (2013.01); B64C 13/16 (2013.01); B63B 1/24 (2013.01); B63B 79/00 (2020.01); B64C 35/007 (2013.01)

(58) Field of Classification Search
CPC ......... B64D 27/357; B64C 3/16; B64C 13/16; B64C 35/007; B64C 35/006; B63B 79/00;
(Continued)

(56) References Cited

U.S. PATENT DOCUMENTS 1,840,716 A     1/1932  Hitt
1,881,141 A    10/1932  Igor
(Continued)

FOREIGN PATENT DOCUMENTS

GB       1557539      12/1979
GB       2347909       9/2000
RU       2661277       7/2018

OTHER PUBLICATIONS

International Search Report and Written Opinion, PCT/US2023/029996 Nov. 20, 2023.
(Continued)

*Primary Examiner* — Rodney A Bonnette
(74) *Attorney, Agent, or Firm* — Akerman LLP

(57)          ABSTRACT

A craft comprises a hull, a wing, a hydrofoil, and a control system. The wing is configured to generate upwards aero lift as air flows past the wing to facilitate wing-borne flight of the craft. The hydrofoil is configured to generate upwards hydrofoil lift during a first mode of operation as water flows past the hydrofoil to facilitate hydrofoil-borne movement of the craft through the water. While the craft is hydrofoil-borne, the control system is configured to determine the upwards aero lift generated by the wing. The control system is further configured to control the hydrofoil to generate downwards hydrofoil lift to counteract the upwards aero lift generated by the wing that maintains the hydrofoil at least partially submerged in the water while the determined upwards aero lift is below a threshold lift.

21 Claims, 21 Drawing Sheets

(51) Int. Cl.
  *B63B 79/00* (2020.01)
  *B64C 13/16* (2006.01)
  *B64C 35/00* (2006.01)
  *B64D 27/357* (2024.01)

(58) Field of Classification Search
  CPC .. B63B 1/24; B63B 1/26; B63B 1/285; B63B 1/286

See application file for complete search history.

(56) References Cited

U.S. PATENT DOCUMENTS

| | | | |
|---|---|---|---|
| D100,969 | S | 8/1936 | Molyneux |
| 2,214,945 | A | 9/1940 | Weihmiller |
| 2,400,173 | A | 5/1946 | Slate |
| 2,942,810 | A | 6/1960 | Hanning-Lee et al. |
| 3,139,059 | A | 6/1964 | Hanford |
| 3,213,818 | A | 10/1965 | Barkley |
| 3,498,247 | A | 3/1970 | Handler |
| 4,080,922 | A | 3/1978 | Brubaker |
| 4,484,721 | A | 11/1984 | Gue |
| 4,926,773 | A | 5/1990 | Manor |
| 5,018,686 | A | 5/1991 | Zimmer |
| 5,311,832 | A * | 5/1994 | Payne ..................... B63B 1/285 114/274 |
| 5,469,801 | A | 11/1995 | Payne |
| 6,547,181 | B1 | 4/2003 | Hoisington |
| 6,732,672 | B2 | 5/2004 | Shin |
| 7,275,493 | B1 | 10/2007 | Brass |
| 7,322,872 | B2 | 1/2008 | Butler |
| 8,651,431 | B1 | 2/2014 | White et al. |
| 9,156,550 | B2 | 10/2015 | Nam |
| 9,688,356 | B2 | 6/2017 | Schulz |
| D843,919 | S | 3/2019 | Tzarnotzky et al. |
| D872,681 | S | 1/2020 | Tzarnotzky et al. |
| D873,200 | S | 1/2020 | Langford et al. |
| D988,226 | S | 6/2023 | Bevirt et al. |
| D988,926 | S | 6/2023 | Prager et al. |
| D996,339 | S | 8/2023 | Moris et al. |
| D1,005,211 | S | 11/2023 | Cummings |
| D1,007,366 | S | 12/2023 | Moris et al. |
| D1,009,697 | S | 1/2024 | Hesselbarth |
| 2007/0245943 | A1 | 10/2007 | Rice |
| 2014/0312177 | A1 | 10/2014 | Gaonjur |
| 2016/0280332 | A1 | 9/2016 | Schulz |
| 2019/0291863 | A1 | 9/2019 | Lyasoff et al. |
| 2022/0250743 | A1 | 8/2022 | Thalheimer et al. |
| 2022/0324560 | A1 | 10/2022 | Klinker et al. |
| 2022/0382300 | A1 | 12/2022 | Larsen et al. |
| 2023/0062717 | A1 | 3/2023 | Thalheimer et al. |
| 2024/0158091 | A1 | 5/2024 | Klinker et al. |

OTHER PUBLICATIONS

International Search Report and Written Opinion, PCT/US2022/015979, May 30, 2022.

International Search Report and Written Opinion, PCT/US2022/040017 Nov. 17, 2022.

Van Beek et al., Progress Report on Aerodynamic Analysis of a Surface Piercing Hydrofoil-Controlled Wing-in-Ground Effect Seabus Configuration, Presentation at RTO Applied Technology Panel Symposium on Fluid Dynamics Problems of Vehicles Operating near or in the Air-Sea Interface, Amsterdam, Oct. 5-10, 1998.

Alcock, Charles, How Electric Propulsion and Blown-wing Technology Have Liberated Aircraft Design, Futureflight, www.ainonline.com/nows.article/2022-01-13/how-electric-propulsion-and-blown-wing-technology-have-liberatedaircraft, Jan. 13, 2022.

Non-Final Office Action, U.S. Appl. No. 17/885,461, filed Apr. 17, 2024.

Non-Final Office Action, U.S. Pat. No. 17,885,523, Jul. 17, 2024.

Non-Final Office Action, U.S. Appl. No. 29/874,060, filed May 31, 2024.

Notice of Allowance, U.S. Appl. No. 17/570,000, filed Apr. 1, 2022.

Supplemental Notice of Allowance, U.S. Appl. No. 17/570,090, filed Jun. 10, 2022.

International Preliminary Report on Patentability, PCT/2023/029996, Feb. 20, 2024.

* cited by examiner

HULL-BORNE OPERATION

HYDROFOIL-BORNE
MANEUVERING OPERATION

HYDROFOIL-BORNE TAKEOFF
OPERATION

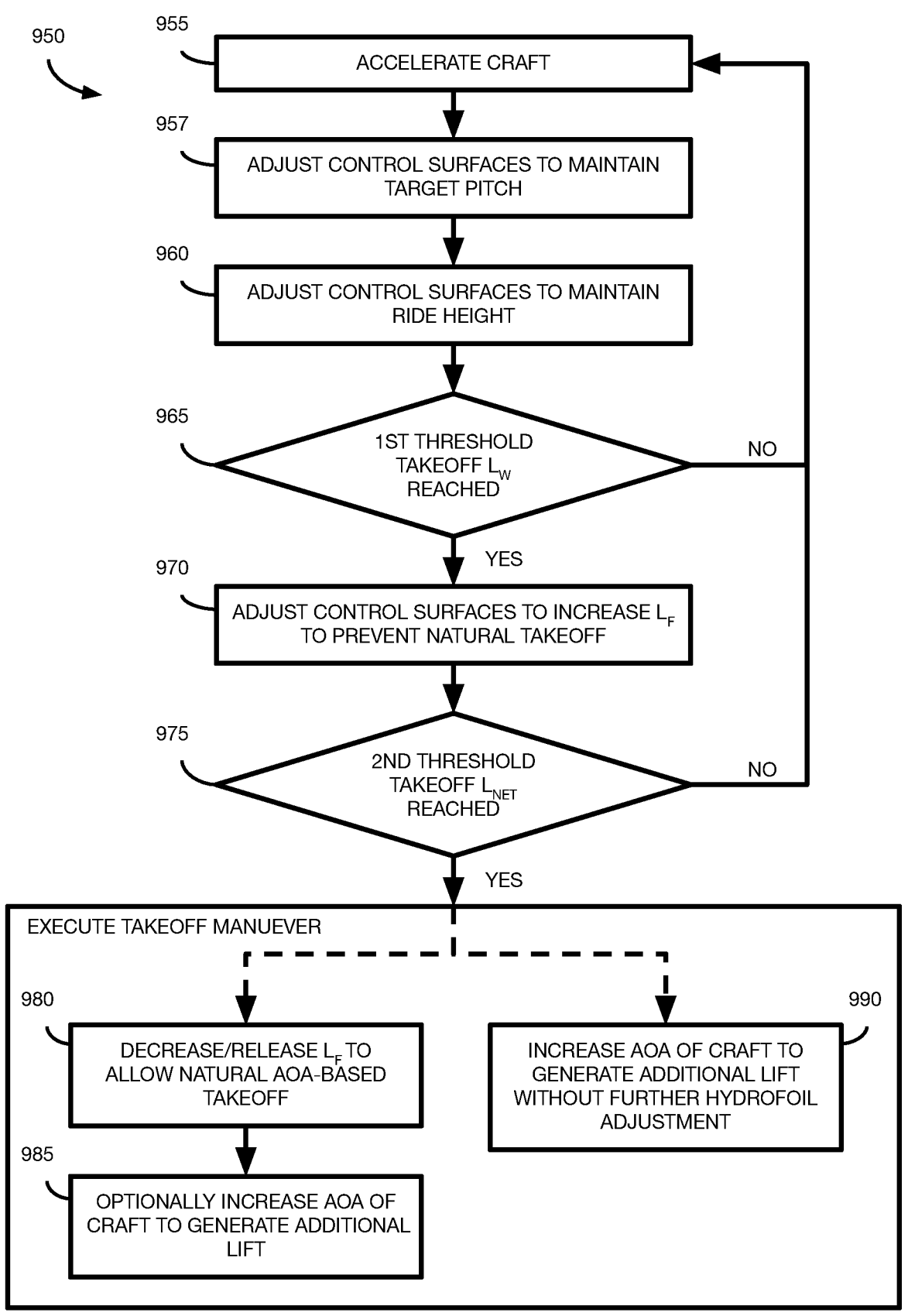

950

955 — ACCELERATE CRAFT

957 — ADJUST CONTROL SURFACES TO MAINTAIN TARGET PITCH

960 — ADJUST CONTROL SURFACES TO MAINTAIN RIDE HEIGHT

965 — 1ST THRESHOLD TAKEOFF $L_W$ REACHED — NO

YES

970 — ADJUST CONTROL SURFACES TO INCREASE $L_F$ TO PREVENT NATURAL TAKEOFF

975 — 2ND THRESHOLD TAKEOFF $L_{NET}$ REACHED — NO

YES

EXECUTE TAKEOFF MANUEVER

980 — DECREASE/RELEASE $L_F$ TO ALLOW NATURAL AOA-BASED TAKEOFF

985 — OPTIONALLY INCREASE AOA OF CRAFT TO GENERATE ADDITIONAL LIFT

990 — INCREASE AOA OF CRAFT TO GENERATE ADDITIONAL LIFT WITHOUT FURTHER HYDROFOIL ADJUSTMENT

FIG. 9B

WING-BORNE
OPERATION

| Procedure | Craft Pitch | | Hydrofoil Control Surfaces | | Hydrofoil Incidence Angle Adjustment | | | |
|---|---|---|---|---|---|---|---|---|
| | Constant Pitch | Increased Pitch | Control Ride Height | Control Extended Hold | Control Ride Height | Control Extended Hold | Active | Passive |
| | | | | | | | Control of Release | |
| A) Fixed Foil, Constant Pitch, No Hold | X | | X | | | | | |
| B) Fixed Foil, Constant Pitch, With Hold | X | | X | X | | | | |
| C) Fixed Foil, Increasing Pitch, With Hold | | X | X | X | | | | |
| D) Variable Foil, Passive Release, Increasing Pitch, With Hold | | X | X | X | X | X | | X |
| E) Variable Foil, Active Release, Increasing Pitch, With Hold | | X | X | X | X | X | X | |

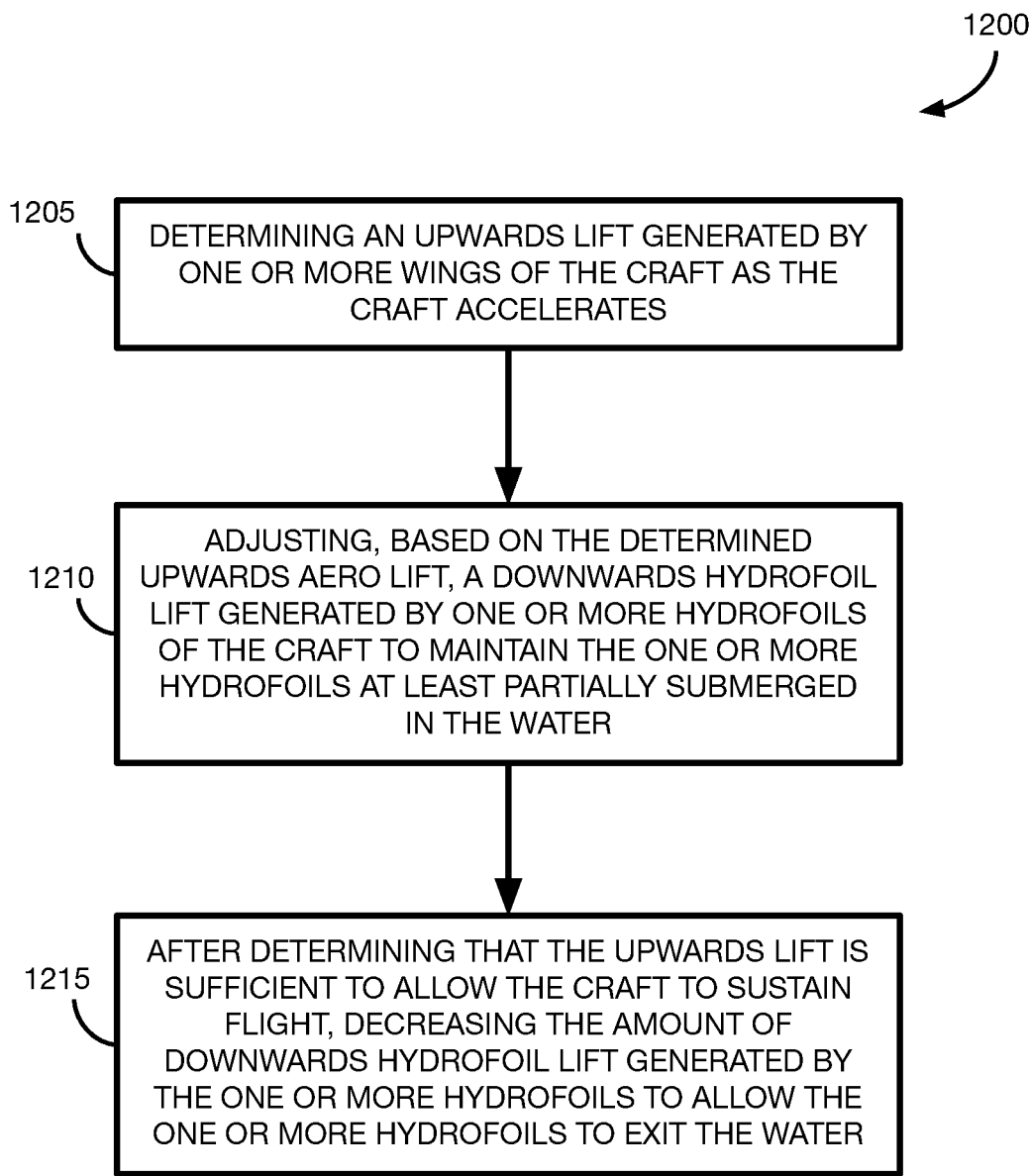

1205 — DETERMINING AN UPWARDS LIFT GENERATED BY ONE OR MORE WINGS OF THE CRAFT AS THE CRAFT ACCELERATES

1210 — ADJUSTING, BASED ON THE DETERMINED UPWARDS AERO LIFT, A DOWNWARDS HYDROFOIL LIFT GENERATED BY ONE OR MORE HYDROFOILS OF THE CRAFT TO MAINTAIN THE ONE OR MORE HYDROFOILS AT LEAST PARTIALLY SUBMERGED IN THE WATER

1215 — AFTER DETERMINING THAT THE UPWARDS LIFT IS SUFFICIENT TO ALLOW THE CRAFT TO SUSTAIN FLIGHT, DECREASING THE AMOUNT OF DOWNWARDS HYDROFOIL LIFT GENERATED BY THE ONE OR MORE HYDROFOILS TO ALLOW THE ONE OR MORE HYDROFOILS TO EXIT THE WATER

FIG. 12

HYDROFOIL EQUIPPED SEAGLIDER TAKEOFF

CROSS-REFERENCE TO RELATED APPLICATIONS

The present application is a continuation of U.S. application Ser. No. 17/885,463 titled "Hydrofoil Equipped Seaglider Takeoff," filed on Aug. 10, 2022, and currently pending. The entire contents of U.S. application Ser. No. 17/885,463 are incorporated herein by reference.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

FIG. 9B illustrates additional example operations that facilitate transitioning a craft to a wing-borne mode, in accordance with example embodiments.

FIG. 11 is a table that summarizes aspects of some procedures that facilitate foil-borne takeoff operations, in accordance with example embodiments.

FIG. 12 illustrates example operations performed by a craft, in accordance with example embodiments.

DETAILED DESCRIPTION

Figure 1A:
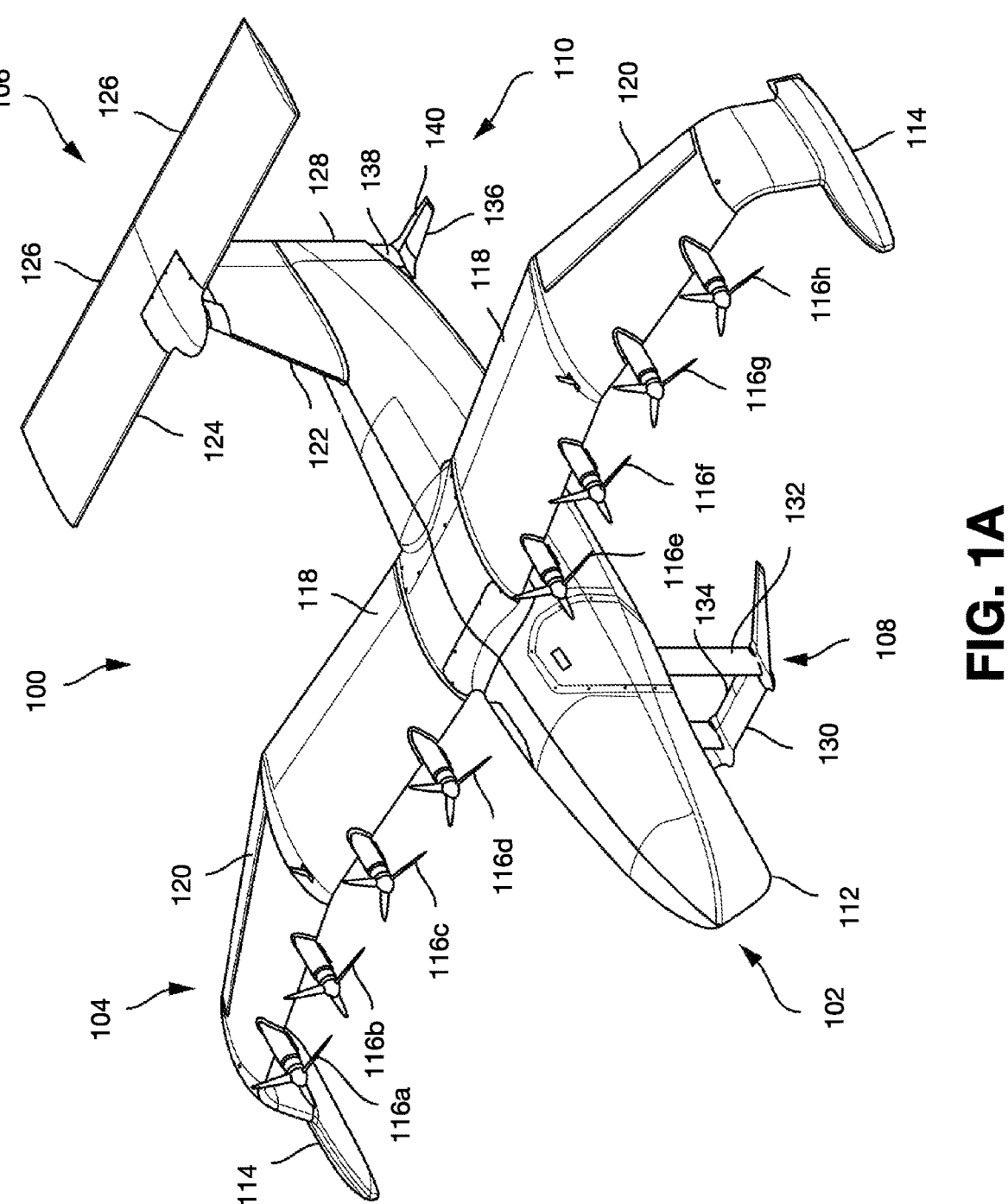
FIG. 1A-1G illustrate various views of a craft, in accordance with example embodiments.
Figure 1B:
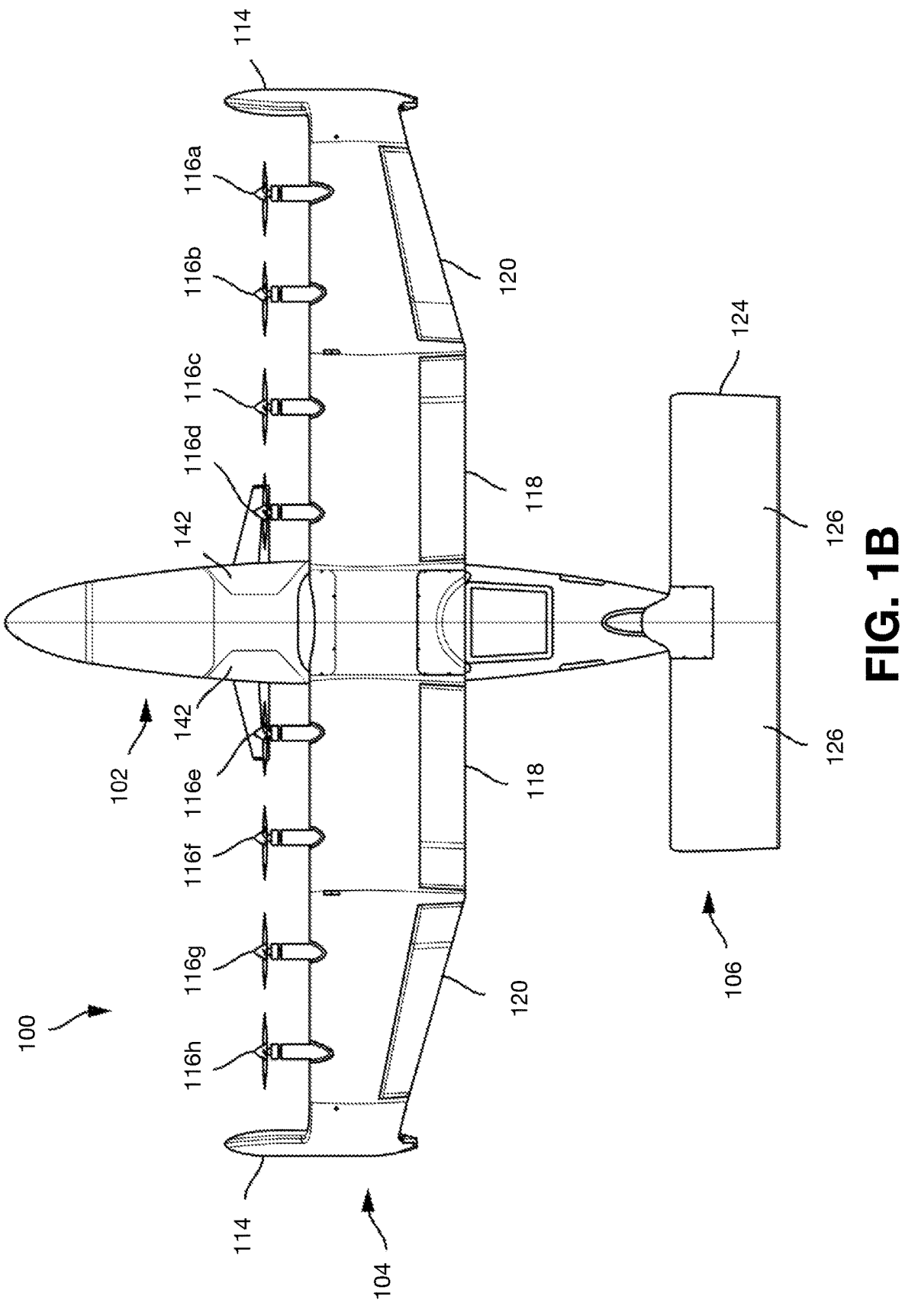
Figure 1C:
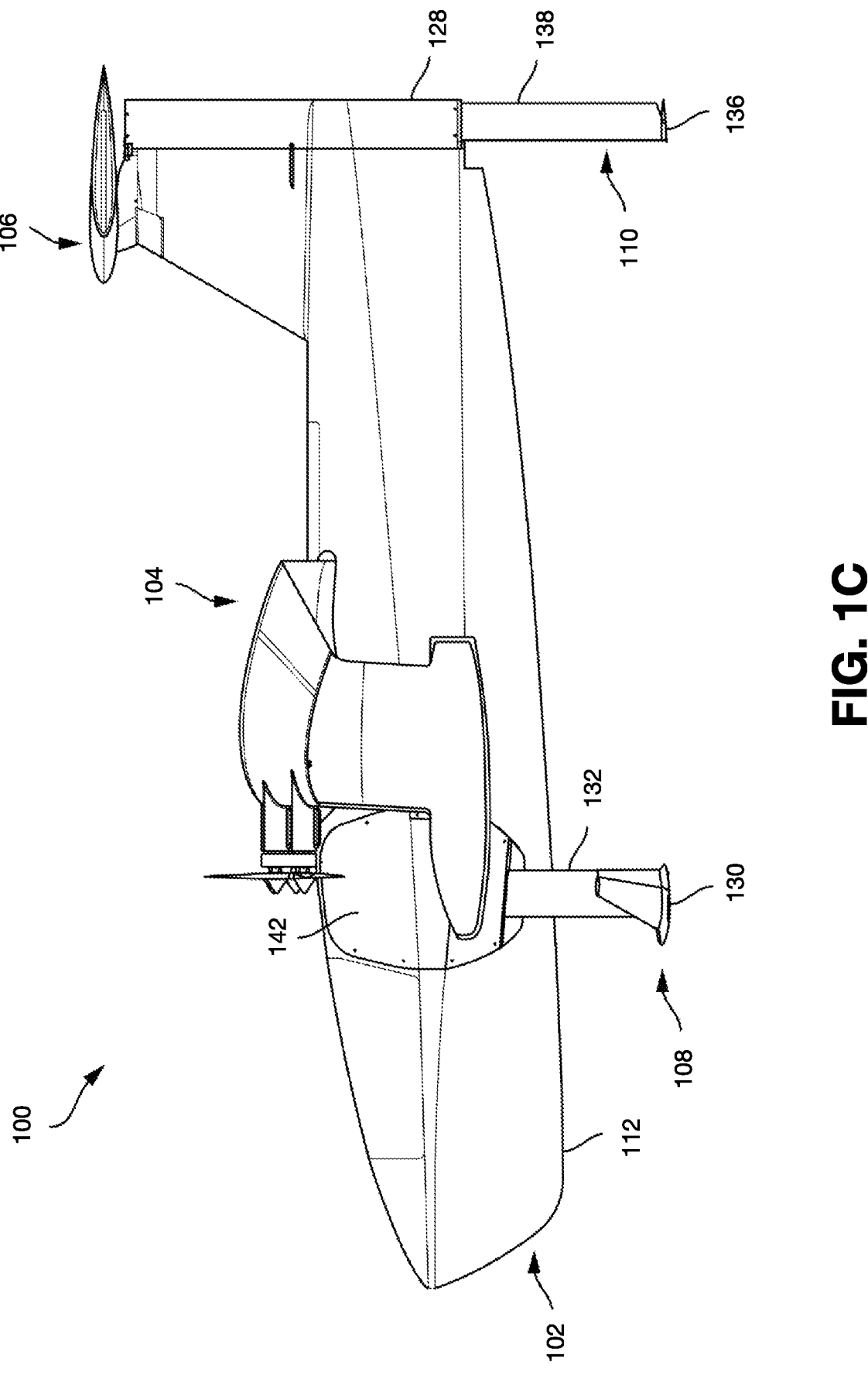

Various examples of systems, devices, and/or methods are described herein. Any embodiment, implementation, and/or feature described herein as being an "example" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, terms such as "A coupled to B" or "A is mechanically coupled to B" do not require members A and B to be directly coupled to one another. It is understood that various intermediate members may be utilized to "couple" members A and B together.

Moreover, terms such as "substantially" or "about" that may be used herein, are meant that the recited characteristic, parameter, or value need not be achieved exactly but that deviations or variations, including, for example, tolerances, measurement error, measurement accuracy limitations and other factors known to skill in the art, may occur in amounts that do not preclude the effect the characteristic was intended to provide.

I. Introduction

A wing-in-ground effect craft is a craft capable of moving over a surface (e.g., earth or water) by gaining support from the reactions of the air against one or more surfaces of the craft. When such a craft hovers relatively close to the surface, the drag experienced by the craft is reduced. For example, the drag on a WIG aircraft is reduced when its distance from the ground is within about half the length of the aircraft's wingspan.

Some WIG craft include fixed hydrofoils that create additional upward lift while the WIG is waterborne to reduce the wetted surface area on the vehicle's hull at intermediate speeds prior to takeoff. However, because WIGs need to fly at very low altitudes when wing-borne, the fixed hydrofoils need to be very short to avoid colliding with the water during flight. As a result, the fixed hydrofoils in these WIGs do not lift the hull of the vehicle above the water waves during waterborne operation. As such, these vehicles cannot (a) operate in rough seas or (b) operate at medium speeds (e.g., between the low speeds of a hull-borne operational mode and the high speeds of a wing-borne flight mode) in crowded harbors.

Disclosed herein are various examples of WIG craft that overcome these and other drawbacks of prior WIG craft. Some examples of these WIG craft correspond to seagliders and include and implement features disclosed in U.S. patent application Ser. No. 17/570,090, filed Jan. 6, 2022 (herein after '090 application), and U.S. patent application Ser. No. 17/845,480, filed Jun. 21, 2022 (herein after '480 application). The '090 and '480 applications are incorporated herein by reference in their entirety. The '090 application describes, among other things, a seaglider that includes a pair of retractable hydrofoils (e.g., front and rear hydrofoils) that facilitate a hydrofoil-borne operation, described further below. The '480 application describes, among other things, a seaglider that implements a bi-plane tail.

Some examples of these craft are configured to transition through several operating modes when preparing for takeoff. For instance, an example of such a craft operates in a hull-borne mode while near docks or in no-wake zones. While in this mode, the hull of the craft is in the water, and the craft may move at low speeds (e.g., less than 20 mph). The craft next transitions to a hydrofoil-borne mode of operation. While in this mode, the craft is supported by the hydrofoils, and the hull is substantially lifted out of the water. The craft may operate in this mode while traveling through harbors and crowded waterways and may move at increased speeds (e.g., between 20-45 mph). The craft next transitions to a wing-borne mode of operation. While in this mode, the craft is urged out of the water by the lift generated by the wings. The craft may operate in this mode while in open waters and at further increased speeds (e.g., between 45 mph). It should be understood that the example parameters and characteristics (including operating heights and speeds) provided herein are provided for purposes of example and explanation only and should not be taken as limiting.

The hydrofoil-borne mode of operation allows for a wide range of benefits. For instance, operating in hydrofoil-borne mode facilitates a high degree of maneuverability and greater speed while in harbors and crowded waterways. Additionally, the one or more hydrofoils help address the challenges faced by other WIG craft that transition directly from a hull-borne mode to a wing-borne mode of operation. These WIG craft experience significant hull-induced drag while taking off. Such drag is not experienced by the craft disclosed herein because the craft are hydrofoil-borne during takeoff.

An ability for a craft to take off from the hydrofoil-borne mode is desirable for several reasons. For instance, the craft would be expected to be operating in hydrofoil-borne mode prior to initiating a takeoff procedure (e.g., while navigating a crowded harbor). Therefore, transitioning back to the hull-borne mode of operation prior to takeoff could be uncomfortable for passengers. Further, taking off while in the hydrofoil-borne mode of operation minimizes disturbances that would otherwise be felt by passengers due to choppiness/turbulence of the water waves, which can be exacerbated at higher speeds.

Thus, some examples of successful take-off procedures of the craft generally involve, when initially in a hull-borne borne mode of operation, causing the craft to increase speed over water. Once the craft reaches a sufficient speed, the craft enters the hydrofoil-borne mode of operation and continues to accelerate. Once sufficient lift is generated by the wings of the craft (e.g., lift corresponding to the weight of the craft or within some margin thereof), the craft transitions to a wing-borne mode of operation.

In general, to sustain takeoff and accomplish flight, the aero lift, $L_W$, generated by the wings of the craft and/or lift generated by other aspects of the craft such as, for example, tilted rotors that provide vertical thrust, should exceed the weight, $W_{CRAFT}$, of the craft. (See FIG. 7A). A variety of factors impact the magnitude of aero lift, including, for example, the size and shape of the wings of the craft, the angle at which the wings meet the oncoming air (angle of attack or "AOA"), the speed at which the wings move through the air, the density of the air, etc. Of particular importance are those factors that are controllable through the course of a takeoff procedure, e.g., the speed of the craft and the pitch of the craft (corresponding to the AOA of the wings). (Note, while the lift, $L_F$, generated by the hydrofoil can be positive, this lift does not generally contribute to the lift of the craft once in flight because (a) the hydrofoil is no longer in the water and (b) as described further below, the hydrofoil is eventually retracted into (or towards) the craft once the craft is operating in wing-borne mode.)

During takeoff procedures for a conventional land-based craft, the craft gradually increases speed, thereby gradually increasing the aero lift, $L_W$, prior to take-off and flight. Once the craft has achieved sufficient speed, the AOA of the craft is increased, e.g., by pitching the nose of the craft upward. This further contributes to an increase in the aero lift, $L_W$, and eventually causes the craft to take off and maintain flight.

Conceptually, the takeoff procedure of the example craft disclosed herein are similar in some respects. For instance, in one example, the craft gains the speed needed to obtain the required aero lift, $L_W$, while the craft is in the hydrofoil-borne mode of operation (i.e., traveling through water vs over the water). In some examples, additional lift can be generated, for example, using tilted rotors or the like that provide vertical thrust/lift. However, transitioning from the hydrofoil-borne mode of operation to the wing-borne mode of operation is complicated and/or may be interrupted or frustrated due to the effect/force on the craft by the hydrofoil in the water.

As noted above, hydrofoils, like wings, generate an associated lift, $L_F$, due to the force of water passing under the hydrofoils as the craft gains speed. In a normal/standard arrangement, the net lift, $L_{NET}$, is positive. That is, the lift is upward and urges the craft out of the water. In this respect, $L_F$ and $L_W$ normally act in concert to urge the craft out of the water as the craft increases in speed. Some approaches to takeoff might involve attempting to increase the speed of the craft sufficiently while in the hydrofoil-borne mode of operation to eventually take off and gain flight. Moreover, such approaches might involve, at some point during takeoff, increasing the pitch of the craft, leading to increased wing AOA, to assist in increasing $L_W$ (and/or perhaps $L_F$) to contribute to increased lift and achievement of flight.

However, there are several challenges with such approaches. For instance, in testing this approach, applicants found that craft were unable to take flight after the speed of the craft was ramped towards a threshold lift speed at which the combination of $L_W$ and $L_F$ would theoretically exceed the weight of the craft. When the craft reached the threshold lift speed, and the AOA was increased, both the nose of the craft and the hydrofoil rotated upward. However, the positive lift provided by the hydrofoil, $L_F$, became negligible after the hydrofoil breached the surface of the water, and the remaining aero lift, $L_W$, was insufficient to sustain flight as Lw was not equal or great to the mass of the craft. As a result, once the hydrofoil left the water, the craft came back down into the water, thereby disrupting and/or frustrating and ultimately preventing takeoff from hydrofoil-borne operation to wing-borne operation. In other testing, applicants found that the angle of attack of the craft would abruptly increase. This, in turn, induced a stall condition in the craft, which prevented the craft from sustaining flight.

The example craft disclosed herein address these issues by modifying and improving the takeoff procedures described above to ensure that the aero lift, $L_W$, is sufficiently large prior to the point in the procedure at which the hydrofoils are to be removed from the water to facilitate allowing the craft to become wing-borne.

In some examples, an additional "negative" lift, $L_F$, is introduced via the hydrofoil while the craft is increasing in speed in anticipation of takeoff to "hold" the hydrofoils and, therefore, the craft in the water. As a result, the craft can further increase in speed and generate greater overall aero lift, $L_W$, without causing the craft to take flight and/or pitch up such that the front hydrofoil breaches the surface of the water (possibly leading to the failure described above).

In some examples, at an appropriate time after the "negative" lift, $L_F$, is introduced (e.g., when $L_W$ exceeds or is within some margin of the weight, $W_{CRAFT}$, of the aircraft according to some predetermined threshold), the negative lift, $L_F$, implemented via the hydrofoil can be "released," and the craft can, as a result, proceed to take off and gain sustained flight. These aspects are discussed in more detail below.

In some examples, the "hold" is not released. Rather, as the craft accelerates, the hydrofoil lift, $L_F$, generated by the hydrofoil increases to a maximum amount, which can be a predetermined maximum amount and/or a maximum amount achievable due to the control capabilities of the hydrofoil. Afterwards, as the aero lift, $L_W$, generated by the wings continues to increase, the aero lift, $L_W$, pulls the craft from the water, because the aero lift Lw is greater than the mass of the vehicle prior to takeoff. This can also help prevent an abrupt increase in the AOA of the craft, which can, in some instances, "throw" the craft out of the water and cause the craft to stall, thereby frustrating further takeoff procedures.

To implement aspects of the above-described take-off procedures, some examples of the craft comprise a control system configured to coordinate and control the transition of the craft from waterborne to hydrofoil-borne operation and from hydrofoil-borne to wing-borne operation. For instance, some examples of the control system are configured to cause one or more hydrofoils of the craft to extend and retract as needed (e.g., extend prior to taking off and retract when the craft is wing-borne). Some examples of the control systems are configured to control the actions of various control surfaces of the craft (e.g., flaps, ailerons, elevators, rudders, etc.) to stabilize the craft and control the altitude of the craft when near the water surface, etc.

Some examples of the craft are configured to control the articulation of the one or more hydrofoils and/or the various control surfaces of the one or more hydrofoils which can modify the amount of downwards hydrofoil lift, $L_F$, generated by the one or more hydrofoils when the craft is in hydrofoil-borne mode. For instance, some examples of the hydrofoils comprise one or more flaperons, flaps, ailerons, elevators, etc. The control system is configured to adjust respective deflection angles of one or more of these components to thereby control the downwards hydrofoil lift, $L_F$, generated by the hydrofoils. In some examples, the control system is configured to control the overall angle of attack of one or more of the hydrofoils to thereby control the hydrofoil lift, $L_F$, generated by the hydrofoils.

In some examples, while the craft is hydrofoil-borne, the control system is configured to control one or more of the hydrofoils to generate a downwards hydrofoil lift, $L_F$, that maintains the hydrofoil at least partially submerged in the water after the lift generated by the main wing of the craft reaches a threshold lift, while maintaining the desired ride height on the hydrofoil. In some examples, the threshold lift is greater than or equal to an amount of lift required to be generated by the main wing to allow the craft to transition from hydrofoil-borne movement through the water to wing-borne flight in the air. By controlling the hydrofoil to generate downwards lift that counteracts the upwards aero lift generated by the main wing until the amount of upwards aero lift exceeds the threshold amount of upwards aero lift, the control system prevents the craft from leaving the hydrofoil-borne mode of operation until after the main wing generates enough lift to facilitate the transition of the craft to the wing-borne mode of operation, from which the craft can proceed to gain altitude.

In some examples, the hydrofoil is controlled to generate an actively derived, predetermined, or fixed amount of downwards hydrofoil lift that is sufficient to keep the hydrofoil submerged after the main wing produces sufficient lift to sustain wing-borne flight after the craft leaves the water. For instance, in some examples, the downwards hydrofoil lift generated by the hydrofoil is sufficient to keep the hydrofoil at least within a margin of distance below the surface of the water until after the lift generated by the main wing is sufficient to sustain wing-borne flight. Afterward, the hydrofoil breaches the surface of the water and no longer exhibits any appreciable downwards hydrofoil lift. In some examples, the control system is configured to control the hydrofoil to increase the downwards hydrofoil lift generated by the hydrofoil in proportion to an increase in the lift generated by the main wing.

In some examples, the control system is configured to control the hydrofoil to decrease the downwards hydrofoil lift generated by the hydrofoil after the lift generated by the main wing reaches the threshold lift. For instance, in an example, the downwards hydrofoil lift generated by the hydrofoil is initially selected so that when the lift generated by the main wing reaches the threshold above, the hydrofoil is some distance below the surface of the water. At this point, the control system controls the hydrofoil to decrease or release the downwards hydrofoil lift. This, in turn, causes the craft to rise, bringing the hydrofoil out of the water so that the craft can transition from hydrofoil-borne to wing-borne operation. In some examples, the angle of attack/pitch of the craft, deflection angles of one or more control surfaces of the wings, etc., can be adjusted to generate additional aero lift.

In some examples, as the craft accelerates, the control system is configured to control the hydrofoil to increase the hydrofoil lift, $L_F$, generated by the hydrofoil to a maximum amount, which can be a predetermined maximum amount and/or a maximum amount achievable due to the control capabilities of the hydrofoil. Afterwards, as the aero lift, $L_W$, generated by the wings continues to increase, the hydrofoil is elevated out of the water so that the craft can transition from hydrofoil-borne to wing-borne operation. In some examples, the angle of attack/pitch of the craft, deflection angles of one or more control surfaces of the wings, etc., can be adjusted to generate additional aero lift.

Some examples of the control system are configured to determine the lift generated by the main wing based at least in part on one or more of the speed of the craft, an angle of attack of the main wing, a sensed load force imparted on the hydrofoil, etc.

In some examples, the craft comprises at least one hull, at least one wing, at least one hydrofoil, and a control system. The at least one wing is configured to generate upwards aero lift as air flows past the wing to facilitate wing-borne flight of the craft. The at least one hydrofoil is configured to generate upwards hydrofoil lift during a first mode of operation as water flows past the hydrofoil to facilitate hydrofoil-borne movement of the craft through the water.

While the craft is hydrofoil-borne, the control system is configured to determine the upwards aero lift generated by the at least one wing. The control system is further configured to control the at least one hydrofoil to generate downwards hydrofoil lift that maintains the hydrofoil at least partially submerged in the water while the determined upwards aero lift is below a threshold lift.

In some examples, the craft comprises at least one hull, at least one wing, at least one hydrofoil, at least one processor system comprising one or more processors, and tangible, non-transitory computer-readable media. The at least one wing is configured to generate upwards aero lift as air flows past the at least one wing to facilitate wing-borne flight of the craft. The at least one hydrofoil is configured to generate upwards hydrofoil lift during a first mode of operation as water flows past the at least one hydrofoil to facilitate hydrofoil-borne movement of the craft through the water. The tangible, non-transitory computer-readable media comprises program instructions executable by the one or more processors to configure the craft to, among other features, (i) determine the upwards aero lift generated by the at least one wing as the craft accelerates over the water while in hydrofoil-borne operation, (ii) adjust downwards hydrofoil lift generated by the at least one hydrofoil based on the determined upwards aero lift (generated by the at least one wing) to maintain the at least one hydrofoil at least partially submerged in the water, and (iii) after determining that the upwards aero lift is above some predetermined threshold (e.g., in an example, a predetermined threshold that may be selected according to an amount of aero lift that is sufficient to allow the craft to sustain flight), decrease the amount of downwards hydrofoil lift generated by the at least one hydrofoil to allow the hydrofoil to exit the water. In operation, controlling when the hydrofoil exits the water allows the craft to improve control of the transition of the craft from hydrofoil-borne movement through the water to wing-borne movement through the air.

In some examples, a method for operating the craft comprises determining upwards aero lift generated by at least one wing of the craft as the craft accelerates while the craft is operating in a hydrofoil-borne mode over water. The method further comprises adjusting, based on the determined upwards aero lift (generated by the at least one wing), downwards hydrofoil lift generated by at least one hydrofoil of the craft to maintain the at least one hydrofoil at least partially submerged in the water, thereby causing the craft to remain in hydrofoil-borne operation. The method further comprises, after determining that the upwards aero lift is sufficient to allow the craft to sustain flight (or determining that the upwards aero lift generated by the at least one wing is above some threshold amount of upwards aero lift), decreasing the amount of downwards hydrofoil lift generated by the hydrofoil to allow the hydrofoil to exit the water, thereby transitioning the craft from hydrofoil-borne operation to wing-borne operation.

II. Example Wing-in-Ground Effect Vehicles

FIGS. 1A-1D illustrate different views of an example of a craft 100. As shown, some examples of the craft 100 include a hull 102, a main wing 104, a tail 106, a main hydrofoil assembly 108, and a rear hydrofoil assembly 110.

A. Hull

Some examples of the craft 100 operate in a first waterborne mode for an extended period of time, during which the hull 102 is at least partially submerged in water. As such, some examples of the hull 102 are configured to be watertight, particularly for surfaces of the hull that contact the water during this first waterborne operational mode. Further, some examples of the hull 102, as well as the entirety of the craft 100, are configured to be passively stable on all axes when floating in water. To help achieve this, some examples of the hull 102 include a keel (or centerline) 112, which provides improved stability and other benefits described below. Some examples of the craft 100 include various mechanisms for adjusting the center of mass of the craft 100 so that the center of mass aligns with the center of buoyancy of the craft 100. For instance, in some examples, a battery system (described in further detail below in connection with FIG. 2) of the craft 100 is electrically coupled to one or more moveable mounts. Some examples of the mounts are moved by one or more servo motors or the like. In some examples, a control system of the craft 100 is configured to detect a change in its center of buoyancy, for instance, by detecting a rotational change via an onboard gyroscope, and responsively operate the servo motors to move the battery system until the gyroscope indicates that the craft 100 has stabilized. Some examples of the craft 100 include a ballast system for pumping water or air to various tanks distributed throughout the hull 102 of the craft 100. The ballast system facilitates adjusting the center of mass of the craft 100 so that the center of mass aligns with the center of buoyancy of the craft 100. Other example systems may be used to control the center of mass of the craft 100 as well.

Additionally, or alternatively, some examples of the hull 102 are configured to reduce drag forces when both waterborne and wing-borne. For instance, some examples of the hull 102 have a high length-to-beam ratio (e.g., greater than or equal to 8), which facilitates reducing hydrodynamic drag forces when the craft 100 is under forward waterborne motion. Some examples of the keel 112 are curved or rockered to improve maneuverability when waterborne. Further, some examples of the hull 102 are configured to pierce the surface of waves (e.g., to increase passenger and crew comfort) by including a narrow, low-buoyancy bow portion of the hull 102.

B. Wing and Distributed Propulsion System

As shown in FIGS. 1A-1D, some examples of the main wing 104 include an outrigger 114 at each end of the main wing 104. The outriggers 114 (which are sometimes referred to as "wing-tip pontoons") are configured to provide a buoyant force to the main wing 104 when submerged or when otherwise in contact with the water, which improves the stability of the craft 100 during waterborne operation.

Figure 1D:
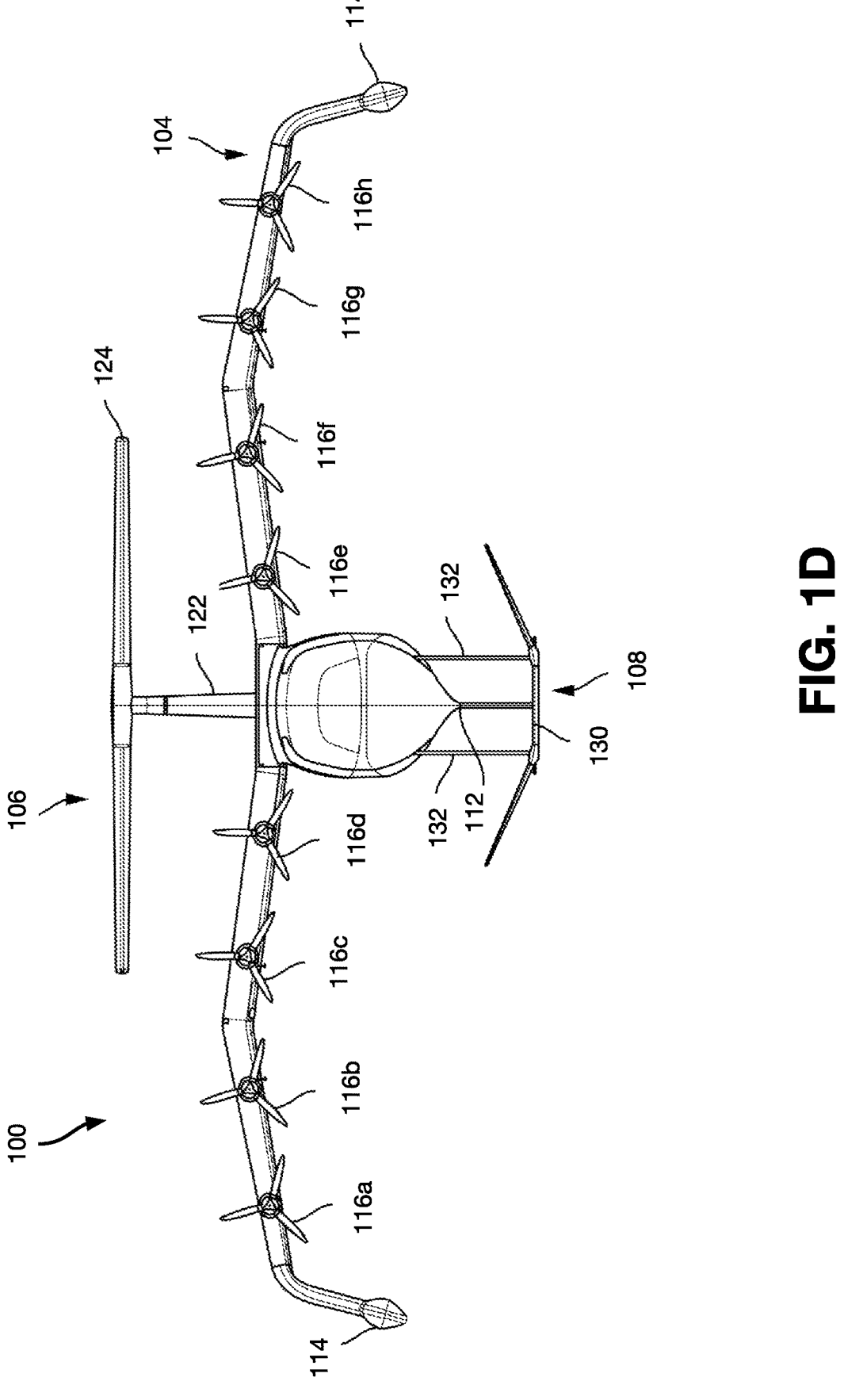

As shown in FIG. 1D, some examples of the main wing 104 have a gull-wing shape such that the outriggers 114 at the ends of the main wing 104 are at the lowest point of the main wing 104 and are positioned approximately level with (or slightly above) a waterline of the hull 102 when the hull 102 is waterborne.

Some examples of the main wing 104 have a high aspect ratio, which is defined as the ratio of the span of the main wing 104 to the mean chord of the main wing 104. In some examples, the aspect ratio of the main wing 104 is greater than or equal to five, or greater than or equal to six, but other example aspect ratios are possible as well. Such wings tend to have reduced pitch stability and maneuverability due to lower roll angular acceleration. These issues are ameliorated by various mechanisms described below. On the other hand, such wings tend to have increased roll stability and increased efficiency resulting from higher lift-to-drag ratios. Further, high aspect ratio wings provide a longer leading edge for the mounting of a distributed propulsion system along the wing.

As shown in the figures, some examples of the main wing 104 include a number of electric motor propeller assemblies 116 distributed across a leading edge of the main wing 104. This arrangement corresponds to a blown-wing propulsion system. Arranging the propeller assemblies 116 in this manner increases the speed of air moving over the main wing 104, which increases the lift generated by the main wing 104. This increase in lift allows the craft 100 to take off and become wing-borne at slower vehicle speeds. This facilitates, for example, taking off on water which can be difficult at higher speeds due to the various forces that would otherwise act on the craft 100.

The electric motor propeller assemblies 116 tend to be much lighter, less complex, and smaller than the liquid-fueled engines used on conventional craft. Some examples of the electric motor propeller assemblies 116 are controlled by an electronic speed controller and powered by an onboard battery system (e.g., a lithium-ion system, magnesium-ion system, lithium-sulfur system, etc.). Some examples of the electric motor propeller assemblies 116 are controlled by a fuel cell or a centralized liquid-fueled electricity generator. In some examples, the onboard electrical supply system includes multiple systems for supplying power during different operational modes, such as a first battery system configured to deliver large amounts of power during takeoff and a second system with a higher energy density but lower peak power capability for delivering sustained lower power during cruise operation (e.g., during hydrofoil waterborne operation or during wing-borne operation, each of which are described in further detail below).

In some examples, the positioning of the electric motor propeller assemblies 116 along the leading edge of the main wing 104 is determined based on a variety of factors including, but not limited to, (i) the required total thrust for all modes of operation of the craft 100, (ii) the thrust generated by each individual propeller of the propeller assemblies 116, (iii) the radius of each propeller in the respective propeller assemblies 116, (iv) the required tip clearance between each propeller and the surface of the water, and (v) the additional freestream speed over the main wing 104 required for operation.

As shown in the figures, in some examples, the number of propeller assemblies 116 is symmetrical across both sides of the hull 102. In some examples, the propeller assemblies 116 are identical. In some examples, the propeller assemblies 116 have different propeller radii or blade configurations along the span so long as the configuration is symmetrical across the hull 102. The different radii facilitate adequate propeller tip clearance from the water or vehicle structure. In some examples, the different propellers are optimized for different operational conditions, such as wing-borne cruise. The propeller placement and configuration may vary to increase the airflow over the main wing 104 or tail system 106 to improve controllability or stability. While eight total propeller assemblies 116 are illustrated, the actual number of propeller assemblies 116 can vary based on the requirements of the craft 100.

In some examples, the propeller assemblies 116 have different pitch settings or variable pitch capabilities based on their position on the main wing 104. For instance, in some examples, a subset of the propeller assemblies 116 have fixed-pitch propellers sized for cruise speeds, while the remainder of the propeller assemblies 116 have fixed-pitch propellers configured for takeoff or can allow for varying the propeller's pitch.

In some examples, different propeller assemblies 116 are turned off or have reduced rotational speeds during different modes of operation. For instance, during waterborne operation, one or more of the propeller assemblies 116 may be turned off or have reduced rotational speeds in a manner that generates asymmetrical thrust. This may create a yawing moment on the craft 100, allowing the craft 100 to turn without large bank angles and increasing the turning maneuverability of the craft 100. For instance, in order to yaw right, the craft 100 may increase the rotational speeds of the propellers of one or more of propeller assemblies 116e-h while decreasing the rotational speeds of the propellers of one or more of propeller assemblies 116a-d. Similarly, to yaw left, the craft 100 may increase the rotational speeds of the propellers of one or more of propeller assemblies 116a-d while decreasing the rotational speeds of the propellers of one or more of propeller assemblies 116e-h.

Similarly varying rotational speeds or propeller pitches may be used to yaw or roll the aircraft in flight or while foiling due to varied forces and lift distributions imposed over the wing and its control surfaces or in general used to tailor the lift distribution across the wing for optimized efficiency.

In some examples, the propeller assemblies may tilt to vector thrust either to provide directly more vertical lift or to change how the wing is blown depending on the mode of operation so as to tailor the blown lift distribution.

Some examples of the main wing 104 include one or more aerodynamic control surfaces, such as flaps 118 and ailerons 120. Some examples of these controls comprise movable hinged surfaces on the trailing or leading edges of the main wing 104 for changing the aerodynamic shape of the main wing 104. Some examples of the flaps 118 are configured to extend downward below the main wing 104 to reduce stall speed and create additional lift at low airspeeds, while some examples of the ailerons 120 are configured to extend upward above the main wing 104 to decrease lift on one side of the main wing 104 and induce a roll moment in the craft 100. In some examples, the ailerons 120 are additionally configured to extend downward below the main wing 104 in a flaperon configuration to help the flaps 118 generate additional lift on the main wing 104, which, in some examples, is used to either create a rolling moment or additional balanced lift depending on coordinated movement of both ailerons. Some examples of the flaps 118 and ailerons 120 include one or more actuators for raising and lowering the flaps 118 and ailerons 120. Within examples, the flaps 118 include one or more of plain flaps, split flaps, slotted flaps, Fowler flaps, slotted Fowler flaps, Gouge flaps, Junkers flaps, or Zap flaps. Further, in some examples, the flaps 118 (and the ailerons 120 when configured as flaperons) are positioned to be in the wake of one or more of the propeller assemblies 116. In some examples, the ailerons 120 are positioned so that they are in the wake of one or more of the propeller assemblies 116 to increase the effectiveness of the ailerons at low forward velocities. Some of the propeller assemblies 116 are positioned so that no ailerons 120 are in their wake to increase thrust on the outboard wing during a turn without inducing adverse yaw. For example, in a left turn, a normal airplane would have adverse yaw to the right as the right aileron is deflected down, increasing drag. In the present disclosure, however, the right propeller assembly outboard of the right aileron may have its thrust increased relative to the respective left propeller assembly, initiating a turn without adverse yaw.

C. Tail System

As illustrated in FIGS. 1A-1D, some examples of the tail 106 include a vertical stabilizer 122, a horizontal stabilizer 124, and one or more control surfaces, such as elevators 126. Similar to the flaps 118 and ailerons 120, some examples of the elevators 126 comprise movable hinged surfaces on the trailing or leading edges of the horizontal stabilizer 124 for changing the aerodynamic shape of the horizontal stabilizer 124 to control a pitch of the craft 100. Some examples of the horizontal stabilizer 124 are combined with the elevator 126, creating a fully articulating horizontal stabilizer (e.g., a stabilator). Raising the elevators 126 above the hinge point creates a net downward force on the tail system and causes the craft 100 to pitch upward. Lowering the elevators 126 below the hinge point creates a net upward force on the horizontal stabilizer 124 and causes the craft 100 to pitch downward. Some examples of the elevators 126 include actuators, which are operated by a control system of the craft 100 to raise and lower the elevators 126.

As illustrated in FIGS. 1A-1D, some examples of tail 106 include a rudder 128. Some examples of the rudder 128 comprise a movable hinged surface on the trailing edge of the vertical stabilizer 122 for changing the aerodynamic shape of the vertical stabilizer 122 to control the yaw of the craft 100 when operating in an airborne mode. In some examples, the rudder 128 additionally changes a hydrodynamic shape of the hull 102 to control the yaw of the craft 100 when operating in a waterborne mode. To facilitate such hydrodynamic control, in some examples, the rudder 128 is positioned low enough on the tail 106 that the rudder 128 is partially or entirely submerged when the hull 102 is floating in water. For instance, the rudder 128 is positioned partially or entirely below the waterline of the hull 102. Some examples of the rudder 128 include one or more actuators, which are operated by a control system of the craft 100 to rotate the hinged surface of the rudder 128 to the left or right of the vertical stabilizer 122. Actuating the rudder 128 to the left (relative to the direction of travel) causes the craft 100 to yaw left. Actuating the rudder 128 to the right (relative to the direction of travel) causes the craft 100 to yaw right. As such, the rudder 128 may be used in combination with any of the other mechanisms disclosed herein for controlling the yaw of the craft 100, including in combination with the ailerons 120 during airborne operation and in combination with varying the rotational speeds of different ones of the propeller assemblies 116 to help improve the maneuverability of the craft 100 during waterborne operation.

Figure 1E:
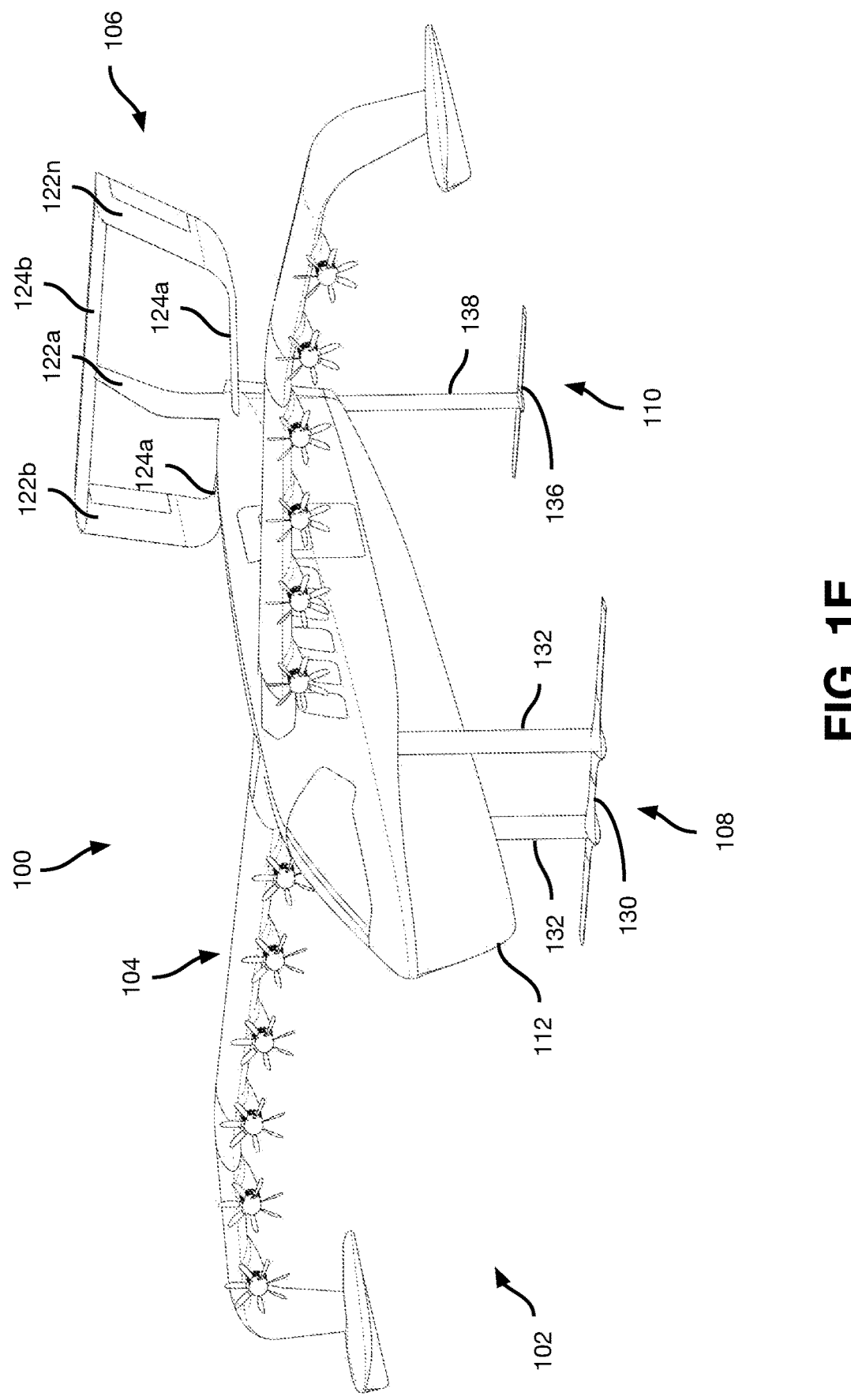
Figure 1F:
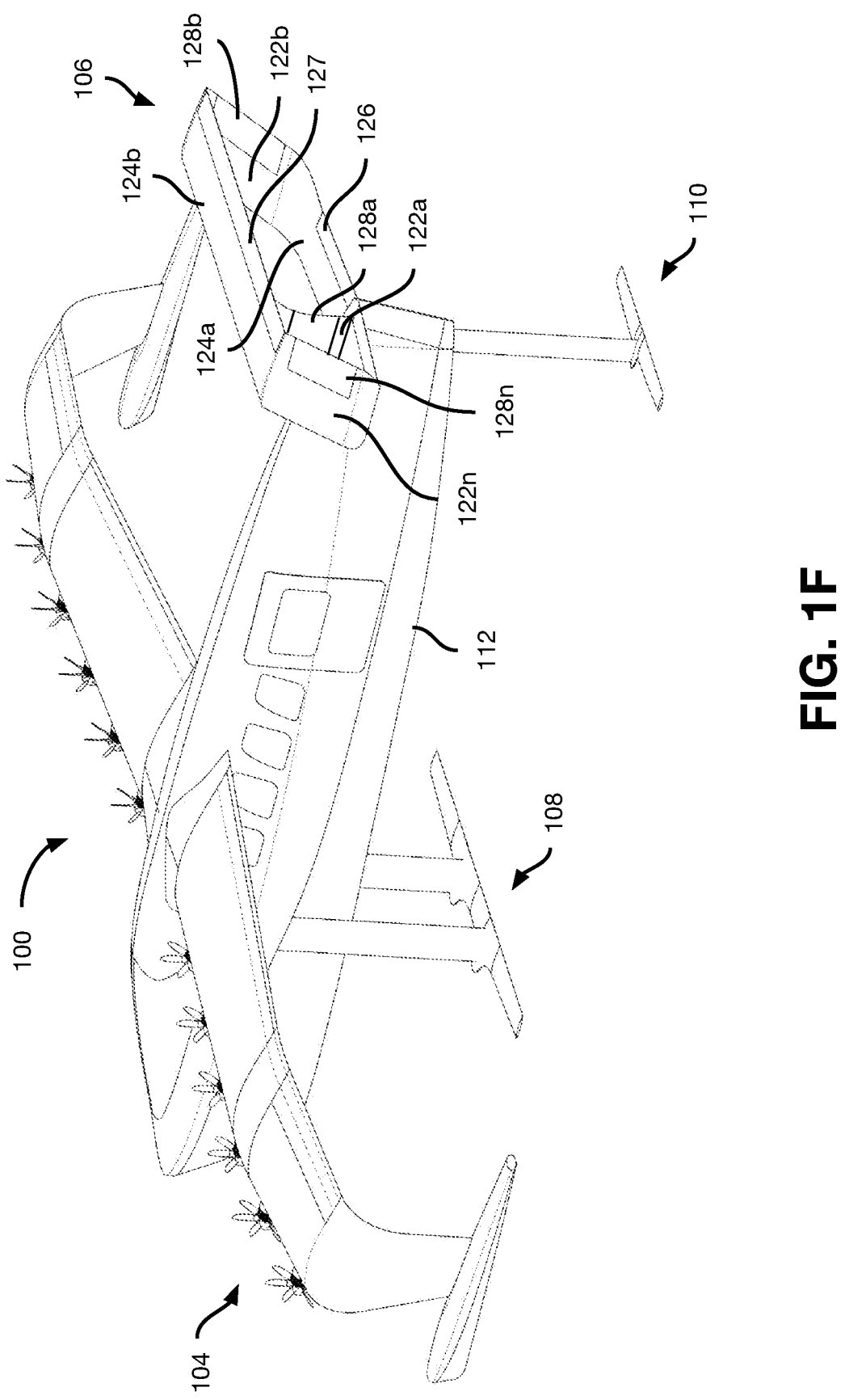
Figure 1G:
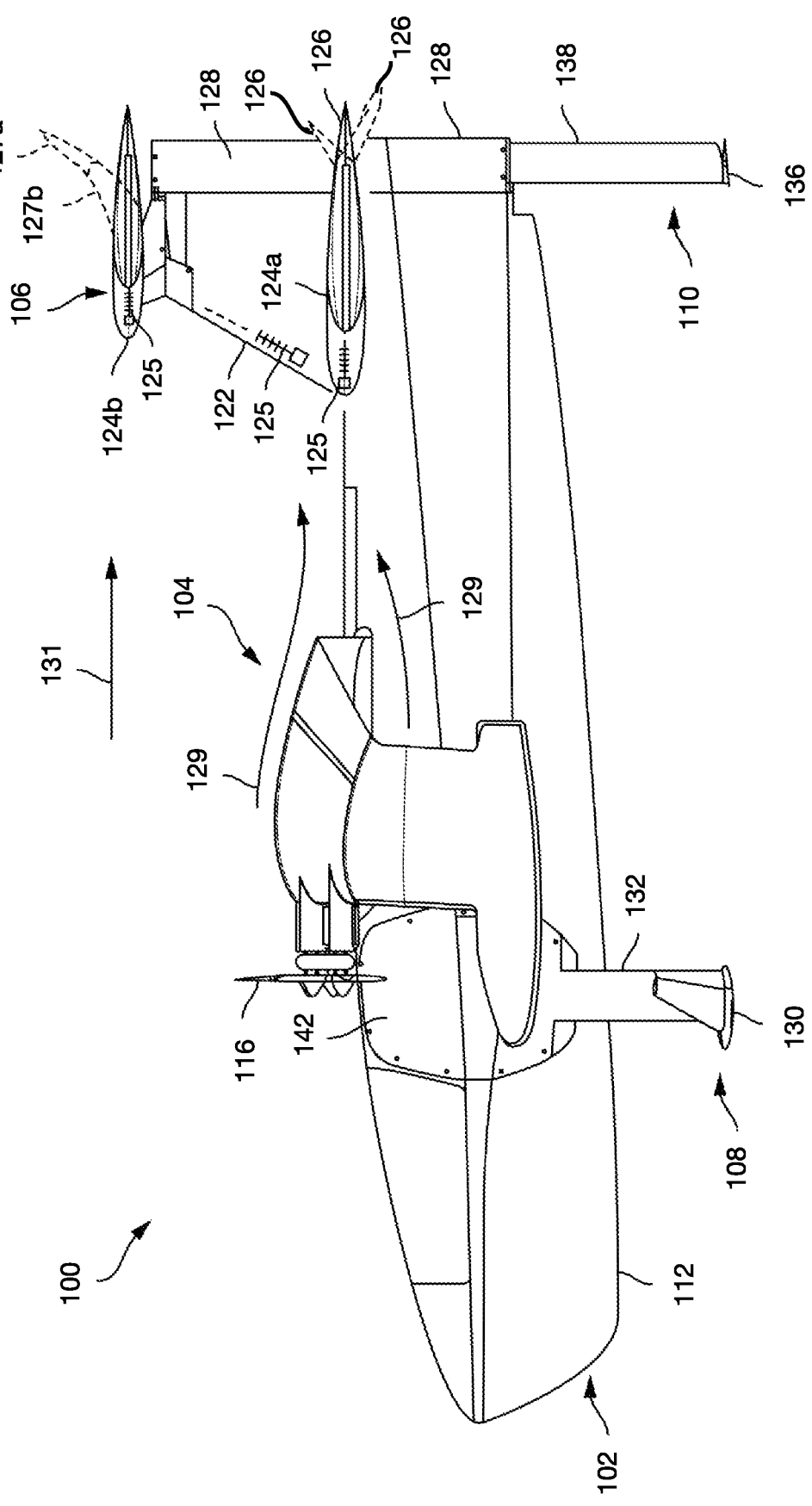

As illustrated in FIGS. 1E-1G, some examples of the tail 106 include one or more vertical stabilizers 122a, 122b, 122n, one or more horizontal stabilizers 124a, 124b, one or more control surfaces, such as elevators 126, and one or more tail flaps 127a, 127b for enhanced pitch control configured to exert enhanced net downward force on the tail system. It should be understood that although FIGS. 1E-1G show only two horizontal stabilizers and two tail flaps, it is contemplated that more than two of each can be used within the scope of the present teachings. In some applications, it has been found that the transition from waterborne operation to airborne or wing-borne operation can require a larger pitching moment to overcome the larger drag forces existing between the hull 102 and/or the hydrofoil assemblies 108, 110 and the water. This phenomenon can further occur in wheeled aircraft configured for short takeoff and landing (STOL) operations. In this way, at low airspeeds, aerodynamic forces in conventional designs fail to produce sufficient downward force to permit sufficient pitching moment. To provide sufficient pitching moment to pitch the craft 100 upward, a conventional solution would be to increase the span of the tail so that the elevator generates more force; however, a resultant consequence of increasing the span of the tail is that the entire tail must be stronger and heavier, which can result in undesired reduction of payload and efficiency. However, the present configuration provides improved performance by providing a tail 106 having a first horizontal stabilizer 124a and a second horizontal stabilizer 124b. It should be understood that one or more additional horizontal stabilizers can be used.

In some examples, a first horizontal stabilizer 124a is a lower horizontal stabilizer relative to a second horizontal stabilizer 124b. However, it should be appreciated that the horizontal stabilizers in some examples can be interchanged for performance purposes (e.g., the disclosed structure of the first horizontal stabilizer 124a can be incorporated in the upper horizontal stabilizer and the disclosed structure of the second horizontal stabilizer 124b can be incorporated in the lower horizontal stabilizer). In some non-limiting examples, the structure, shape, and/or performance of each horizontal stabilizer can be tailored as desired such that the lower horizontal stabilizer (in this example, the first horizontal stabilizer 124a) is more likely to experience aerodynamic effect from being in the wake of the blown-wing propulsion system disclosed herein or associated wake produced by alternative propulsion systems. In this way, greater aerodynamic control and/or downwards lift can be generated during desired phases of operation.

Some examples of the horizontal stabilizers 124a, 124b include one or more aerodynamic control surfaces, such as tail flaps 127 and elevators 126, which may comprise movable hinged surfaces on the trailing or leading edges of the horizontal stabilizer 124 for changing the aerodynamic shape of the respective horizontal stabilizer 124. It should be recognized that at least one of the horizontal stabilizers 124a, 124b can be sized, shaped, and/or spaced relative to a second of the horizontal stabilizers 124a, 124b to enhance or minimize the aerodynamic effect on the adjacent stabilizers. In this way, the aerodynamic flow, pressures, and/or forces can be used to improve the efficiency or effectiveness of the adjacent stabilizer. In some examples, at least one of the horizontal stabilizers 124a, 124b can be actuated in an opposing direction. In some embodiments, at least one of the horizontal stabilizers 124a, 124b can define a ratio of a surface area of the first horizontal stabilizer to a surface area of the second horizontal stabilizer in the range of 0.9 to 1.6. In some non-limiting example configurations, the surface area of the first horizontal stabilizer is 5.7 m2, the surface area of the second horizontal stabilizer is 3.9 m2, both have a chord of about 1 m and a vertical separation of 1.8 m. In some embodiments, a vertical separation distance between the first horizontal stabilizer and the second horizontal stabilizer is in the range of 0.25 to 0.75 of the lower horizontal stabilizer span. In some examples, a vertical separation distance can be dependent on the required rudder authority and thus elevator size (driven by, e.g., yaw stability, or the need to counteract asymmetric thrust following powerplant failure). In some examples, a sweep offset moves the center of pressure further aft from the center of gravity, thus allowing the airfoil of the horizontal stabilizer to have less surface area overall, thus being smaller and lighter. In some examples, a dihedral in the bottom surface of the horizontal stabilizer adds stability. In some examples, the box tail design itself increases the efficiency due to the elimination of wingtip vortices of a typical tail. In some embodiments, a lower horizontal stabilizer may have approximately a 15% thickness-to-chord ratio to support the weight of the upper components, whereas the vertical and upper surfaces may be thinner, such as, for example, 10% thickness-to-chord ratio due to reduced structural load requirement, which enables the upper horizontal stabilizer to be more efficient (lower drag). It should be appreciated that the left and right elevator surfaces 126 can be controlled independently and/or differentially to create a rolling moment, thereby enabling the wing ailerons 120 to be made smaller. The smaller wing ailerons 120 further enable larger flaps 118. It should be appreciated that in some embodiments, using the vertical control surfaces 128a, 128b, 128n can change the pressure distribution across the elevator 126, for example, commanding a left 5 degree deflection in the left vertical control surface may move the mean pressure distribution left/right by a percentage of the elevator width.

Some examples of the tail flaps 127 are configured to selectively extend upward above the horizontal stabilizer 124 for changing a surface area, camber, aspect ratio, and/or shape of the horizontal stabilizer 124. The tail flaps 127 may include, for example, one or more of plain flaps, split flaps, slotted flaps, Fowler flaps, slotted or double-slotted Fowler flaps, Gouge flaps, Junkers flaps, or Zap flaps. That is, in some examples, tail flaps 127 serve to change an angle of attack of the horizontal stabilizer 124, change a chord line of the horizontal stabilizer 124, change a surface area of the horizontal stabilizer 124, and/or otherwise increase the net effective downwardly directed lift of the horizontal stabilizer 124. Such configurations effectively reduce the speed at which the horizontal stabilizer 124 becomes aerodynamically effective by creating additional net downward force at low airspeeds to aid in exerting a nose-up pitching moment of the craft 100. The elevators 126 may be configured for changing the aerodynamic shape of the horizontal stabilizer 124 to further control or vary a pitch of the craft 100.

In some examples operations, the tail flaps 127 are deployed (e.g., extended as depicted in 127a and 127b with dashed lines in FIG. 1G) for takeoff (e.g., transition from hydrofoil-borne mode to airborne mode) and landing (e.g., transition from airborne mode to hull-borne mode) to generate additional downforce on the tail system when additional pitch-up moment is required. Tail flaps 127 can be stowed (e.g., retracted as depicted in FIGS. 1E-1F) for other phases of operation, such as hull-borne mode, to reduce downforce on the tail system and reduce drag.

In some examples, the elevators 126 are additionally configured to extend upward above the horizontal stabilizer 124 in a flaperon-like configuration (yet with elevators, rather than ailerons) to help the tail flaps 127 generate additional downward force on the horizontal stabilizer 124, which may be used to either create a pitching moment or additional balanced downward force. The tail flaps 127 and elevators 126 may each include one or more actuators 125 for raising and lowering the tail flaps 127 and elevators 126, singly or in combination. The actuators 125 can comprise any system configured to selectively actuate the associated system, such as but not limited to a flap track system (integrated into vertical stabilizers 122a, 122b, 122n, which can reduce complex hinge systems or external arms, thereby reducing wetted area and excrescences drag), an electric servo motor mounting within the vertical stabilizers 122a, 122b, 122n and/or horizontal stabilizers 124a, 124b, and/or a central vertical strut system generally mounted in the hull 102 or the fuselage of the craft 100 (to provide the potential for reduced cross-sectional area and associated drag).

Further, in some examples, as depicted in FIG. 1G, the elevators 126 and/or the tail flaps 127 are positioned so that they are in the wake 129 of one or more of the propeller assemblies 116 of main wing 104. The elevators 126 and/or the tail flaps 127 may be positioned so that they are in the wake 129 of one or more of the propeller assemblies 116 to increase the effectiveness of the elevators at low forward velocities. In some examples, the propeller assemblies 116 are positioned so that no elevators 126 and/or tail flaps 127 are in the wake 129 to ensure consistent and/or predictable aerodynamic forces, independent of power application, are exerted during critical operational phases. In some examples, the propeller assemblies 116 are positioned so that the elevators 126 are in their wake 129 and the tail flaps 127 are not in the wake 129 (e.g., above the wake 129) and are exposed to clean air 131. It should be understood that positioning of the tail flaps 127 in the second horizontal stabilizer 124b, or at a distance above the center of gravity of the craft 100, will have the added unexpected benefit of creating additional nose-up pitching moment as a result of induced drag acting about the center of gravity causing the craft 100 to pitch upward.

Similar to the flaps 118 and the ailerons 120 of the main wing 104, some examples of the elevators 126 comprise movable hinged surfaces on the trailing or leading edges of the horizontal stabilizer 124 for changing the aerodynamic shape of the horizontal stabilizer 124 to control a pitch of the craft 100. The horizontal stabilizer 124 may be combined with the elevator 126, creating a fully articulating horizontal stabilizer (e.g., a stabilator). Raising the elevators 126 above the hinge point creates a net downward force on the tail system and causes the craft 100 to pitch upward. Lowering the elevators 126 below the hinge point creates a net upward force on the horizontal stabilizer 124 and causes the craft 100 to pitch downward. The elevators 126 may include actuators, which may be operated by a control system of the craft 100 in order to raise and lower the elevators 126.

In some examples, the tail 106 includes one or more rudders 128a, 128b, 128n. The rudders 128a, 128b, 128n may each comprise a movable hinged surface on the trailing edge of the corresponding vertical stabilizers 122a, 122b, 122n for changing the aerodynamic shape of the vertical stabilizer 122 to control the yaw of the craft 100 when operating in an airborne mode. It should be understood that rudders 128a, 128b, 128n can operate independently or in combination as desired. Moreover, in some examples, rudders 128a, 128b, 128n can be used as redundant systems, particularly useful in the event of one or more failures.

In some examples, the rudders 128a, 128b, 128n additionally change a hydrodynamic shape of the hull 102 to control the yaw of the craft 100 when operating in a waterborne mode. In order to facilitate such hydrodynamic control, the rudders 128a, 128b, 128n may be positioned low enough on the tail 106 that one or more of the rudders 128a, 128b, 128n is partially or entirely submerged when the hull 102 is floating in water. Namely, the rudders 128a, 128b, 128n may be positioned partially or entirely below a waterline of the hull 102. The rudders 128a, 128b, 128n may include one or more actuators, which may be operated by a control system of the craft 100 in order to rotate the hinged surface of the rudders 128a, 128b, 128n to the left or right of the vertical stabilizer 122. Actuating the rudders 128a, 128b, 128n to the left (relative to the direction of travel) causes the craft 100 to yaw left. Actuating the rudders 128a, 128b, 128n to the right (relative to the direction of travel) causes the craft 100 to yaw right. As such, the rudders 128a, 128b, 128n may be used in combination with any of the other mechanisms disclosed herein for controlling the yaw of the craft 100, including in combination with the ailerons 120 during airborne operation and in combination with varying the rotational speeds of different ones of the propeller assemblies 116 to help improve the maneuverability of the craft 100 during waterborne operation.

As depicted in FIG. 1F, it should be understood that the fundamental shape of tail 106, having one or more vertical stabilizers 122a, 122b, 122n and one or more horizontal stabilizers 124a, 124b, can result in a box-like assembly, wherein the vertical stabilizers are generally coupled to the horizontal stabilizers to form a reinforced box-like construction. This box-like construction provides enhanced structural integrity that enables tail 106 of some examples to be lighter and/or smaller than otherwise constructed.

While not shown in FIGS. 1A-1G, some examples of the craft 100 include a distributed propulsion system on the tail 106, which may be similar to the distributed propulsion system of propeller assemblies 116 on the main wing 104. Such a distributed propulsion system may provide similar benefits of increasing the freestream velocity over the control surfaces (e.g., the elevators 126 and/or the rudder 128) to allow for increased pitch and yaw control of the craft 100 at lower travel speeds. When determining the number and size of propeller assemblies to include on the tail 106, one may apply the same factors described above when determining the number and size of propeller assemblies to include on the main wing 104.

D. Hydrofoil Systems

As noted above, some examples of the craft 100 include a main hydrofoil assembly 108 and a rear hydrofoil assembly 110. In some examples, the main hydrofoil assembly 108 is positioned proximate to the middle or bow of the craft 100, and the rear hydrofoil assembly 110 is positioned proximate to the stern. For instance, some examples of the main hydrofoil assembly 108 is positioned between the bow and a midpoint (between the bow and stem) of the craft 100, and some examples of the rear hydrofoil assembly 110 is positioned below the tail 106 of the craft 100.

The main hydrofoil assembly 108 and the rear hydrofoil assembly 110 are configured to facilitate the breaking of contact between the hull of the craft and the water surface during takeoff, which, as noted above, can otherwise be challenging in some conventional craft designs. Some examples of the main hydrofoil assembly 108 and the rear hydrofoil assembly 110 are configured to be retractable, large enough to lift the entire craft out of the water and not impact the water surface, and to enable sustained operation in the hydrofoil-borne mode (where the entire weight of the craft is supported by the one or more hydrofoil assemblies).

Some examples of the main hydrofoil assembly 108 include a main hydrofoil 130, one or more main hydrofoil struts 132 that couple the main hydrofoil 130 to the hull 102, and one or more main hydrofoil control surfaces 134. Similarly, some examples of the rear hydrofoil assembly 110 include a rear hydrofoil 136, one or more rear hydrofoil struts 138 that couple the rear hydrofoil 136 to the hull 102, and one or more rear hydrofoil control surfaces 140.

Some examples of the main hydrofoil 130 and the rear hydrofoil 136 take the form of one or more hydrodynamic lifting surfaces (also referred to as "foils") configured to be operated partially or entirely submerged underwater while the hull 102 of the craft 100 remains above and clear of the water's surface. In operation, as the craft 100 moves through water with the main hydrofoil 130 and the rear hydrofoil 136 submerged, the hydrofoils generate a lifting force that causes the hull 102 to rise above the surface of the water. In general, the lifting force generated by the hydrofoils must be at least equal to the weight of the craft 100 to cause the hull 102 to rise above the surface of the water. The lifting force of the hydrofoils depends on the speed and angle of attack at which the hydrofoils move through the water, as well as their various physical dimensions, including the aspect ratio, the surface area, the span, and the chord of the foils.

The height at which the hull 102 is elevated above the surface of the water during hydrofoil-borne operation is limited by the length of the one or more main hydrofoil struts 132 that couple the main hydrofoil 130 to the hull 102 and the length of the one or more rear hydrofoil struts 138 that couple the rear hydrofoil 136 to the hull 102. In some examples, the main hydrofoil struts 132 and the rear hydrofoil struts 138 are long enough to lift the hull 102 at least five feet above the surface of the water during hydrofoil-borne operation, which facilitates operation in substantially choppy waters. Struts of other lengths may be used as well. For instance, in some examples, longer struts that allow for better wave-isolation of the hull 102 (but at the expense of the stability of the craft 100 and increasing complexity of the retraction system) are utilized.

In practice, hydrofoils have a limited top speed before cavitation occurs, which results in vapor bubbles forming and imploding on the surface of the hydrofoil. Cavitation not only may cause damage to a hydrofoil but also significantly reduces the amount of lift generated by the hydrofoil and increases drag. Therefore, it is desirable to reduce the onset of cavitation by designing the main hydrofoil 130 and the rear hydrofoil 136 in a way that allows the hydrofoils to operate at higher speeds (e.g., ~20-45 mph) and across the entire required hydrofoil-borne speed envelope before cavitation occurs. For instance, in some examples, the onset of cavitation is controlled based on the geometric design of the main hydrofoil 130 and the rear hydrofoil 136. Additionally, in some examples, the structural design of the main hydrofoil 130 and the rear hydrofoil 136 is configured to allow the surfaces of the hydrofoils to flex and twist at higher speeds, which may reduce loading on the hydrofoils and delay the onset of cavitation.

Further, in some examples, the distributed blown-wing propulsion system described above further facilitates the delay of onset of cavitation on the main hydrofoil 130 and the rear hydrofoil 136. Cavitation is caused by both (i) the amount of lift generated by a hydrofoil and (ii) the profile of the hydrofoil (which is affected by both the hydrofoil's angle of attack and its vertical thickness) as it moves through water. Reducing the amount of lift generated by the hydrofoil delays the onset of cavitation. Because the blown-wing propulsion system creates additional lift on the main wing 104, the amount of lift exerted on the main hydrofoil 130 and the rear hydrofoil 136 to lift the hull 102 out of the water is reduced. Further, because the main hydrofoil 130 and the rear hydrofoil 136 do not need to generate as much lift to raise the hull 102 out of the water, their angles of attack may be reduced as well, which further delays the onset of cavitation. In some examples, combining the blown-wing propulsion system with the hydrofoil designs described herein facilitates operating the craft 100 in a hydrofoil-borne mode at speeds above 35 knots before cavitation occurs.

As shown in FIGS. 1A-1D, some examples of the main hydrofoil 130 have a flattened V-shaped design in which a center portion of the main hydrofoil 130 is substantially flat, and the ends of the main hydrofoil 130 extend upward toward the hull 102 of the craft 100. This flattened V-shape design facilitates passive regulation of the distance between the hull 102 and the surface of the water (also referred to as "ride height") while also allowing for passive roll-moment control. The passive regulation of ride height is achieved by having the tips of the V-shaped hydrofoil breach the surface of the water, reducing the lifting surface that is underwater. If the ride height is too low, the increased hydrofoil surface area under the surface of the water will create a net force greater than the weight of the craft 100, causing the hydrofoil to rise higher. If the ride height is too high, the hydrofoil lifting area under the surface of the water will be insufficient to prevent the craft 100 from descending into the water. The passive roll stability is due to one side of the V-shaped hydrofoil breaching further out of the water than the other side. This creates a stabilizing roll moment when the craft 100 is rolled to (for example) the left because the left side of the V-shaped hydrofoil will have more surface under the water surface, allowing it to generate more lift than the right side. In some examples of the craft 100 (e.g., as shown in FIGS. 1E-1G and 3), the shape of the main hydrofoil 130 is different (e.g., flat, curved, etc.).

As noted above, some examples of the main hydrofoil assembly 108 and the rear hydrofoil assembly 110 include one or more main and rear hydrofoil control surfaces 134, 140, respectively. Some examples of the main hydrofoil control surfaces 134 include one or more hinged surfaces on a trailing or leading edge of the main hydrofoil 130 as well as one or more actuators which are operated by the control system of the craft 100 to rotate the hinged surfaces so that they extend above or below the main hydrofoil 130. Some examples of the main hydrofoil control surfaces 134 on the main hydrofoil 130 are operated in a similar manner as the flaps 118 and ailerons 120 on the main wing 104 of the craft 100. In some examples, lowering the control surfaces 134 to extend below the main hydrofoil 130 changes the hydrodynamic shape of the main hydrofoil 130 in a manner that generates additional lift on the main hydrofoil 130, similar to the aerodynamic effect of lowering the flaps 118. In some examples, asymmetrically raising one or more of the control surfaces 134 (e.g., raising a control surface 134 on only one side of the main hydrofoil 130) changes the hydrodynamic shape of the main hydrofoil 130 in a manner that generates a roll force on the main hydrofoil 130, similar to the aerodynamic effect of raising one of the ailerons 120.

Likewise, some examples of the rear hydrofoil control surfaces 140 include one or more hinged surfaces on a trailing or leading edge of the rear hydrofoil 136 as well as one or more actuators, which are operated by the control system of the craft 100 to rotate the hinged surfaces so that they extend above or below the rear hydrofoil 136. In some examples, the rear hydrofoil control surfaces 140 on the rear hydrofoil 136 are operated in a similar manner as the elevators 126 on the tail 106 of the craft 100. In some examples, lowering the control surfaces 140 to extend below the rear hydrofoil 136 changes the hydrodynamic shape of the rear hydrofoil 136 in a manner that causes the craft 100 to pitch downwards, similar to the aerodynamic effect of lowering the elevators 126. In some examples, raising the control surfaces 140 to extend above the rear hydrofoil 136 changes a hydrodynamic shape of the rear hydrofoil 136 in a manner that causes the craft 100 to pitch upwards, similar to the aerodynamic effect of raising the elevators 126.

In some examples, one or both of the main hydrofoil control surfaces 134 or the rear hydrofoil control surfaces 140 include rudder-like control surfaces similar to the rudder 128 on the tail 106 of the craft 100. For instance, some examples of the main hydrofoil control surfaces 134 include one or more hinged surfaces on a trailing edge of the main hydrofoil strut 132 as well as one or more actuators, which are operated by the control system of the craft 100 to rotate the hinged surfaces so that they extend to the left or right of the main hydrofoil strut 132. Similarly, some examples of the rear hydrofoil control surfaces 140 include one or more hinged surfaces on a trailing edge of the rear hydrofoil strut 138 as well as one or more actuators, which are operated by the control system of the craft 100 in order to rotate the hinged surfaces so that they extend to the left or right of the rear hydrofoil strut 138. In some examples, actuating the main hydrofoil control surfaces 134 or the rear hydrofoil control surfaces 140 in this manner changes the hydrodynamic shape of the main hydrofoil strut 132 or the rear hydrofoil strut 138, respectively, which facilitates controlling the yaw of the craft 100 when operating in a waterborne or hydrofoil-borne mode, similar to the effect of actuating the rudder 128 of the craft 100, as described above.

In some examples, instead of (or in addition to) actuating hinged control surfaces on the main hydrofoil 130 and/or the rear hydrofoil 136, a control system of the craft 100 actuates the entire main hydrofoil 130 and/or the entire rear hydrofoil 136 themselves. In some examples, the craft 100 includes one or more actuators for rotating the main hydrofoil 130 and/or the rear hydrofoil 136 around the yaw axis. In some examples, the craft 100 includes one or more actuators for controlling the angle of attack of the main hydrofoil 130 and/or the rear hydrofoil 136 (i.e., rotating the main hydrofoil 130 and/or the rear hydrofoil 136 around the pitch axis). Some examples of the craft 100 include one or more actuators for rotating the main hydrofoil 130 and/or the rear hydrofoil 136 around the roll axis. Some examples of the craft 100 include one or more actuators for changing a camber or shape of the main hydrofoil 130 and/or the rear hydrofoil 136. Some examples of the craft 100 include one or more actuators for flapping the main hydrofoil 130 and/or the rear hydrofoil 136 to help propel the craft 100 forward or backward. Other examples are possible as well.

Further, some examples of the craft 100 dynamically control an extent to which the main hydrofoil 130 and/or the rear hydrofoil 136 are deployed based on an operational mode (e.g., hull-borne, hydrofoil-borne, or wing-borne modes) of the craft 100. For instance, in some examples, during hull-borne mode, the rear hydrofoil assembly 110 is partially deployed or retracted to increase turning authority. The amount of partial deployment or retraction may be a function of the desired overall vehicle draft when operating in a shallow water environment. In some examples, during hydrofoil-borne mode, the main hydrofoil assembly 108 is partially retracted to reduce the distance between the hull of the vehicle and the water's surface. This increases the amount of lift generated by the main wing 104 by operating the wing closer to the surface of the water, increasing the effects of the aerodynamic ground effect.

As noted above, some examples of the main hydrofoil assembly 108 and rear hydrofoil assembly 110 interface with a deployment system that facilitates retracting the respective hydrofoil assemblies 108, 110 into or toward the hull 102 for hull-borne or wing-borne operation and for extending the respective hydrofoil assemblies 108, 110 below the hull 102 for hydrofoil-borne operation. As described further below, in some embodiments, the deployment system is used in connection with extending, retracting, and/or otherwise controlling the positioning of the hydrofoil assemblies 108, 110 during takeoff when the craft is transitioning from hydrofoil-borne operation to wing-borne operation.

E. Battery System

Figure 2:
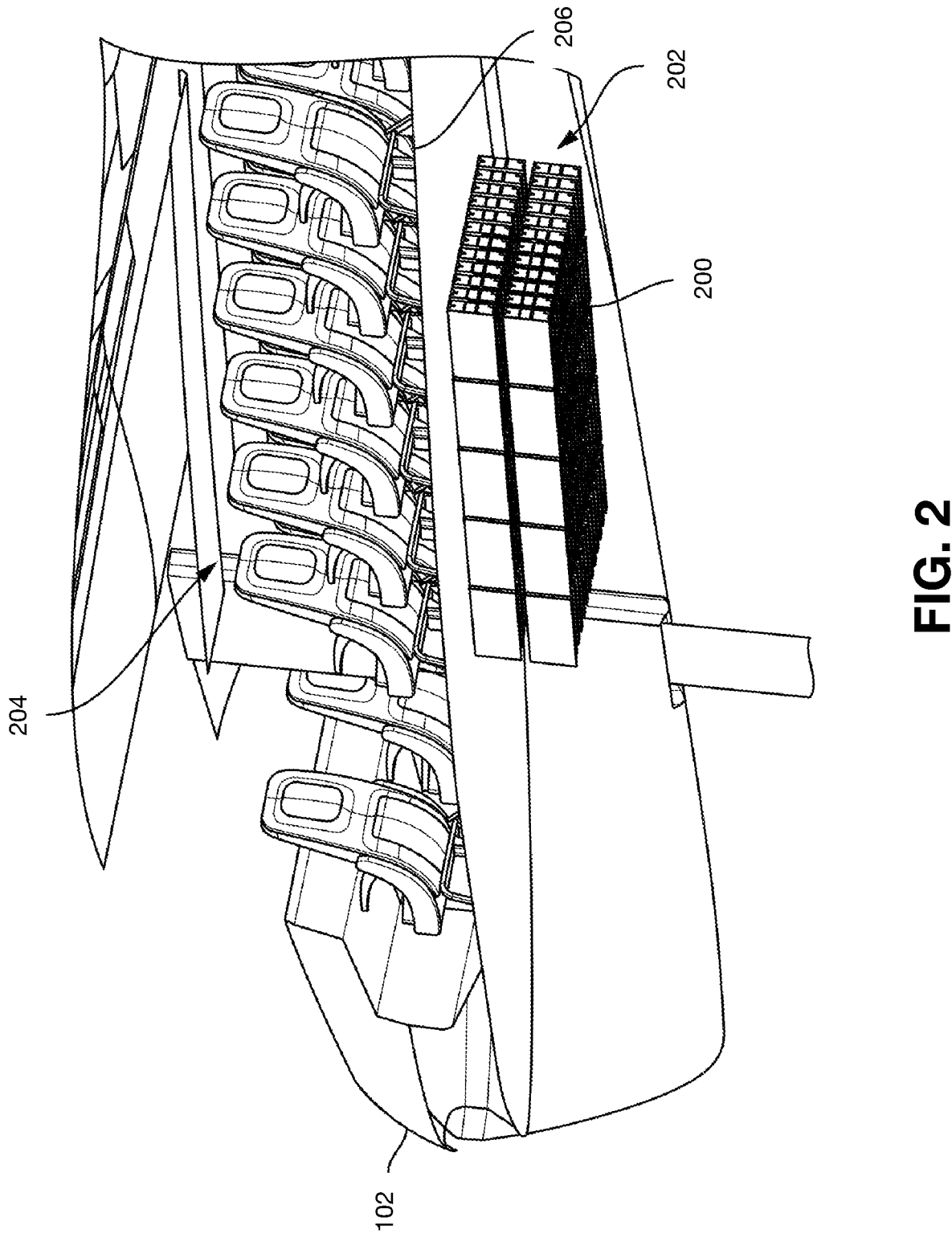
FIG. 2 illustrates a battery system of a craft, in accordance with example embodiments

FIG. 2 illustrates an example of an onboard battery system. In some examples, the battery system 200 is arranged in a protected area 202 of the hull 102 below a passenger seating area 204. Some examples of the battery system 200 are separated from the passenger seating area 204 by a firewall 206 to protect the passengers from harm if a thermal runaway occurs. In this regard, some examples of the craft 100 include a battery management system comprising voltage, current, and/or thermal sensors for detecting thermal runaway or some other fire detection system for detecting a fire in the protected area 202.

Some examples of the craft 100 include one or more mechanisms for flooding the battery system 200 (e.g., with an inert gas fire, with water, etc.) upon detecting a thermal runaway or a fire in the protected area 202. For instance, some examples of the hull 102 comprise one or more valves or other controllable openings. The control system of the craft 100 is configured to open the valves and/or controllable openings upon detecting a fire in the protected area 202 or thermal runaway in the battery system 200 to allow water to enter the protected area 202 and to extinguish or prevent a fire in the protected area 202.

In some examples, the battery system 200 is configured to be jettisoned through one or more of the controllable openings in the hull 102 described above. In this regard, in some examples, the weight of the battery system 200 is sufficient to jettison the battery system 200 out of the hull 102 when the hull 102 is opened. In some examples, the craft 100 comprises an actuator or the like configured to jettison the battery system 200 out of the hull 102.

In other examples, the craft 100 may take measures to become waterborne in response to detecting a fire in the protected area 202 or thermal runaway in the battery system 200. Some examples of the control system of the craft 100 determine a fire suppression operation to perform based on the operational state of the craft 100 (e.g., operating in hull-borne, hydrofoil-borne, or wing-borne mode). For instance, when operating in hull-borne mode and upon detecting a thermal runaway or a fire in the protected area 202, some examples of the control system are configured to flood the battery system 200 as described above. When operating in hydrofoil-borne or a wing-borne mode, the control system is configured to cause the craft 100 to transition to hull-borne mode upon detecting a thermal runaway or a fire in the protected area 202 and then flood the battery system 200.

F. Hydrofoil Deployment Systems

Figure 3:
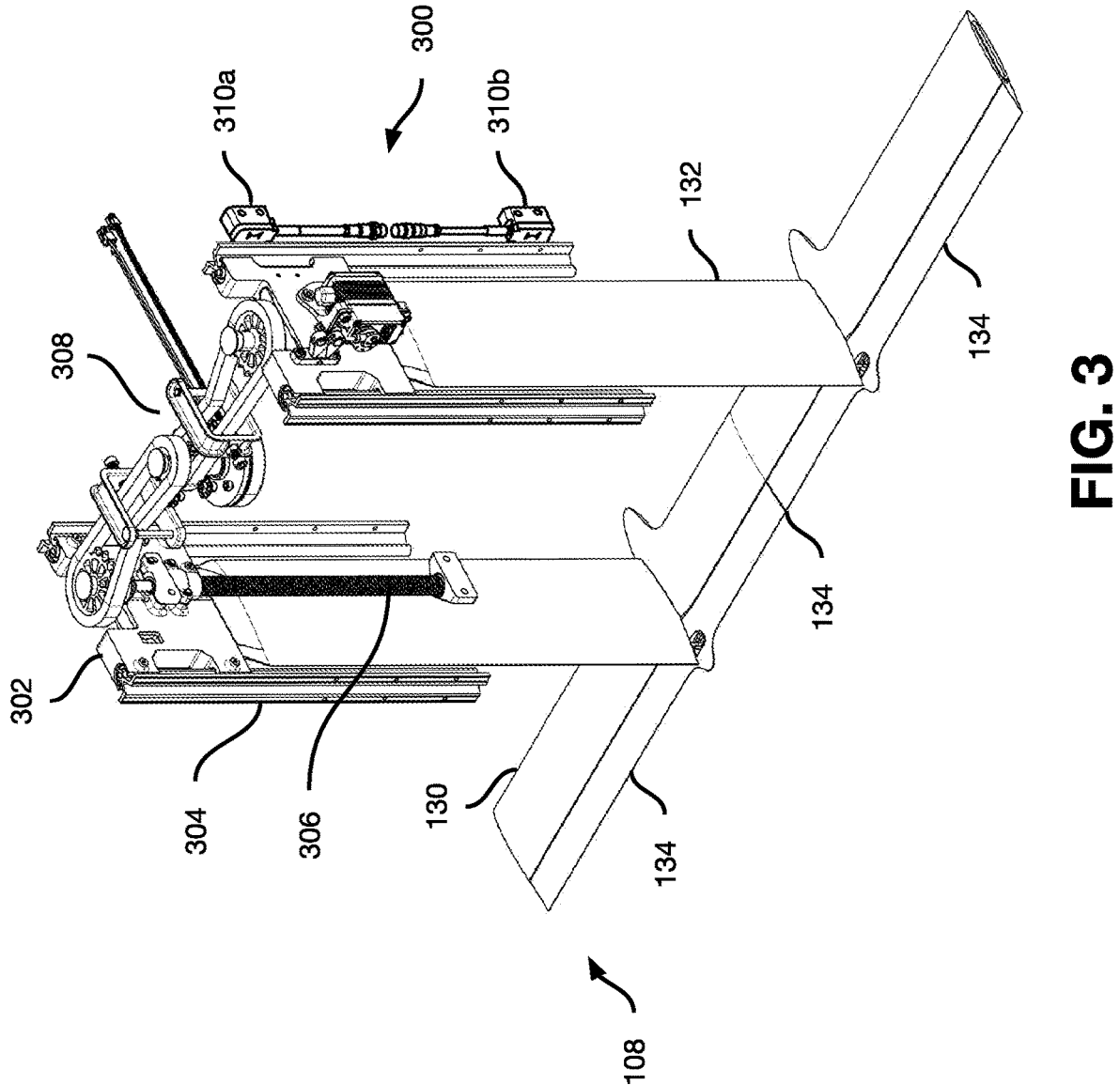
FIG. 3 illustrates a main hydrofoil deployment system of a craft, in accordance with example embodiments.

FIG. 3 illustrates an example of a main hydrofoil deployment system 300 that facilitates retracting and extending of the main hydrofoil assembly 108. As shown, some examples of the main hydrofoil deployment system 300 take the form of a linear actuator that includes one or more brackets 302 that couple the main hydrofoil assembly 108 (by way of the main hydrofoil struts 132) to one or more vertical tracks 304. Some examples of the brackets 302 are configured to move vertically along the tracks 304, such that when the brackets 302 move vertically along the tracks 304, the main hydrofoil assembly 108 likewise moves vertically. Some examples of the brackets 302 are coupled to a leadscrew 306 that, when rotated, causes vertical movement of the brackets 302. Some examples of the leadscrew 306 are rotatable by any of various sources of torque, such as an electric motor coupled to the leadscrew 306 by a gear assembly 308.

Some examples of the main hydrofoil deployment system 300 further include one or more sensors 310 configured to detect a vertical position of the main hydrofoil assembly 108. As shown, the sensors 310 include a first sensor 310a that senses when the main hydrofoil assembly 108 has reached a fully retracted position and a second sensor 310b that senses when the main hydrofoil assembly 108 has reached a fully extended position. However, the main hydrofoil deployment system 300 may include additional sensors for detecting additional discrete positions or continuous positions of the main hydrofoil assembly 108. Some examples of the sensors 310 are included as part of, or otherwise configured to communicate with, the control system of the craft 100 to provide the control system with data that indicates the position of the main hydrofoil assembly 108. Some examples of the control system use this data to determine whether to operate the electric motor to retract or extend the main hydrofoil assembly 108.

In some examples, such as examples where the linear actuator is not a self-locking linear actuator, the main hydrofoil deployment system 300 includes a locking or braking mechanism for holding the main hydrofoil struts 132 in a fixed position (e.g., in a fully retracted or fully extended position). An example of the locking mechanism corresponded to a dual-action mechanical brake that is coupled to the electric motor, the leadscrew 306, or the gear assembly 308.

While the above description provides various details of an example main hydrofoil deployment system 300, it should be understood that the main hydrofoil deployment system 300 illustrated in FIG. 3 is for illustrative purposes and is not meant to be limiting. For instance, the main hydrofoil deployment system 300 may include any of various linear actuators now known or later developed that are capable of retracting and extending the main hydrofoil assembly 108.

Figure 4A:
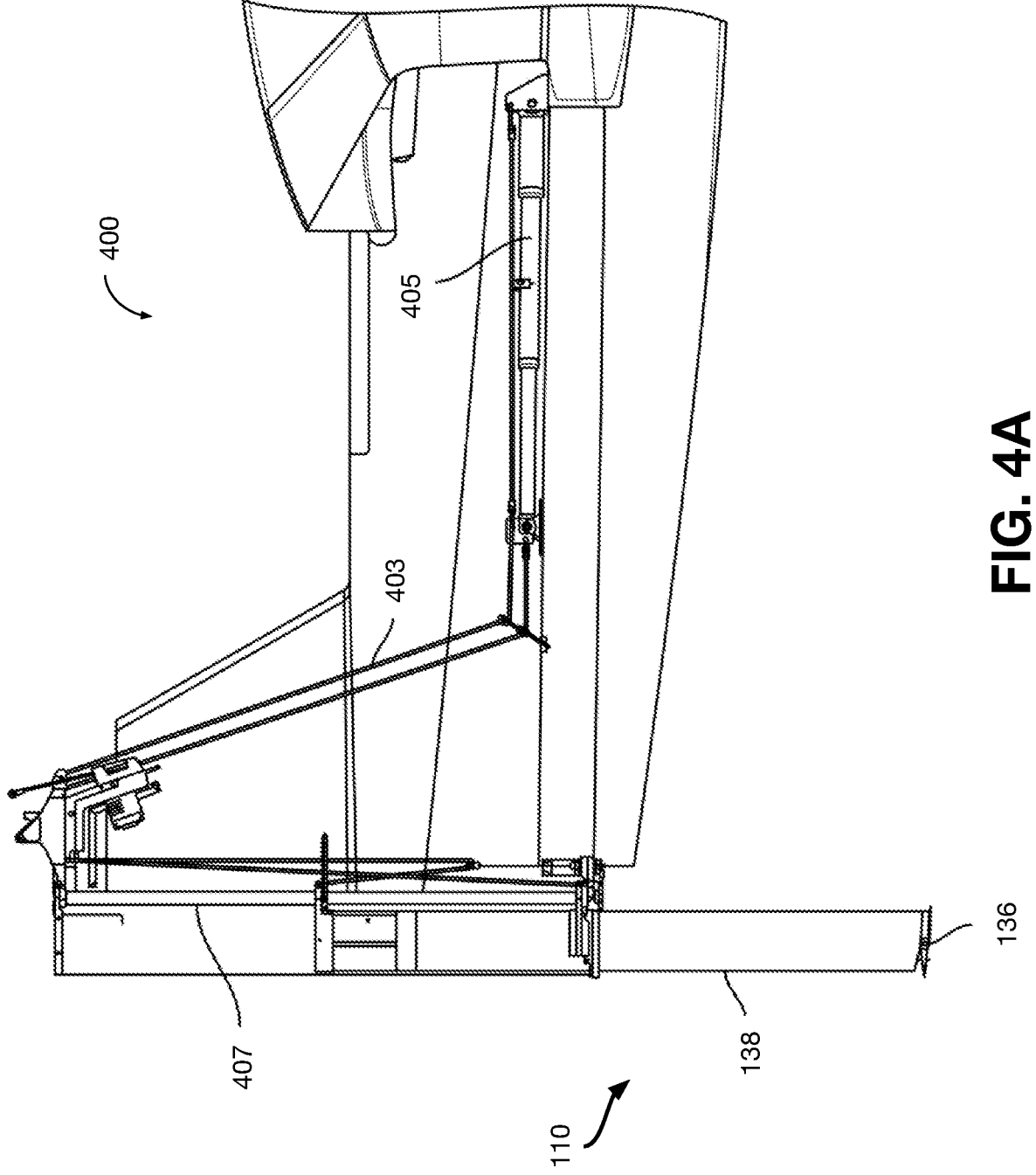
FIG. 4A illustrates a rear hydrofoil deployment system of a craft, in accordance with example embodiments.
Figure 4B:
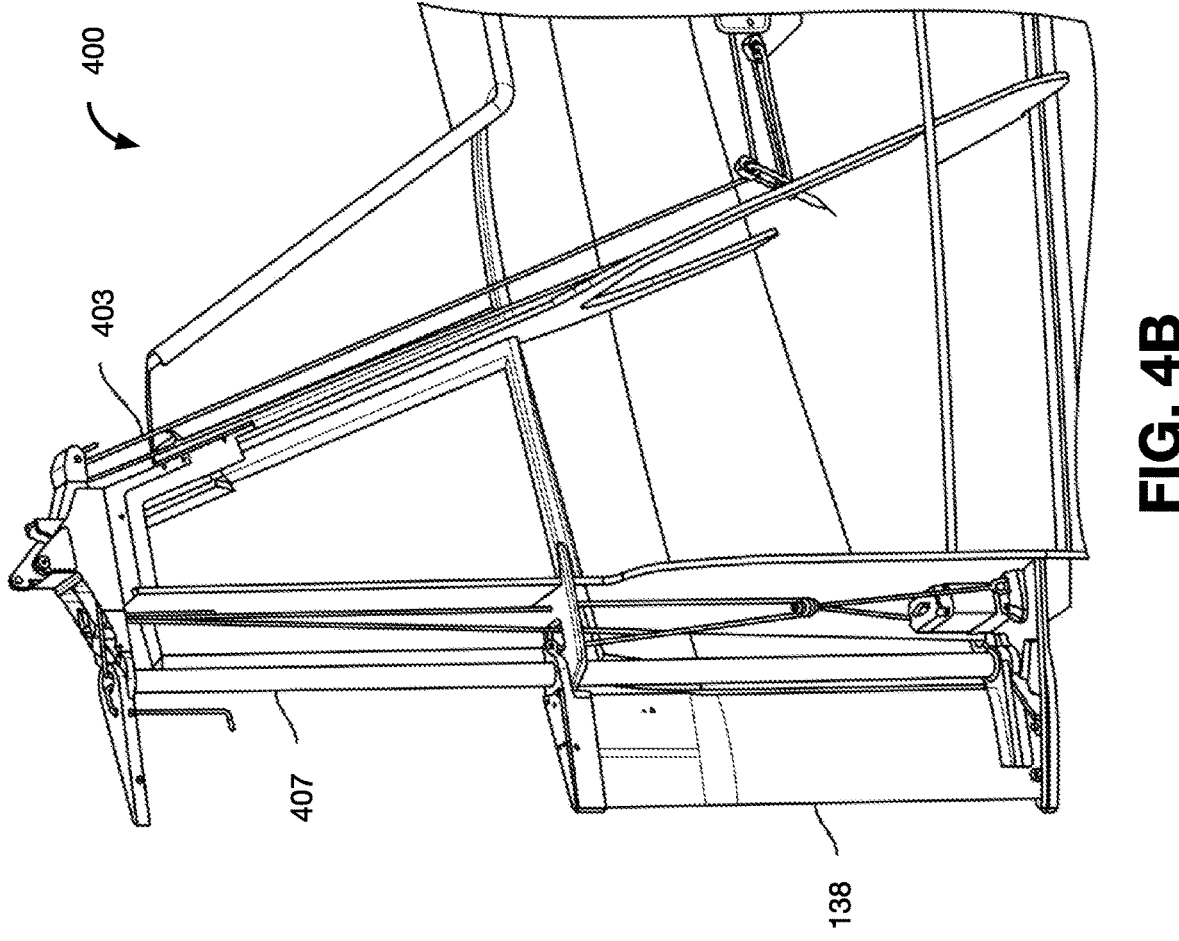
FIG. 4B illustrates the rear hydrofoil deployment system of a craft, in accordance with example embodiments.

FIGS. 4A and 4B illustrate an example of a rear hydrofoil deployment system 400 that facilitates retracting and extending the rear hydrofoil 136. As shown, some examples of the rear hydrofoil deployment system 400 include a pulley system 403 that couples an actuator 405 to the rear hydrofoil strut 138. When actuated, the actuator 405 causes the pulley system 403 to raise or lower the rear hydrofoil strut 138 by causing the rear hydrofoil strut 138 to slide vertically along a shaft 407. While not illustrated in FIGS. 4A and 4B, in some examples, the rudder 128 is mounted to the shaft 407 such that, when the actuator 405 raises the rear hydrofoil strut 138, the rear hydrofoil strut 138 retracts at least partially into the rudder 128. Additionally, some examples of the rear hydrofoil deployment system 400 include one or more servo motors configured to rotate the rear hydrofoil strut 138 around the shaft. In this respect, in some examples, the rear hydrofoil strut 138 is rotated around the shaft to act as a hydro-rudder when submerged in water or to act as an aero-rudder when out of the water. Further, because the rudder 128 is mounted to the same shaft 407 as the rear hydrofoil strut 138 and the rear hydrofoil strut 138 can be retracted into the rudder 128, the same servo motor can also be used to control the rotation of the rudder 128.

The actuator 405 of the rear hydrofoil deployment system 400 may take various forms and may, for instance, include any of various linear actuators now known or later developed that are capable of retracting and extending the rear hydrofoil assembly 110. Further, in some examples, the actuator 405 has a non-unitary actuation ratio such that a given movement of the actuator 405 causes a larger corresponding induced movement of the rear hydrofoil assembly 110. This can help allow for faster retractions of the rear hydrofoil assembly 110, which may be beneficial during takeoff, as described in further detail below.

Some examples of the main hydrofoil assembly 108 and/or the rear hydrofoil assembly 110 are configured such that, when fully retracted, the hydrofoil assembly is flush, conformal, or tangent to the hull 102. For instance, some examples of the hull 102 include one or more recesses configured to receive the main hydrofoil assembly 108 and/or the rear hydrofoil assembly 110. In this regard, some examples of the main hydrofoil assembly 108 and/or the rear hydrofoil assembly 110 have a shape such that when the main hydrofoil assembly 108 and/or the rear hydrofoil assembly 110 are fully retracted into the recesses of the hull 102, the outer contour of the hull 102 forms a substantially smooth transition at the intersection of the hull 102 and the main hydrofoil assembly 108 and/or the rear hydrofoil assembly 110.

Other examples of the main hydrofoil assembly 108 and/or the rear hydrofoil protrude slightly below the hull 102 when retracted. These examples of the main hydrofoil assembly 108 and/or the rear hydrofoil assembly 110 are configured to have a non-negligible effect on the aerodynamics of the craft 100. Some examples of the craft 100 are configured to leverage these effects to provide additional control of the craft 100. For instance, in some examples, when the main hydrofoil assembly 108 and/or the rear hydrofoil assembly 110 are retracted but still exposed, the exposed hydrofoil is manipulated in flight to impart forces and moments on the craft 100 similar to an aero-control surface.

Some examples of the hydrofoil assemblies 108, 110 disclosed herein are mounted on a pivot that is locked underwater but is unlocked to allow the hydrofoil to move around the pivot in the air. At that point, the control surfaces act like trim tabs and are able to effect movement of the entire unlocked, pivoting hydrofoil, which would otherwise require impractically large and heavy servo motors. This configuration facilitates unlocking and moving of the hydrofoil using a slow servo and/or a combination of control surface movement combined with forward movement through water, and then re-locked such that the hydrofoil is at a selected angle of incidence.

As noted above, some examples of the main hydrofoil assembly 108 are configured to be retractable. Some examples of the hull 102 include openings through which the struts 132 of the main hydrofoil assembly 108 are retracted and extended. Some examples of the hull 102 are configured to isolate water that enters through these openings (e.g., when the hull 102 contacts the water surface) and to allow for the water to drain from the hull 102 after the hull 102 is lifted out of the water. For instance, some examples of the hull 102 include pockets 142 on each side of the hull 102 aligned above the struts 132. Some examples of the pockets 142 are isolated from the remainder of the interior of the hull 102 so that water that accumulates in the pockets 142 does not reach any undesired areas (e.g., the cockpit, passenger seating area, areas that house the battery system 200, components of the control system of the craft 100, etc.). Further, some examples of the pockets 142 include venting holes or other openings located at or near the bottom of the pockets 142. The venting openings are configured to allow water that enters the pockets 142 to vent out of the pockets 142 when the hull 102 is lifted out of the water.

Some examples of the main hydrofoil assembly 108 and/or the rear hydrofoil assembly 110 include one or more propellers for additional propulsion when submerged underwater. For instance, in some examples, one or more propellers are mounted to the main hydrofoil 130 and/or the rear hydrofoil 136. In some examples, the propellers are configured to provide additional propulsion force to the craft 100 during hydrofoil-borne or hull-borne operation.

In some examples, propellers are mounted to the hull 102. The propellers are submerged during hull-borne operation. In some examples, the propellers are configured to provide additional propulsion force to the craft 100 during hull-borne operation.

Some examples of the main and/or rear hydrofoil assemblies 108 110 include various failsafe mechanisms in case of malfunction. For instance, in some examples, when one or both of the main and rear hydrofoil deployment systems 300, 400 cannot be retracted due to a malfunction, the craft 100 is configured to jettison the malfunctioning assembly. In this regard, some examples of the main and/or rear hydrofoil assemblies 108, 110 are coupled to the hull 102 by a releasable latch. Some examples of the control system of the craft 100 are configured to identify a retraction malfunction (e.g., based on data received from the positional sensors 310) and responsively open the latch to release the connection between the hull 102 and the malfunctioning hydrofoil assembly. In some examples, the weight of the malfunctioning hydrofoil assembly is sufficient to jettison the malfunctioning hydrofoil assembly out of the hull 102 when the latch is opened. Some examples of the craft 100 include an actuator or some other mechanism to jettison the malfunctioning hydrofoil assembly out of the hull 102. In some examples, the main and/or rear hydrofoil assemblies 108, 110 are configured to break in a controlled manner upon impact with water. For instance, in some examples, a joint between the main hydrofoil struts 132 and the hull 102 and/or a joint between the rear hydrofoil struts 138 and the hull 102 is configured to disconnect when subjected to a torque significantly larger than standard operational torques at the joints. Other designs for providing controlled breaks are possible as well.

G. Control System

Figure 5:
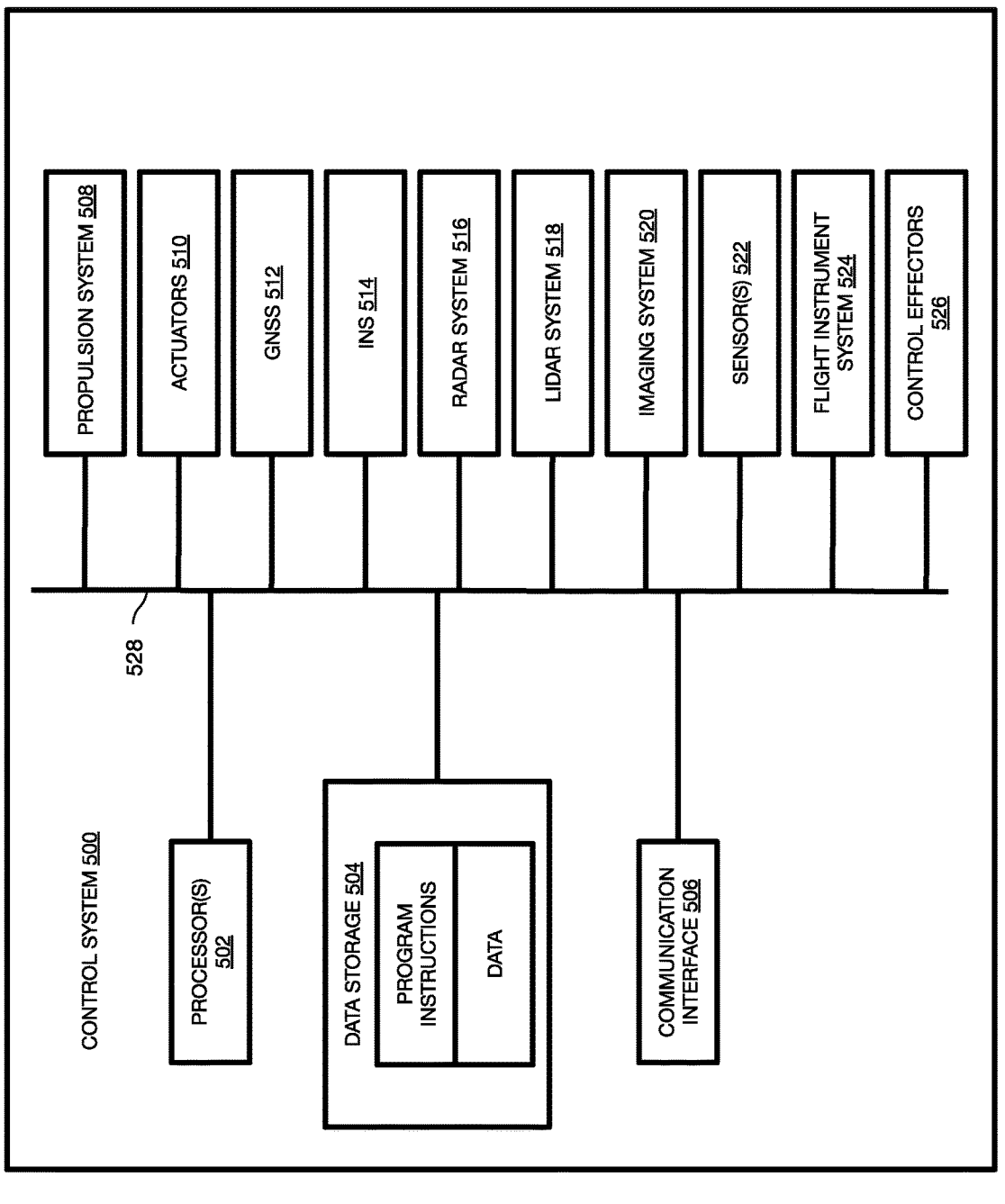
FIG. 5 illustrates a control system of a craft, in accordance with example embodiments.

FIG. 5 illustrates an example of a control system 500 of the craft 100. As shown, some examples of control system 500 include one or more processors 502, data storage 504, a communication interface 506, a propulsion system 508, actuators 510, a Global Navigation Satellite System (GNSS) 512, an inertial navigation system (INS) 514, a radar system 516, a lidar system 518, an imaging system 520, various sensors 522, a flight instrument system 524, and flight controls 526. In some examples, some or all of these components communicate with one another via one or more communication links 528 (e.g., a system bus, a public, private, or hybrid cloud communication network, etc.)

Some examples of processors 502 correspond to or comprise general-purpose processors (e.g., a single- or multi-core microprocessor), special-purpose processors (e.g., an application-specific integrated circuit or digital-signal processor), programmable logic devices (e.g., a field-programmable gate array), controllers (e.g., microcontrollers), and/or any other processor components now known or later developed. Further, while the one or more processors 502 are illustrated as a separate stand-alone component of the control system 500, it should also be understood that the one or more processors 502 could comprise processing components that are distributed across one or more of the other components of the control system 500.

Some examples of the data storage 504 comprise one or more non-transitory computer-readable storage mediums that are collectively configured to store (i) program instructions executable by the one or more processors 502 such that the control system 500 is configured to perform some or all of the functions disclosed herein, and (ii) data that may be received, derived, or otherwise stored, for example, in one or more databases, file systems, or the like, by the control system 500 in connection with the functions disclosed herein. In this respect, the one or more non-transitory computer-readable storage mediums of data storage 504 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. Further, while the data storage 504 is illustrated as a separate stand-alone component of the control system 500, it should also be understood that the data storage 504 may comprise computer-readable storage mediums that are distributed across one or more of the other components of the control system 500.

Some examples of the communication interface 506 include one or more wireless interfaces and/or one or more wireline interfaces, which allow the control system 500 to communicate via one or more networks. Some example wireless interfaces provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Some example wireline interfaces include an Ethernet interface, a Universal Serial Bus (USB) interface, CAN Bus, RS-485, or similar interface to communicate via a wire, a twisted pair of wires, a coaxial cable, an optical link, a fiber-optic link, or other physical connection to a wireline network.

Some examples of the propulsion system 508 include one or more electronic speed controllers (ESCs) for controlling the electric motor propeller assemblies 116 distributed across the main wing 104 and, in some examples, across the horizontal stabilizer 124. Some examples of the propulsion system 508 include a separate ESC for each respective propeller assembly 116, such that the control system 500 individually controls the rotational speeds of the electric motor propeller assemblies 116.

Some examples of the actuators 510 include any of the actuators described herein, including (i) actuators for raising and lowering the flaps 118, ailerons 120, elevators 126, main hydrofoil control surfaces 134, and rear hydrofoil control surfaces 140, (ii) actuators for turning the rudder 128, the main hydrofoil control surfaces 134 positioned on the main hydrofoil struts 132, and the rear hydrofoil control surfaces 140 positioned on the rear hydrofoil strut 138, (iii) actuators for retracting and extending the main hydrofoil assembly 108 and the rear hydrofoil assembly 110, and/or (iv) actuators for performing the various other disclosed actuations of the main hydrofoil assembly 108 and the rear hydrofoil assembly 110. Each of the actuators described herein may include any actuators now known or later developed capable of performing the disclosed actuation. Some examples of the actuators correspond to linear actuators, rotary actuators, hydraulic actuators, pneumatic actuators, electric actuators, electro-hydraulic actuators, and mechanical actuators. Some examples of the actuators correspond to electric motors, stepper motors, and hydraulic cylinders. Other examples are contemplated herein as well.

Some examples of the GNSS system 512 are configured to provide a measurement of the location, speed, altitude, and heading of the craft 100. The GNSS system 512 includes one or more radio antennas paired with signal processing equipment. Data from the GNSS system 512 may allow the control system 500 to estimate the position and speed of the craft 100 in a global reference frame, which can be used for route planning, operational envelope protection, and vehicle traffic deconfliction by both understanding where the craft 100 is located and comparing the location with known traffic.

Some examples of the INS 514 include motion sensors, such as angular and/or linear accelerometers, and rotational sensors, such as gyroscopes, to calculate the position, orientation, and speed of the craft 100 using dead reckoning techniques. In some examples, one or more of these components are used by the control system to calculate actuator outputs to stabilize or otherwise control the vehicle during all modes of operation.

Some examples of the radar system 516 include a transmitter and a receiver. The transmitter may transmit radio waves via a transmitting antenna. The radio waves reflect off an object and return to the receiver. The receiver receives the reflected radio waves via a receiving antenna, which may be the same antenna as the transmitting antenna, and the radar system 516 processes the received radio waves to determine information about the object's location and speed relative to the craft 100. This radar system 516 may be utilized to detect, for example, the water surface, maritime or wing-borne vehicle traffic, wildlife, or weather.

Some examples of the lidar system 518 comprise a light source and an optical receiver. The light source emits a laser that reflects off an object and returns to the optical receiver. The lidar system 518 measures the time for the reflected light to return to the receiver to determine the distance between the craft 100 and the object. This lidar system 518 may be utilized by the flight control system to measure the distance from the craft 100 to the surface of the water in various spatial measurements.

Some examples of the imaging system 520 include one or more still and/or video cameras configured to capture image data from the environment of the craft 100. Some examples of the cameras correspond to or comprise charge-coupled device (CCD) cameras, complementary metal-oxide-semiconductor (CMOS) cameras, short-wave infrared (SWIR) cameras, mid-wave infrared (MWIR) cameras, or long-wave infrared (LWIR) cameras. Some examples of the imaging system 520 are configured to perform obstacle avoidance, localization techniques, water surface tracking for more accurate navigation (e.g., by applying optical flow techniques to images), video feedback, and/or image recognition and processing among other possibilities.

As noted above, some examples of the control system 500 include various other sensors 522 for use in controlling the craft 100. Examples of such sensors 522 correspond to or comprise thermal sensors or other fire detection sensors for detecting a fire in the hull 102 or for detecting thermal runaway in the battery system 200. As further described above, the sensors 522 may include position sensors for sensing the position of the main hydrofoil assembly 108 and/or the rear hydrofoil assembly 110 (e.g., sensing whether the assemblies are in a retracted or extended position). Examples of position sensors may include photodiode sensors, capacitive displacement sensors, eddy-current sensors, Hall effect sensors, inductive sensors, or any other position sensors now known or later developed.

Some examples of the sensors 522 facilitate determining the altitude of the craft 100. For instance, some examples of the sensor 522 include an ultrasonic altimeter configured to emit and receive ultrasonic waves. The emitted ultrasonic waves reflect off the water surface below the craft 100 and return to the altimeter. The ultrasonic altimeter measures the time for the reflected ultrasonic wave to return to the altimeter to determine the distance between the craft 100 and the water surface. Some examples of the sensor 522 include a barometer for use as a pressure altimeter. The barometer measures the atmospheric pressure in the environment of the craft 100 and determines the altitude of the craft 100 based on the measured pressure. Some examples of the sensor 522 include a radar altimeter to emit and receive radio waves. The radar altimeter measures the time for the radio wave to reflect off of the surface of the water below the craft 100 to determine a distance between the craft 100 and the water surface. In some examples, these sensors are placed in different locations on the craft 100 to reduce the impact of sensor constraints, such as sensor deadband or sensitivity to splashing water.

Some examples of the control system 500 are configured to use one or more of the sensors 522 or other components of the control system 500 to help navigate the craft 100 through maritime traffic or to avoid any other type of obstacle. For example, some examples of the control system 500 determine the position, orientation, and speed of the craft 100 based on data from the INS 514 and/or the GNSS 512, and the control system 500 may determine the location of an obstacle, such as a maritime vessel, a dock, or various other obstacles, based on data from the radar system 516, the lidar system 518, and/or the imaging system 520. Some examples of the control system 500 determine the location of an obstacle using the Automatic Identification System (AIS). Some examples of the control system 500 are configured to maneuver the craft 100 to avoid collision with an obstacle based on the determined position, orientation, and speed of the craft 100 and the determined location of the obstacle by actuating various control surfaces of the craft 100 in any of the manners described herein.

Some examples of the flight instrument system 524 include instruments for providing data about the altitude, speed, heading, orientation (e.g., yaw, pitch, and roll), battery levels, or any other information provided by the various other components of the control system 500.

Some examples of the flight controls 526 include one or more joysticks, thrust control levers, buttons, switches, dials, levers, or touch screen displays, etc. In operation, a pilot may use the flight controls 526 to operate one or more control surfaces (e.g., flaps, ailerons, elevators, rudder, pro- TABLE 1-continued

| Control Surface | Hull-borne | Foil-borne | Wing-borne |
|---|---|---|---|
| Aerodynamic Rudder | Y | Y | Y |
| Aerodynamic Flaps | N | Y | Y |
| Hydrodynamic Elevator | Y | Y | N |
| Hydrodynamic Flaps | Y | Y | N |
| Hydrodynamic Rudder | Y | Y | N |

In some examples, the propulsion control surfaces in the table include the propeller assembly 116, as well as any propellers mounted to the hull 102, main hydrofoil assembly 108, or rear hydrofoil assembly 110. In some examples, the aerodynamic elevator control surfaces include elevator 126, the aerodynamic ailerons include ailerons 120, the aerodynamic rudder includes rudder 128 (when not submerged), the aerodynamic flaps include flaps 118, the hydrodynamic elevator includes rear hydrofoil control surfaces 140, the hydrodynamic flaps include main hydrofoil control surfaces 134, and the hydrodynamic rudder includes rudder 128 (when submerged).

In some examples, when actuating the control surfaces in the various example, operational modes identified in Table 1 above, the control system 500 executes different levels of stabilization along the various vehicle axes during different modes of operation. Table 2 below identifies examples of stabilization controls that the control system 500 applies during the various modes of operation for each axis of the craft 100. Closed-loop control may comprise feedback and/or feed-forward control.

TABLE 2

| Vehicle Axis | Hull-borne | Foil-borne | Wing-borne |
|---|---|---|---|
| Pitch Axis | None | Closed-loop control on vehicle ride height | Closed-loop control on vehicle altitude |
| Roll Axis | None | Closed-loop control around vehicle bank angle = 0 | Stabilization and closed-loop control on heading |
| Yaw Axis | Rate stabilization | Closed-loop control on vehicle heading | Closed-loop control on vehicle heading |
| Speed Control | Closed-loop control on vehicle GPS Speed | Closed-loop control on vehicle GPS Speed | Closed-loop control on vehicle airspeed | pulsion props, etc.) of the craft 100 to thereby maneuver the craft 100 (e.g., control the direction, speed, altitude, etc., of the craft 100)

In some examples, the combinations of control surfaces on the craft 100 used by the control system 500 to control operations of the craft 100 depends on the mode of operation of the craft 100 and is determined based at least in part on aspects such as vehicle position, speed, attitude, acceleration, rotational rates, and/or altitude above water. Table 1 summarizes an example of the relationship between the control surfaces and the operation mode.

TABLE 1

| Control Surface | Hull-borne | Foil-borne | Wing-borne |
|---|---|---|---|
| Propulsion | Y | Y | Y |
| Aerodynamic Elevator | N | Y | Y |
| Aerodynamic Ailerons | N | Y | Y |

Further, in some examples, the control system 500 is configured to actuate different control surfaces to control the movement of the craft 100 about its different axes. Table 3 below identifies example axial motions that are affected by the various control surfaces of the craft 100.

TABLE 3

| Control Surface | Axis Control Function |
|---|---|
| Propulsion | (a) accelerate and decelerate the vehicle<br>(b) turn the vehicle about yaw axis<br>(c) create a rolling moment |
| Aerodynamic Elevator | (a) create a pitch up or pitch down moment |
| Aerodynamic Ailerons | (a) create a rolling moment<br>(b) increase lift on aerodynamic wing<br>(c) create a pitch-down moment |
| Aerodynamic Rudder | (a) create a yawing moment |
| Aerodynamic Flaps | (a) increase lift on aerodynamic wing<br>(b) create a pitch-down moment |
| Hydrodynamic Elevator | (a) create a pitch moment<br>(b) generate heave force on rear hydrofoil |

TABLE 3-continued

| Control Surface | Axis Control Function |
|---|---|
| Hydrodynamic Flaps | (a) generate heave force on main hydrofoil |
| Hydrodynamic Rudder | (a) create a yaw moment |

III. Example Modes of Operation

A. Hull-Borne Operation

Figure 6A:
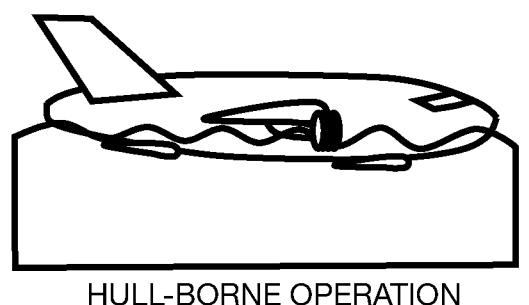
FIG. 6A illustrates a craft in a hull-borne mode of operation, in accordance with example embodiments.

FIG. 6A illustrates an example of the craft 100 when the craft 100 is operating in a hull-borne mode. During this mode, the craft 100 is docked and floating on the hull 102, with the buoyancy of the outriggers 114 providing for roll stabilization of the craft 100. While docked, the battery system 200 of the craft 100 may be charged. In some examples, rapid charging is aided by an open or closed-loop water-based cooling system. In some examples, the surrounding body of water is used in the loop or as a heat sink. In some examples, the craft 100 includes a heat sink integrated into the hull 102 for exchanging heat from the battery system 200 to the surrounding body of water. In other examples, the heat sink is located offboard in order to reduce the mass of the craft 100.

Additionally, in some examples, the propeller assemblies 116 are folded in a direction away from the dock while the craft 100 is docked to help avoid collision with nearby structures or people. This folding may be actuated in various ways, such as by metal spring force, hydraulic pressure, electromechanical actuation, or centrifugal force due to propeller rotation. Other examples are possible as well. Further, in some examples, the main hydrofoil assembly 108 and the rear hydrofoil assembly 110 are retracted (or partially retracted) to avoid collisions with nearby underwater structures.

In some examples, when the craft 100 is ready to depart, the craft 100 uses its propulsion systems, including the propeller assemblies 116 and/or the underwater propulsion system (e.g., one or more propellers mounted to the hull 102, the main hydrofoil 130, and/or the rear hydrofoil 136), to maneuver away from the dock while remaining hull-borne. In some examples, the main hydrofoil assembly 108 and the rear hydrofoil assembly 110 remain retracted (or partially retracted) during this maneuvering to reduce the risk of hitting underwater obstacles near docks or in shallow waterways. However, when there is a limited risk of hitting underwater obstacles, the craft 100 may partially or fully extend the main hydrofoil assembly 108 and/or the rear hydrofoil assembly 110. With the main hydrofoil assembly 108 and/or the rear hydrofoil assembly 110 extended, the craft 100 actuates the main hydrofoil control surfaces 134 and/or the rear hydrofoil control surfaces 140 to improve maneuverability as described above.

In some examples, at low speeds during hull-borne operation, the control system 500 controls the position and/or rotation of the craft 100 by causing all of the propeller assemblies 116 to spin at the same idle speed, but with a first subset spinning in a forward direction and a second subset spinning in a reverse direction. For instance, in some examples, the control system 500 causes propeller assemblies 116a, 116c, 116f, and 116h to idle in reverse and propeller assemblies 116b, 116d, 116e, and 116g to idle forward. In this arrangement, the control system 500 causes the craft 100 to make various maneuvers without having to change the direction of rotation of any of the propeller assemblies 116. For instance, to induce a yaw on the craft

100, in some examples, the control system 500 increases the speed of the reverse propeller assemblies on one side of the main wing 104 while increasing the speed of the forward propeller assemblies on the other side of the main wing 104 and without causing any of the propeller assemblies to transition from forward to reverse or from reverse to forward. For example, idling the propellers at a nominal RPM may allow for a faster response in generating a yaw moment on the craft 100 because the propellers required for generating the yaw moment do not have to increase from zero RPM to the desired RPM value. They can spin from the idle RPM to the desired RPM value.

B. Foil-Borne Maneuvering Operation

Figure 6B:
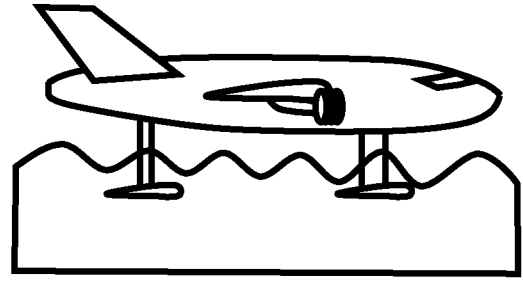
FIG. 6B illustrates a craft in a hydrofoil-borne maneuvering mode of operation, in accordance with example embodiments.

FIG. 6B illustrates an example of the craft 100 when the craft 100 is operating in hydrofoil-borne maneuvering mode. During this mode, the craft 100 is configured to, for example, move through harbors and crowded waterways at speeds generally between 20-45 mph. In this regard, the craft 100 may extend the main hydrofoil assembly 108 and the rear hydrofoil assembly 110 (if not already extended) (not shown in FIG. 6B) and accelerate using the previously described propulsion system towards a desired takeoff speed. During acceleration, the craft 100 reaches a speed at which the main hydrofoil assembly 108 and the rear hydrofoil assembly 110 alone support the weight of the craft 100, and the hull 102 is lifted above the surface of the water (e.g., by 3-5 ft) so that the hull is clear of any surface waves. After the hull 102 leaves the surface of the water, the drag forces exerted on the craft 100 drop significantly, and the amount of thrust required to maintain acceleration can be reduced. Therefore, in some examples, after the hull 102 has left the water, the control system 500 reduces the speed of the propeller assemblies 116 to lower the thrust of the craft 100.

Some examples of the control system 500 sustain this operational mode by actively controlling the pitch and speed of the craft 100 so that the main hydrofoil assembly 108 and the rear hydrofoil assembly 110 continue to entirely support the weight of the craft 100. In this regard, some examples of the control system 500 actuate the main hydrofoil control surfaces 134 and/or the rear hydrofoil control surfaces 140 and/or the propulsion system to stabilize the attitude of the craft 100 to maintain the desired height above the surface of the water, vehicle heading, and vehicle forward speed. In this regard, some examples of the control system 500 are configured to detect various changes in the yaw, pitch, or roll of the craft 100 based on data provided by the INS 514 and to make calculated actuations of the main hydrofoil control surfaces 134 and/or the rear hydrofoil control surfaces 140 to counteract the detected changes.

C. Foil-Borne Takeoff Operation

Figures 7A, 7B:
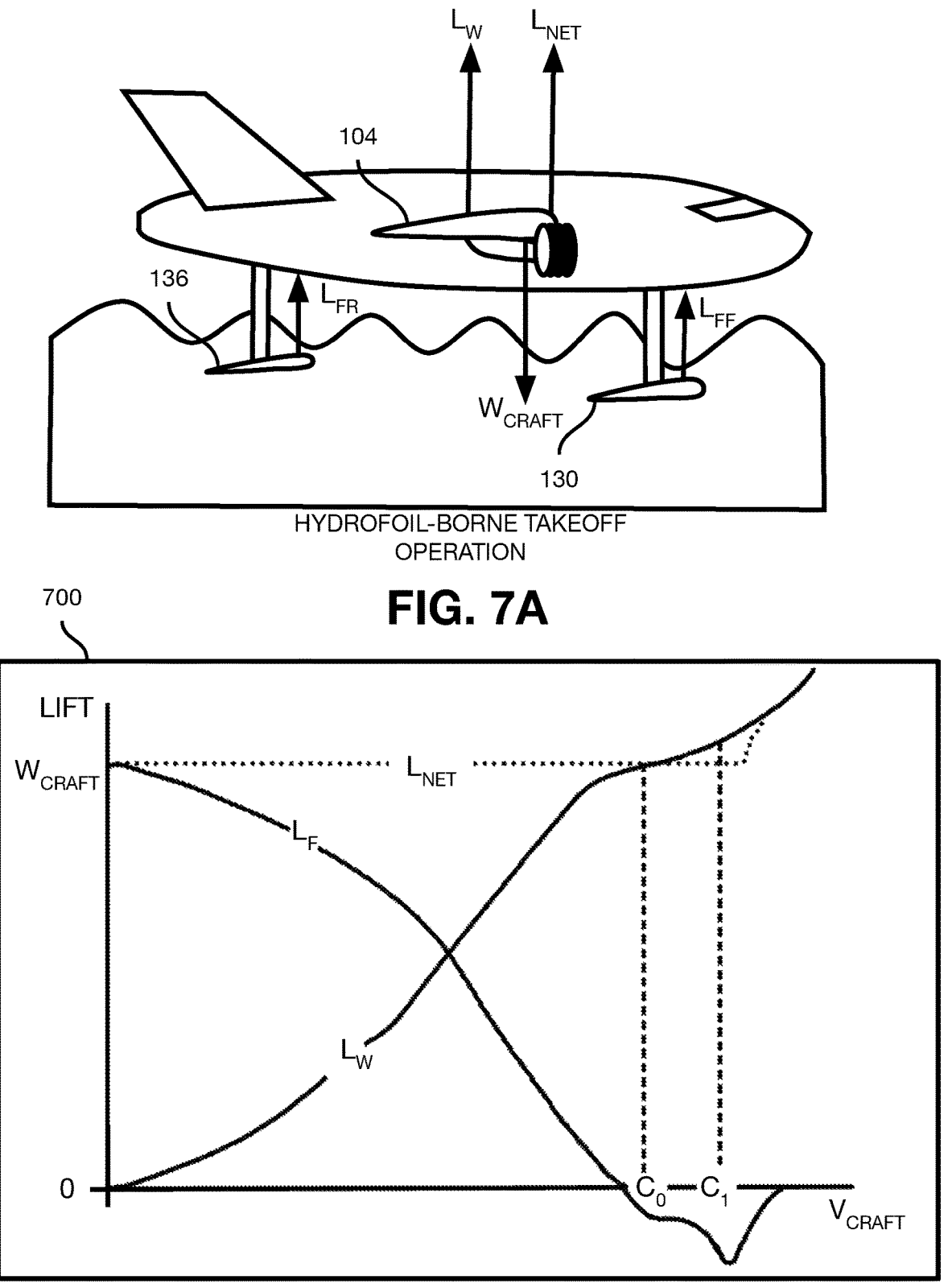
FIG. 7A illustrates a craft in a hydrofoil-borne takeoff mode of operation, in accordance with example embodiments.
FIG. 7B is a graph that illustrates various lift forces acting on a craft, in accordance with example embodiments.

FIG. 7A illustrates an example of the craft 100 when the craft 100 is operating in hydrofoil-borne takeoff mode. During this mode, the craft 100 is configured to, for example, move through open waters and obtain speeds generally between 40-50 mph to facilitate generating the lift required to become wing-borne.

Referring to FIG. 7A, aero lift, $L_W$, generally represents the lift generated by the main wing 104 of the craft 100 but can also include the lift generated by other surfaces such as the tail wing, hull, or propulsive devices such as props, rotors, jets, etc. $L_F$ generally corresponds to the lift generated by one or more hydrofoils 130, 136 of the craft 100, where $L_{FF}$ corresponds to the lift generated by the front foil and the $L_{FR}$ corresponds to the lift generated by the rear foil. $W_{CRAFT}$ corresponds to the force of gravity exerted on the craft 100 and is also referred to as the weight of the craft. During steady state operation, $W_{CRAFT}$ generally corresponds to $L_W+L_{FR}+L_{FF}$ which also corresponds to $L_{NET}$. Throughout the description, the term $L_F$ is generally understood to correspond to $L_{FR}+L_{FF}$.

As previously noted, some experimental craft developed by Applicant that include aero foils were unable to achieve the lift required to sustain flight. In these experimental craft, in an attempt to become airborne, the craft 100 would ramp up to a speed at which point the hydrofoil would breach the surface of the water, as $W_{CRAFT}<L_w+L_F$, and $L_F>0$, resulting in $L_w<W_{CRAFT}$. However, in order to takeoff from the water's surface, the aero lift must be greater than or equal to the weight of the craft, however prior to takeoff, the hydrofoils are still under the water's surface, and up until takeoff, have been generating lift as the aerodynamic lift has been insufficient for takeoff up until this point. If the hydro lift and the aero lift sum to greater than the weight of the craft, the vehicle will accelerate upwards and potentially create a premature takeoff condition (prior to condition $C_0$ in FIG. 7B) as the aero lift, $L_W$, generated by the wings, etc., of the craft 100 would be insufficient to sustain flight, and, as a result, the craft 100 would come back down and breach the water, ultimately preventing takeoff. The techniques disclosed below ameliorate these problems by controlling the hydrofoil lift vector, $L_F$, specifically by generating downward forces of one or more hydrofoils 130, 136 of the craft 100 to keep the hydrofoils 130, 136 submerged until after the upwards aero lift, $L_W$, is sufficient to allow the craft 100 to sustain flight.

In some examples, the lift $L_F$ is in the downward direction, and is introduced via the hydrofoil(s) as $L_W$ increases beyond $W_{CRAFT}$ while the craft 100 is increasing in speed in anticipation of takeoff. This allows the craft 100 to generate a greater overall aero lift, $L_W$, prior to actual takeoff than would otherwise be possible. Then, at the appropriate time (e.g., when $L_W$ reaches some predetermined threshold such as the weight of the craft 100 or some margin thereof), the negative lift, $L_F$, can be "released" from the craft 100, and the craft 100 can, as a result, proceed to become wing-borne.

FIG. 7B is an example of a graph 700 that relates these aspects. The relationships shown in the graph 700 and the ways in which various lift forces, thresholds, etc., are depicted are merely examples and are provided to aid understanding of the various operations and procedures described herein. As shown, the net lift, $L_{NET}$, on the craft 100 initially corresponds to the combination of the aero lift, $L_W$, generated by the wing (e.g., main wing, tail wing, etc.) and the lift, $L_F$, generated by the hydrofoils 130, 136 (e.g., $L_{NET}=L_W+L_F$). On the left side of the graph 700, the speed of the craft 100 is such that $L_{NET}$ is sufficient to allow the craft 100 to operate in hydrofoil-borne maneuvering mode but is insufficient to allow the craft 100 to become wing-borne. Moving to the right of the graph 700 as speed increases, $L_W$ increases with increased craft 100 water speed. To maintain ride height and prevent the hydrofoils 130, 136 from breaching the water surface, $L_F$ is reduced in proportion to an increase in $L_W$. For example, $L_F$ is adjusted with the speed of the craft 100 to maintain $L_{NET}$ at a margin equal to the weight, $W_{CRAFT}$, of the craft 100, or small deviations about equal to control ride height. The overall lift provided by the hydrofoils 130, 136 may decrease at the same rate at which lift from the wing is increased towards zero or even become negative with increased speed. For example, just before the speed of the craft 100 reaches the speed associated with condition $C_0$, $L_F$ may be reduced to zero. The conditions at $C_0$ (e.g., speed of the craft 100, angle of attack of craft 100, deflection angles of control surfaces, angle of incidence of hydrofoils, etc.) may be such that $L_F$ may be zero or close to zero. At $C_0$, the aero lift, $L_W$, generated by the main wing 105 may be expected to be able to transition the craft 100 to a wing-borne mode of operation if the downwards hydrofoil lift, $L_F$, were to be removed as $L_W=W_{CRAFT}$. Accordingly, at some time and/or increased speed after this point (e.g., speed associated with condition $C_1$) where $L_W>W_{CRAFT}$, $L_F$ may be gradually or abruptly removed/released. This, in turn, allows $L_{NET}$ to approximately equal to or greater than $W_{CRAFT}$ which allows the craft 100 to take off and become wing-borne.

While not shown in the graph, in some examples, $L_F$ is not removed/released as described. Rather, as the craft 100 continues to accelerate, the downwards hydrofoil lift, $L_F$, increases to a maximum downwards amount (e.g., a predetermined maximum amount and/or a maximum amount achievable due to the limitations of the control capabilities of the hydrofoil). As the aero lift, $L_W$, generated by the main wing 105 continues to increase past this maximum amount of downwards hydrofoil lift, $L_F$, $L_{NET}$ increases in the upwards direction beyond $W_{CRAFT}$ and the craft 100 is pulled from the water. This, in turn transitions the craft 100 to a wing-borne mode of operation.

FIGS. 8A-8G illustrate examples of ways in which one or more of the hydrofoils 130, 136 of the craft 100 can be articulated to control the lift, $L_F$, generated by the hydrofoils 130, 136. The hydrofoil 130 in the figures represents the main hydrofoil 130. However, the aspects described herein apply to the rear hydrofoil 136 or other hydrofoil configurations that use a different number of hydrofoils. Further, additional/alternative aspects may be capable of further controlling the lift generated by the hydrofoils, and such aspects may be implemented additionally or alternatively to the specific aspects described in connection with FIGS. 8A-8G.

Figures 8A, 8B, 8C, 8D, 8E:
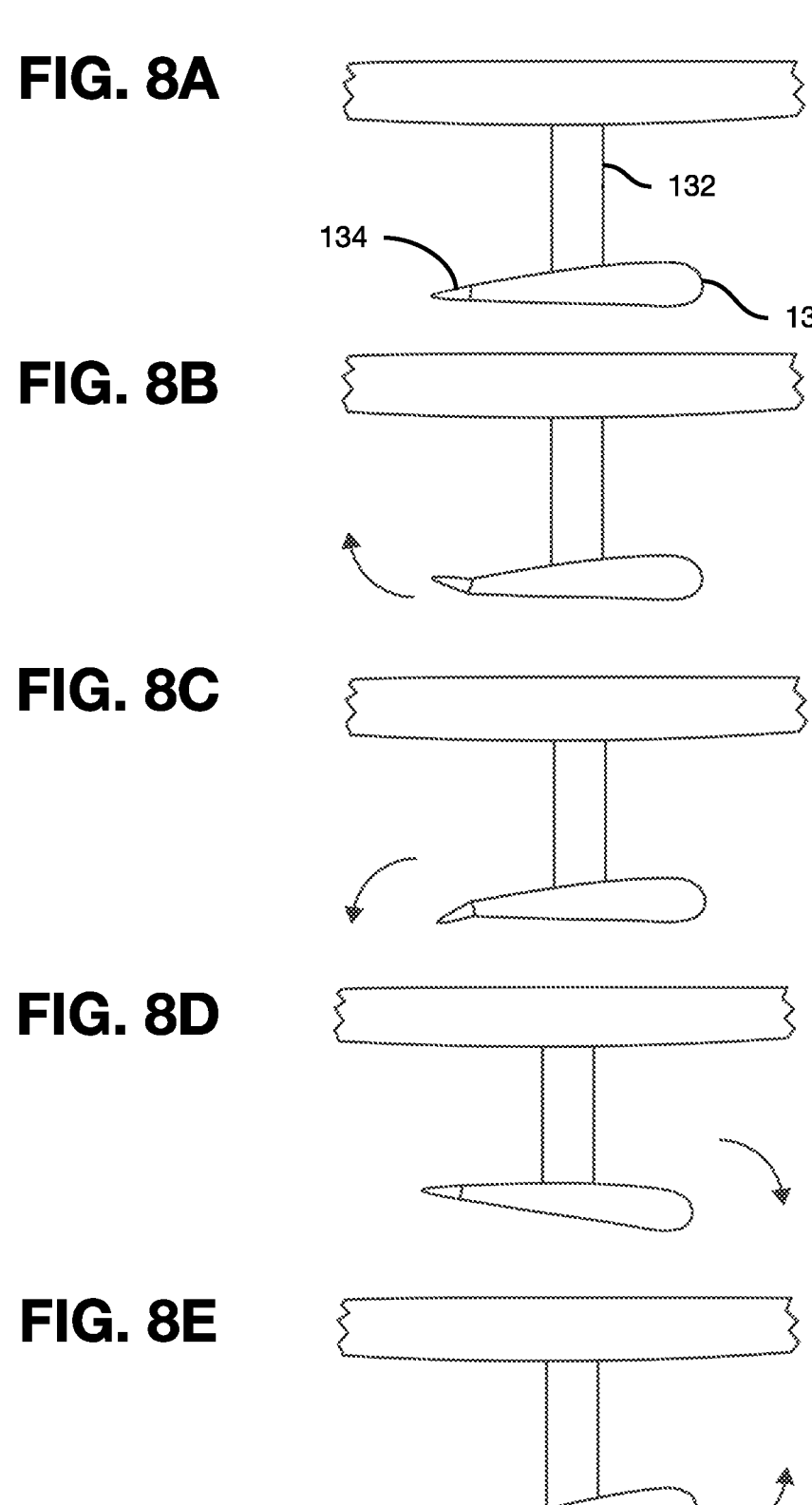
FIGS. 8A-8G illustrate example aspects of articulation of a hydrofoil of a craft, in accordance with example embodiments.

FIGS. 8A-8C illustrate the articulation of one or more control surfaces 134 of the hydrofoil 130 of the craft 100 to control the lift, $L_F$, generated by the hydrofoil 130. As noted above, some examples of the hydrofoils 130, 136 include one or more control surfaces 134, 140 that are hingedly connected to trailing edges of the hydrofoils 130, 136. These control surfaces 134, 140 operate in a similar manner as the flaps 118, ailerons 120, and/or elevators on the main wing 104 of the craft 100 and the elevators 126 on the tail 106 of the craft 100. Some examples of these control surfaces 134, 140 are operated via one or more actuators which are in turn controlled by the control system 500. As the craft 100 accelerates through the water, the control system 500 can adjust/maintain the ride height of the craft 100 (e.g., the height of the craft 100 above the water surface) by adjusting the respective position (e.g., deflection angles) of the control surfaces 134, 140. For example, as shown in FIGS. 8A-8C, a control surface 134 of the main hydrofoils 130 can be rotated from the initial position shown in FIG. 8A to the upward direction shown in FIG. 8B to generate negative lift, $L_F$ (or reduce positive lift, $L_F$). The control surface 134 of the main hydrofoil 130 can be rotated in the downward direction shown in FIG. 8C to generate positive lift, $L_F$ (or reduce negative lift, $L_F$).

FIGS. 8D-8E illustrate the articulation of the angle of incidence of the hydrofoil 130 of the craft 100 to control the lift, $L_F$, generated by the hydrofoil 130. As previously noted, some examples of the craft 100 include one or more actuators for controlling the angle of incidence of the main hydrofoil 130 and/or the rear hydrofoil 136 (i.e., rotating the main hydrofoil 130 and/or the rear hydrofoil 136 around the pitch axis). As shown in FIG. 8D, the angle of incidence of the main hydrofoil 130 can be reduced by rotating the main hydrofoil 130 clockwise from the initial position shown in FIG. 8A (i.e., rotated downward in the direction of travel) to generate negative lift, $L_F$ (or reduce positive lift, $L_F$). As shown in FIG. 8E, the angle of incidence of the main hydrofoil 130 can be increased by rotating the main hydrofoil 130 counterclockwise from the initial position (i.e., rotated upward in the direction of travel) to generate positive lift, $L_F$ (or reduce negative lift, $L_F$).

Figure 8F:
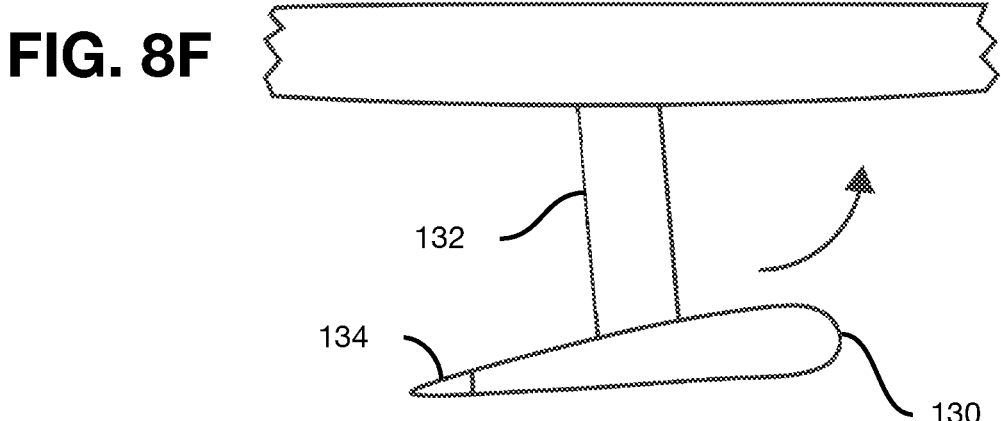
Figure 8G:
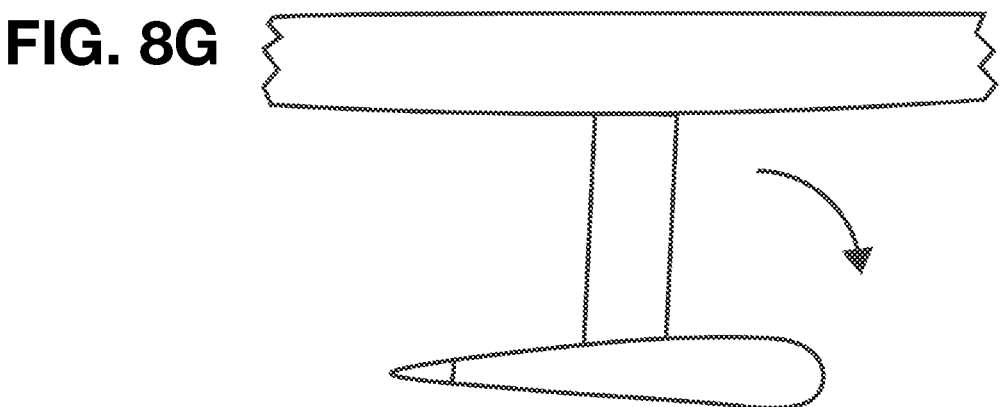

FIGS. 8F-8G illustrate the articulation of the angle of the strut 132 of the hydrofoil 130 of the craft 100 to control the lift, $L_F$, generated by the hydrofoil 130. As previously noted above, some examples of the craft 100 include one or more actuators for controlling the angle of main hydrofoil struts 132 and the rear hydrofoil struts 138 that couple the corresponding main hydrofoil 130 and/or the rear hydrofoil 136 to the hull 102, respectively. As shown in FIGS. 8F and 8G, the angle of incidence of the main hydrofoil 130 can be increased or decreased by rotating the main hydrofoil 130 counterclockwise as shown in FIG. 8F (i.e., rotated upwards in the direction of travel) or clockwise as shown in FIG. 8G (i.e., rotated downwards in the direction of travel) from the initial position shown in FIG. 8A using these actuators to generate positive lift, $L_F$ (or reduce negative lift, $L_F$) or to generate negative lift, $L_F$ (or reduce positive lift, $L_F$), respectively. While the various ways in which the main hydrofoil 130 can be articulated are shown separately in FIGS. 8A-8G, it should be understood that any combination of these articulation procedures can be used to control the lift, $L_F$, generated by the main hydrofoil 130 and/or the rear hydrofoil 136.

Figure 9A:
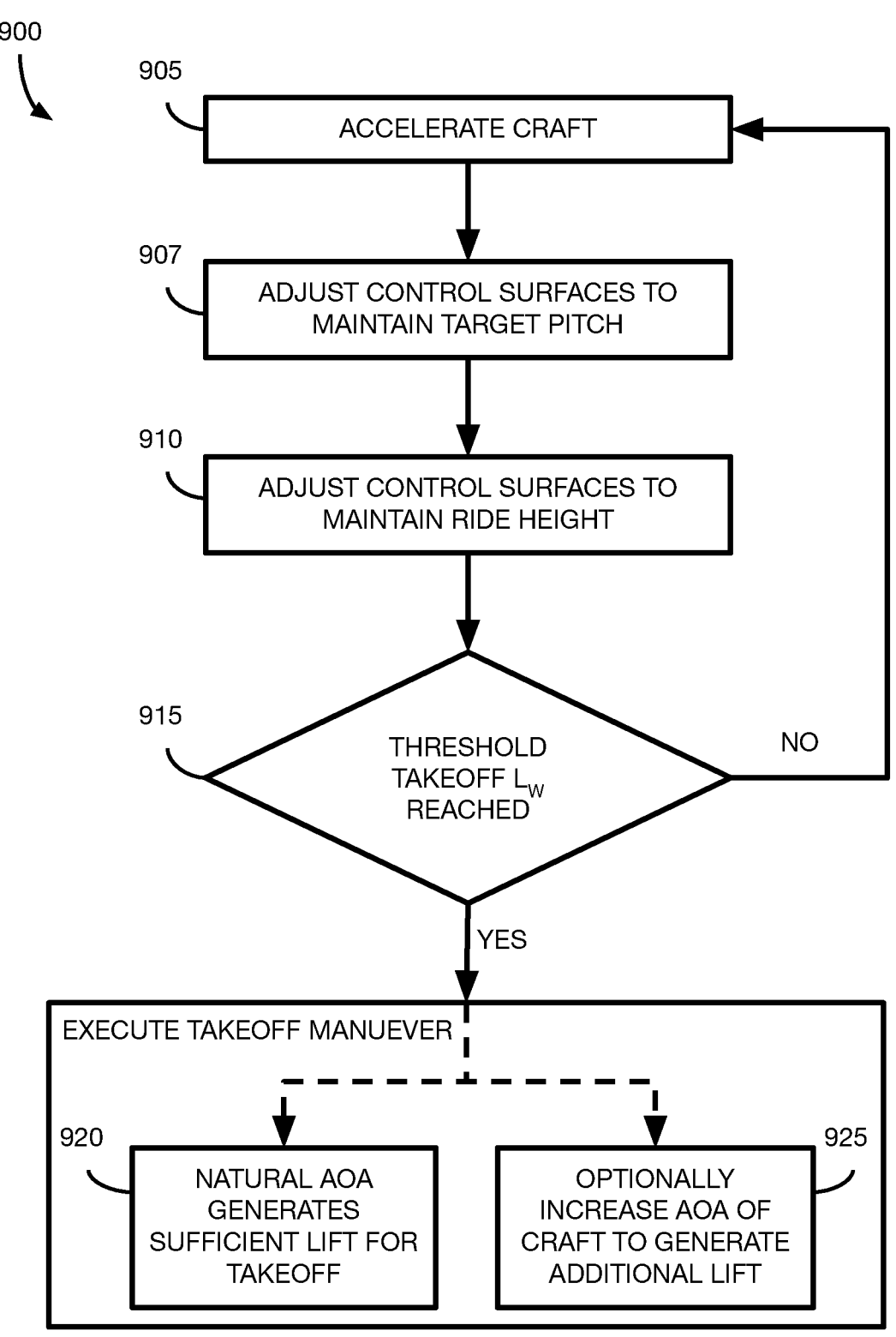
FIG. 9A illustrates example operations that facilitate transitioning a craft to a wing-borne mode of operation, in accordance with example embodiments.

FIGS. 9A and 9B illustrate examples of operations 900, 950 performed by the craft 100 when operating in the hydrofoil-borne takeoff mode. In some examples, the control system 500 of the craft 100 is configured to control various components of the craft 100 to facilitate performance, by the craft 100, of these operations.

The operations 900 in FIG. 9A facilitate transitioning the craft 100 to a wing-borne mode of operation without "holding" the craft 100 in the water. That is, the overall lift, $L_F$, generated by the hydrofoils 130, 136 tends to remain in the upward/positive direction so that the craft is not "held" in the water past the point at which the craft 100 can take off based on the natural amount of lift generated by the wings of the craft 100, which will lift the craft 100 out of the water due to the net upwards force.

Referring to FIG. 9A, the operations at block 905 involve accelerating the craft 100. For instance, the propulsion system 508 of the craft 100 is controlled to begin to accelerate the craft 100 to a sufficient speed to transition to wing-borne operation.

The operations at block 907 involve adjusting one or more control surfaces of the craft 100 to achieve and maintain a target pitch or angle of attack of the craft 100 for takeoff. In an example, the target pitch is between about 0-5 degrees. In some examples, the pitch of the craft 100 is actively monitored and controlled to maintain the pitch at the target pitch while craft 100 accelerates. In some examples, one or more control surfaces of one or more of the main hydrofoil 130, the rear hydrofoil 136, and the main wing 104 are adjusted relative to one another to maintain the pitch of the craft 100 at the target pitch as the craft 100 accelerates. The pitch target for the craft 100 while riding on the main hydrofoil 130 and the rear hydrofoil 136 can be actively adjusted to increase or decrease the angle of attack of the aero wing, and thus, control the aero lift, $L_W$. In some examples, this is accomplished by adjusting the control surfaces on the main hydrofoil 130 and/or the rear hydrofoil 136 to create the same lift $L_F$ at a different operational angle of attack The operations at block 910 involve adjusting one or more control surfaces of the craft 100 to maintain the ride height of the craft 100 while in the hydrofoil-borne mode of operation. For instance, as the craft 100 accelerates through the water, the control system 500 is configured to adjust/maintain the ride height of the craft 100 (e.g., the height of the craft 100 above the water surface) by adjusting the respective position (e.g., deflection angles) of the control surfaces 134, 140 of the main hydrofoil 130 and/or rear hydrofoil 136 and/or the overall angle of attack of the main hydrofoil 130 and/or rear hydrofoil 136, as shown and described above with reference to FIGS. 8A-8G. For example, a control surface 134 of the main hydrofoil 130 can be rotated in the upward direction relative to the direction of travel to decrease the lift, $L_F$, generated by the main hydrofoil 130 and can be rotated in the downward direction relative to the direction of travel to increase the lift, $L_F$, generated by the main hydrofoil 130. Similar operations can be performed by the rear hydrofoil 136.

If at block 915, the aero lift, $L_W$, acting on the craft 100 has not reached a threshold level that is sufficient to allow the craft 100 to become wing-borne and sustain wing-borne flight, the operations repeat from block 905. In some examples, the threshold level corresponds to the weight of the craft 100, $W_{CRAFT}$, or a margin above the weight of the craft 100, $W_{CRAFT}$ (e.g., $W_{CRAFT}$+10% to allow the craft to accelerate upwards away from the water's surface). In some examples, the control system 500 is configured to determine or infer the aero lift, $L_W$, based at least in part on the speed of the craft 100, an angle of attack of the main wing 104, and respective positions of control surfaces (e.g., flaps 118, ailerons 120, elevator, rudder, etc.) of the main wing 104 (and/or the tail wing) of the craft 100, the density of the air etc. In some examples, the control system 500 is configured to determine or infer the aero lift, $L_W$, based at least in part on a sensed load force imparted on one or both of the hydrofoil assemblies 108, 110 (e.g., sensed via one or more load sensors). In some examples, the control system 500 is configured to determine or infer the aero lift, $L_W$, based at least in part on the speed of the craft 100, an angle of attack of the main wing 104, and respective positions of control surfaces (e.g., main foil control surfaces 134) of the main hydrofoil 108 (and/or the rear hydrofoil 110 control surfaces 140) of the craft 100, the density of the water, etc. In some examples, the control system 500 is configured to determine or infer the aero lift, $L_W$, based at least in part on an amount of unlock and/or back-drive current used to drive or maintain the main hydrofoil struts 132 and/or the rear hydrofoil struts 138 in a particular position. For instance, in some examples, an increase in the amount of current to actuators of the main hydrofoil struts 132 and/or the rear hydrofoil struts 138 indicates an increased load imparted on the main hydrofoil struts 132 and/or the rear hydrofoil struts 138. In some examples, the control system 500 computes the aero lift, $L_W$, acting on the craft 100 according to various functions, lookup tables, etc., that relate the aspects to the aero lift, $L_W$.

If the aero lift, $L_W$, acting on the craft 100 has reached the threshold level to become wing-borne and sustain wing-borne flight, then the operations at block 920 are performed. The operations at block 920 involve allowing the craft 100 to naturally take off based on the pitch that was targeted at block 907. That is, the craft 100 can take off without changing the angle of attack/pitch of the craft 100. In some examples, the articulations of the main hydrofoil 130 and/or rear hydrofoil 136 as configured at block 910 to maintain ride height are maintained as the craft 100 takes off. That is, the respective angles of incidence of the main hydrofoil 130 and/or rear hydrofoil 136, deflection angles of the control surfaces 134, 140 of the main hydrofoil 130 and/or rear hydrofoil 136, etc., are not actively or passively adjusted to different positions as the craft 100 takes off from the water.

Alternatively, at block 925, the angle of attack/pitch of the craft 100 can be actively adjusted to generate additional lift. (See block 985 and description thereof.)

The operations 950 in FIG. 9B facilitate transitioning the craft 100 to the wing-borne mode of operation by actively controlling one or more of the main hydrofoil 130 and rear hydrofoil 136 to generate a negative lift, $L_F$, that "holds" the craft 100 within the water until the aero lift, $L_W$, generated by the wings(s) is sufficient for the craft 100 to become wing-borne and sustain wing-borne flight. The operations 950 can be more clearly understood with reference to the graph 700 in FIG. 7B.

Referring to FIG. 9B, the operations performed at blocks 955-960 are generally the same as those operations performed at blocks 905-910 of FIG. 9A. For example, the operations at block 955 involve accelerating the craft 100 towards a takeoff speed (e.g., 45 mph). The operations at block 957 involve adjusting one or more control surfaces of the craft 100 to maintain a target pitch or angle of attack of the craft 100. In an example, the target pitch is between about 0-5 degrees. The operations at block 960 involve maintaining the ride height of the craft 100 during hydrofoil-borne operation while the craft is accelerating during the process of transitioning from hydrofoil-borne operation to wing-borne operation.

The operations at block 965 involve determining whether the aero lift, $L_W$, generated by the main wing 104 (and/or tail wing, hull, etc.) has reached a threshold level that is sufficient to allow the craft 100 to become wing-borne and sustain the wing-borne mode of operation. In some examples, the threshold level corresponds to the weight of the craft 100, $W_{CRAFT}$, or a margin above the weight of the craft 100, $W_{CRAFT}$, (e.g., $W_{CRAFT}$+10% to accommodate passengers and cargo). In some examples, the control system 500 is configured to determine or infer the aero lift, $L_W$, based at least in part on the speed of the craft 100, an angle of attack of the main wing 104, and respective positions of control surfaces (e.g., flaps 118, ailerons 120, elevator, rudder, etc.) of the main wing 104 (and/or the tail wing) of the craft 100, the density of the air etc. In some examples, the control system 500 is configured to determine or infer the aero lift, $L_W$, based at least in part on a sensed load force imparted on one or both of the hydrofoil assemblies 108, 110 (e.g., sensed via one or more load sensors). In some examples, the control system 500 is configured to determine or infer the aero lift, $L_W$, based at least in part on the speed of the craft 100, an angle of attack of the main wing 104, and respective positions of control surfaces (e.g., main foil control surfaces 134) of the main hydrofoil wing 108 (and/or the rear hydrofoil 110 control surfaces 140) of the craft 100, the density of the water, etc. In some examples, the control system 500 is configured to determine or infer the aero lift, $L_W$, based at least in part on an amount of unlock and/or back-drive current used to drive or maintain the main hydrofoil struts 132 and/or the rear hydrofoil struts 138 in a particular position. For instance, in some examples, an increase in the amount of current to actuators of the main hydrofoil struts 132 and/or the rear hydrofoil struts 138 indicates an increased load imparted on the main hydrofoil struts 132 and/or the rear hydrofoil struts 138. In some examples, the control system 500 computes the aero lift, $L_W$, acting on the craft 100 according to various functions, lookup tables, etc., that relate the aspects to the aero lift, $L_W$.

If at block 965, the aero lift, $L_W$, has not reached the threshold level, the operations continue from block 955. The left side of the graph 700 of FIG. 7B (i.e., left of $C_0$) characterizes the state of the various lift forces acting on the craft 100 during the operations performed above. For example, as the craft 100 accelerates, the hydrofoil lift, $L_F$, generated by one or more of the hydrofoils 130, 136 is positive but is controlled to decrease the hydrofoil lift, $L_F$, to counteract increases in the aero lift, $L_W$, generated by the main wing 104. This results in a net lift, $L_{NET}$, that is sufficient to maintain the desired ride height of the craft 100 during hydrofoil-borne operation.

If at block 965, the aero lift, $L_W$, reaches the first threshold level, the operations at block 970 are performed. The operations at block 970 involve generating or increasing the negative lift, $L_F$, generated by one or more of the main hydrofoil 130 and the rear hydrofoil 136 to prevent the craft 100 from becoming wing-borne due to the main wing 104 and other aerodynamic surfaces. For instance, as noted in block 960, as the craft 100 accelerates through the water while hydrofoil-borne, the control system 500 is configured to adjust/maintain the ride height of the craft 100 (e.g., the height of the craft 100 above the water surface) by adjusting control surface deflections of the control surfaces 134, 140 of the main hydrofoil 130 and/or rear hydrofoil 136 and/or the overall angle of attack of the main hydrofoil 130 and/or rear hydrofoil 136, as shown in FIGS. 8A-8G. As the speed of the craft 100 increases and the aero lift, $L_W$, generated by the wing(s) increases beyond the point required to initially achieve wing-borne flight (e.g., the weight of the craft 100, $W_{CRAFT}$), the control system 500 causes one or more of the main hydrofoil 130 and the rear hydrofoil 136 to generate a force in the downward direction to maintain the proper force balance to maintain the desired ride height. At this stage, the deflection of one or more of the control surfaces 134, 140 of the main hydrofoil 130 and/or the rear hydrofoil 136 and/or the overall angle of attack of the main hydrofoil 130 and/or rear hydrofoil 136 are configured to generate an overall negative lift, $L_F$, that "holds" the hydrofoils 130, 136 in the water, thereby forcing the craft 100 to remain hydrofoil-borne despite the wing(s) generating a lift force greater than the weight of the craft, $W_{CRAFT}$, and thus sufficient lift to achieve wing-borne flight.

The portion of the graph 700 of FIG. 7B between $C_0$ and $C_1$ characterizes the state of the various lift forces acting on the craft 100 during the operations performed in block 970. For example, when the speed of the craft 100 reaches the speed greater than condition $C_0$, the aero lift, $L_W$, generated by the main wing 104 equals the weight of the craft, $W_{CRAFT}$. Therefore, the craft 100 should be able to achieve flight. However, the hydrofoil lift, $L_F$, is controlled to generate a negative lift, $L_F$, such that the net lift, $L_{NET}$, acting on the craft 100 keeps the craft 100 in hydrofoil-borne operation. Thus, the craft 100 is "held" in the water by the negative lift, $L_F$ at the desired ride height.

At block 975, if the aero lift, $L_W$, has not reached the second threshold level, the operations continue from block 955. For example, referring to FIG. 7B, if the aero lift, $L_W$, has not reached the lift associated with condition $C_1$, the operations continue from 955. An example of the second threshold level corresponds to the weight of the craft plus some margin (e.g., $W_{CRAFT}$+10% or some other margin).

The aero lift, $L_W$, acting on the craft 100 can be determined or inferred as described above with reference to block 965 and the first threshold level.

In some examples, the determination as to whether the threshold above has been passed is based on whether the speed of the craft is a particular margin higher (e.g., 10% higher or some relative amount higher) than the speed of the craft 100 associated with the first threshold level (e.g., from FIG. 7B, condition $C_1$). In some examples, the determination as to whether the threshold above has been passed is based on the amount of time that has elapsed since the first threshold was passed (e.g., 10 seconds later after the first threshold passed). In some examples, the determination that the second threshold level has been reached is based on an indication from an operator (e.g., the pilot) of the craft 100. That is, the operator can override any other determinations and indicate to the control system 500 whether the second threshold level has or has not been reached.

If at block 975, the aero lift, $L_W$, has reached the second threshold level, final takeoff operations are performed. Some examples of the final takeoff operations include the operations at block 980 and block 985. The operations at block 980 involve decreasing the negative lift, $L_F$, generated by one or more hydrofoils of the craft 100. That is, the "hold" is gradually, passively, or abruptly released. In some examples, this involves actively controlling the deflection angles of one or more of the control surfaces 134, 140 of the main hydrofoil 130 and/or the rear hydrofoil 136 and/or the overall angle of attack of the main hydrofoil 130 and/or rear hydrofoil 136 to gradually decrease the overall negative lift, $L_F$. In some examples, this involves removing all control of the deflection angles of one or more of the control surfaces 134, 140 of the main hydrofoil 130 and/or the rear hydrofoil 136 and/or the overall angle of attack of the main hydrofoil 130 and/or rear hydrofoil 136 to allow these components to passively move to their respective natural states to decrease the overall negative lift, $L_F$. In some embodiments, allowing these hydrofoil components to passively move to their natural states to decrease the overall negative lift includes gradually reducing the power applied to the electric actuators that control the positions of the hydrofoil components.

The portion of the graph 700 of FIG. 7B where to the right of condition $C_1$ characterizes the state of the various lift forces acting on the craft 100 during the operations performed in block 980. For example, when the speed of the craft 100 reaches the speed associated with condition $C_1$, the aero lift, $L_W$, generated by the main wing 104 is more than sufficient to achieve sustained wing-borne flight. As such, the negative lift, $L_F$, generated by one or more of the hydrofoils is gradually (in a controlled manner), naturally/passively, or abruptly (in a controlled manner) reduced to zero such that the net lift, $L_{NET}$, acting on the craft 100 becomes equal to the aero lift, $L_W$, and the craft 100 becomes wing-borne.

Additionally, at block 985, the angle of attack/pitch of the craft 100 can be actively adjusted to generate additional lift. In this regard, in some examples, in addition to (or as an alternative to) gradually, passively, or abruptly releasing the "hold" generated by the one or more hydrofoils of the craft 100, the angle of attack/pitch of the craft 100 can be actively adjusted to generate sufficient lift to overcome the "hold" created by the negative lift, $L_F$, of the hydrofoil to bring the craft 100 airborne. In this regard, in some examples, once the control system 500 determines that the craft 100 has reached the desired takeoff speed or desired main wing lift has been achieved, the control system 500 deploys the flaps 118 (and the ailerons 120 if configured as flaperons), causing the main wing 104 to generate additional lift. In some examples, the control system 500 additionally actuates the rear hydrofoil control surfaces 140 and/or the elevators 126 to pitch the craft 100 upward and increase the angle of attack of the main wing 104 and the hydrofoil assemblies 108, 110. In this configuration, the main wing 104 and hydrofoil assemblies 108, 110 create enough lift to accelerate the craft 100 upwards until the hydrofoil assemblies 108, 110 breach the surface of the water and the entire weight of the craft 100 is supported by the lift of the main wing 104.

In some examples, when performing this transition from hydrofoil-borne operation to wing-borne operation, the control system 500 quickly deploys the flaps 118 (and the ailerons 120 if configured as flaperons) over a very short period of time (e.g., in less than 1 second, less than 0.5 seconds, or less than 0.1 seconds). Quickly deploying the flaps 118 (and ailerons 120) in this manner creates even further additional lift on the main wing 104 that helps "pop" the craft 100 out of the water and into wing-borne operation.

Additionally, in some examples, during the transition from hydrofoil-borne operation to wing-borne operation, the control system 500 actuates various control surfaces of the craft 100 to balance moments along the pitch axis. For instance, the propeller assemblies 116, the flaps 118, and the drag from the hydrofoil assemblies 108, 110 all generate nose-down moments around the center of gravity about the pitch axis during the transition. To counteract these forces, in some examples, the control system 500 deploys the elevator 126, and the rear hydrofoil control surfaces 140 to generate a nose-up moment and stabilize the craft 100.

Alternative examples of the final takeoff operations that do not involve releasing the "hold" described in block 980 are described in block 990.

The operations at block 990 involve maintaining the negative lift, $L_F$, generated by one or more hydrofoils 130, 136 of the craft 100. That is, rather than releasing the "hold" (as described in block 980), the respective articulations of the main hydrofoil 130 and/or the rear hydrofoil 136 (e.g., the deflection angles of the control surfaces 134, 140, the angles of incidence of the main hydrofoil 130 and/or the rear hydrofoil 136, etc.) are maintained. As the craft 100 accelerates, the lift, $L_F$, generated by the hydrofoils 130, 136 reaches a constant/steady downward force that is maintained for the remainder of the takeoff procedure (e.g., the summation of the aero lift, $L_W$, the weight of the craft, $W_{CRAFT}$, and the hydrofoil lift, $L_F$, equal zero). In an example, the "steady" downward hydrofoil lift, $L_F$, is effectively a "maximum" amount of downward hydrofoil lift, $L_F$, that is possible to be applied as a result of the control capabilities of the hydrofoils 130, 136. This conceptually means that the ride height of the craft 100 is maintained up to the point of takeoff. As ride height is maintained and the craft 100 is "held" in the water as speed is increased and aero lift, $L_W$, on the wings is increased, until the ability to apply further maintenance/downward hydrofoil lift, $L_F$, is "saturated."

At this stage, continued acceleration of the craft 100 causes a natural increase (e.g., without further articulation of the main wing control surfaces) in the aero lift, $L_W$, and, therefore, the angle of attack of the craft 100. The gradual increasing of the angle of attack of the craft 100 further contributes to the "saturation" of the downward lift, $L_F$. That is, the downward lift, $L_F$, is reduced as the angle of attack of the craft 100 increases.

In some examples, the angle of attack of the craft 100 is actively adjusted to generate additional lift as described above in block 985. The increase in the angle of attack of the craft 100 causes the craft to rise without further increasing the downwards lift, $L_F$, generated by the hydrofoils 130, 136.

FIG. 11 is a table 1100 that summarizes some examples of the procedures described above and in FIGS. 9A and 9B that facilitate foil-borne takeoff operations and the ways in which different components of the craft 100 can be used in these procedures to facilitate foil-borne takeoff operations. All the procedures generally involve maintaining the ride height of the craft 100 using the control surfaces 134, 140 of one or more of the hydrofoils 130, 136 as the craft 100 accelerates (e.g., FIG. 9A, block 907).

In procedure (A), downwards lift, $L_F$, is not introduced using the control surfaces 134, 140 of the hydrofoils 130, 136 or by adjusting the angle of attack of the hydrofoils 130, 136. In this procedure, the speed of the craft 100 is increased using the aero lift, $L_W$, generated by one or more wings of the craft 100 until the aero lift, $L_W$, is greater than the weight, $W_{CRAFT}$, of the craft 100 (e.g., FIG. 9A, block 905-915). At that point, the craft 100 can "naturally" take off without otherwise increasing the angle of attack and/or pitch of the craft 100 because the aero lift, $L_W$, alone is greater than the weight of the craft (e.g., FIG. 9A, block 920).

In procedure (B), downwards lift, $L_F$, is introduced using one or more control surfaces 134, 140 of one or more hydrofoils 130, 136 of the craft, but the angle of attack of the hydrofoils 130, 136 is fixed (e.g., FIG. 9B, block 960). In this procedure, as the craft 100 accelerates, aero lift, $L_W$, is generated by one or more of the wings. When the aero lift, $L_W$, exceeds the weight, $W_{CRAFT}$, of the craft 100, the control surfaces 134, 140 of the hydrofoils 130, 136 are adjusted to introduce a downwards lift, $L_F$, or "extended hold" that holds the hydrofoils 130, 136 in the water (e.g., FIG. 9B, blocks 970-975). In some examples, when the perceived aero lift, $L_W$, generated by the wings reaches a desired threshold (e.g., above "natural" takeoff lift by some margin), the hold on the hydrofoils 130, 136 is "released" by adjusting the control surfaces 134, 140 of the hydrofoils 130, 136 to reduce the downward lift, $L_F$, and takeoff is permitted to proceed (e.g., FIG. 9B, block 980). In some examples, the downwards lift, $L_F$, is not released and instead, as the craft 100 continues to accelerate, the downwards lift, $L_F$, increases to a maximum downwards amount (e.g., a predetermined amount and/or a maximum amount achievable due to the limitations of the control capabilities of the hydrofoils 130, 136). As the aero lift, $L_W$, generated by the wings continues to increase and overcomes this maximum amount of downwards lift, $L_F$, the craft 100 takes off from the water (e.g., FIG. 9B, block 990).

Procedure (C) is similar to procedure (B), except that the pitch of the craft 100 is increased during takeoff to generate additional upwards lift (e.g., FIG. 9B, block 985).

In procedure (D), downwards lift, $L_F$, is introduced using one or more of the control surfaces 134, 140 of one or more of the hydrofoils 130, 136 and by adjusting the angle of attack of one or more of the hydrofoils 130, 136 (e.g., FIG. 9B, block 960). In this procedure, as the craft accelerates, aero lift, $L_W$, is generated by the wings. When the aero lift, $L_W$, exceeds the weight, $W_{CRAFT}$, of the craft 100, one or more of the control surfaces 134, 140 and the angles of attack of one or more of the hydrofoils 130, 136 are adjusted to introduce a downwards lift, $L_F$, that holds the hydrofoils 134, 140 in the water (e.g., FIG. 9B, blocks 970-975). In some examples, the perceived aero lift, $L_W$, generated by the wings reaches a desired threshold (e.g., above "natural" takeoff lift by some margin), the hold on the hydrofoils 130, 136 is passively "released" by allowing the control surfaces

134, 140 of the hydrofoils 130, 136 and the angles of attack of the hydrofoils 130, 136 to passively return to their respective natural positions (e.g., FIG. 9B, block 980). This, in turn, reduces the downward lift, $L_F$, and takeoff is permitted to proceed. The procedure may further involve increasing the pitch of the craft 100 afterward to generate additional upwards lift (e.g., FIG. 9B, block 985). In some examples, the downwards lift, $L_F$, is not released and instead, as the craft 100 continues to accelerate, the downwards lift, $L_F$, increases to a maximum downwards amount (e.g., a predetermined amount and/or a maximum amount achievable due to the limitations of the control capabilities of the hydrofoils 130, 136). As the aero lift, $L_W$, generated by the wings continues to increase and overcomes this maximum amount of downwards lift, $L_F$, the craft 100 takes off from the water (e.g., FIG. 9B, block 990).

Procedure (E) is similar to procedure (D) except that when the perceived aero lift, $L_W$, generated by the wings reaches a desired threshold (e.g., above "natural" takeoff lift by some margin), the hold on the hydrofoils 130, 136 is actively "released" in a controlled manner by controlling the control surfaces 134, 140 of the hydrofoils 130, 136 and the angles of attack of the hydrofoils 130, 136 to gradually or abruptly return to their respective natural positions (e.g., FIG. 9B, block 980, such as zero deflection).

In some of the procedures above, the downwards lift, $L_F$, that "holds" the craft 100 in the water is released when the aero lift, $L_W$, reaches a particular takeoff threshold. In some other examples, the articulation of the hydrofoils 130, 136 (e.g., the control surfaces 134, 140, respective angles of incidence, etc.) may not be released. In these examples, the amount of downward hydrofoil lift, $L_F$, that can be generated by the hydrofoils 130, 136 eventually saturates (e.g., reaches a maximum amount).

In some examples, continued acceleration of the craft 100 causes a natural increase (e.g., without further articulation of the main wing control surfaces) in aero lift, $L_W$, and, therefore, the angle of attack of the craft 100. The gradual increasing of the angle of attack of the craft 100 contributes to further "saturation" of the downward hydrofoil lift, $L_F$, as the craft takes off from the water. In some examples, the angle of attack of the craft 100 is actively adjusted to generate additional aero lift, $L_W$.

In some examples, when $L_W$ is greater than the weight, $W_{CRAFT}$, of the craft 100, the downward hydrofoil lift, $L_F$, is released by initiating ventilation of one or more of the hydrofoils 130, 136 which creates a loss of downward lift, $L_F$, allowing the craft 100 to take off.

D. Wing-Borne Operation

Figure 10:
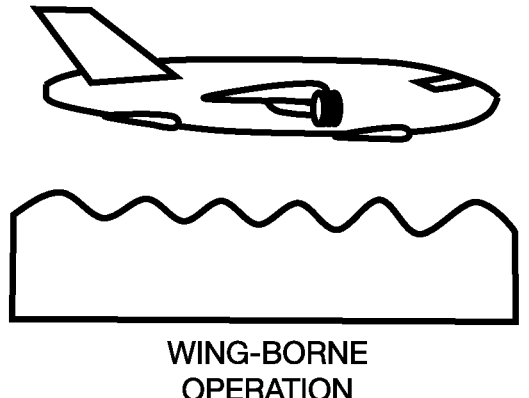
FIG. 10 illustrates a craft in a wing-borne mode of operation, in accordance with example embodiments.

FIG. 10 illustrates an example of the craft 100 after becoming wing borne. In some examples, once the transition from hydrofoil-borne operation to wing-borne operation is complete, the control system 500 causes the main hydrofoil deployment system 300 and the rear hydrofoil deployment system 400 to respectively retract the main hydrofoil assembly 108 and the rear hydrofoil assembly 110. In some examples, the control system 500 initiates this retraction as soon as the hydrofoil assemblies 108, 110 are clear of the water to reduce the chance of the hydrofoil assemblies 108, 110 reentering the water. The control system 500 may determine that the hydrofoil assemblies 108, 110 are clear of the water in various ways. For instance, in an example, the control system 500 makes such a determination based on a measured altitude of the craft 100 (e.g., based on data provided by the radar system 516, the lidar system 518, and/or the other sensors 522 described above for measuring an altitude of the craft 100). In another example, the sensors

522 may further include one or more conductivity sensors, temperature sensors, pressure sensors, strain gauge sensors, or load cell sensors arranged on the hydrofoil assemblies 108, 110, and the control system 500 may determine that the hydrofoil assemblies 108, 110 are clear of the water-based on data from these sensors.

Once the craft 100 is clear of the water, the control system 500 continues to accelerate the craft 100 to the desired cruise speed by controlling the speed of the propeller systems 116. In some examples, the control system 500 retracts the flap systems when the craft 100 has achieved sufficient airspeed to generate enough lift to sustain altitude without them and actuates various control surfaces of the craft 100 and/or applies differential thrust to the propeller systems 116 to perform any desired maneuvers, such as turning, climbing, or descending, and to provide efficient lift distribution. While in wing-borne mode, the craft 100 can fly both low over the water's surface in ground-effect or above ground-effect depending on operational conditions and considerations.

E. Return to Hull-Borne Operation

To facilitate transitioning from wing-borne to hull-borne mode of operation (See FIG. 6A), the control system 500 determines that the hydrofoil assemblies 108, 110 are fully retracted so that the craft 100 may safely land on its hull 102. In some examples, the control system 500 additionally determines and suggests the desired landing direction and/or location-based on observed, estimated, or expected water surface conditions (e.g., based on data from the radar system 516, the lidar system 518, the imaging system 520, or other sensors 522).

The control system 500 initiates deceleration of the craft 100, for instance, by reducing the speeds of the propeller systems 116 until the craft 100 reaches a desired landing airspeed. During the deceleration, the control system 500 may deploy the flaps 118 to increase lift at low airspeeds and/or to reduce the stall speed. Once the craft 100 reaches the desired landing airspeed (e.g., approximately 50 knots), the control system 500 reduces the descent rate (e.g., to be less than approximately 200 ft/min). As the craft 100 approaches the surface of the water (e.g., once the control system 500 determines that the craft 100 is within 5 feet of the water surface), the control system 500 further slows the descent rate to cushion the landing (e.g., to be less than approximately 50 ft/min). As the hull 102 of the craft 100 impacts the surface of the water, the control system 500 reduces thrust, and the craft 100 rapidly decelerates due to the presence of hydrodynamic drag, the reduction in forward thrust, and the reduction or elimination of blowing air over the wing which significantly reduces lift causing the vehicle to settle into the water. The hull 102 settles into the water as the speed is further reduced until the craft 100 is stationary.

In some examples, after the craft 100 is settled in the water, the craft 100 is transitioned back to hydrofoil-borne maneuvering mode (See FIG. 6B) by extending the hydrofoil assemblies 108, 110 to transition from hull-borne operation to hydrofoil-borne operation in the same manner as described above. In some examples, the control system 500 then sustains the hydrofoil-borne mode at the fifth stage and maneuvers the craft 100 into port while keeping the hull 102 insulated from surface waves. The control system 500 then reduces the thrust generated by the propeller assemblies 116 to lower the speed of the craft 100 until the hull 102 settles into the water, thereby transitioning that craft back to hull-borne operation at the sixth stage. The control system 500 then retracts the hydrofoil assemblies 108, 110 and performs the hull-borne operations described above to maneuver the craft 100 into a dock for disembarking passengers or goods and recharging the battery system 200.

IV. Examples of Operations

FIG. 12 illustrates examples of operations 1200 that facilitate operating a craft 100 according to some embodiments, including operating the craft 100 to facilitate transitioning from hydrofoil-borne to wing-borne modes. In some embodiments, a control system of the craft (e.g., control system 500) performs one or more of the functions shown in FIG. 12.

The operations at block 1205 involve determining upwards aero lift (FIG. 7A, $L_W$), generated by one or more wings 104 of the craft 100 as the craft 100 accelerates over the water while the craft 100 is in hydrofoil-borne operation. (See also FIG. 9B, block 965 and description thereof).

The operations at block 1210 involve adjusting, based on the determined upwards aero lift, $L_W$, downwards hydrofoil lift (FIG. 7A, $L_F$) generated by one or more hydrofoils 130, 136 of the craft 100 to maintain the one or more hydrofoils 130, 136 at least partially submerged in the water, thereby causing the craft 100 to remain in a hydrofoil-borne maneuvering mode of operation (FIG. 6B) despite upwards aero lift, $L_W$, generated by the wing(s) 104 that would otherwise cause the hydrofoil(s) 130, 136 to breach the surface of the water and the craft 100 to become wing-borne. (See also FIG. 9B, block 970; FIG. 11, procedures B-E; and description thereof).

The operations at block 1115 involve, after determining that the upwards aero lift, $L_W$, generated by the wing(s) 104 is sufficient to allow the craft 100 to sustain flight, decreasing the amount of downwards hydrofoil lift, $L_F$, generated by the hydrofoil(s) 130, 136 to allow the hydrofoil(s) 130, 136 to exit the water. (See also FIG. 9B, block 975; FIG. 11, procedures B-E; and description thereof).

In some examples, adjusting the downwards hydrofoil lift, $L_F$, generated by the hydrofoil(s) 130, 136 involves adjusting the downwards hydrofoil lift, $L_F$, generated by the hydrofoil(s) 130, 136 to both (i) allow the hull of the craft 100 to lift above the water as the craft 100 accelerates and (ii) maintain the hydrofoil(s) 130, 136 at least partially submerged in the water, thereby causing the craft 100 to remain in the hydrofoil-borne maneuvering mode of operation. (See also FIG. 9B, block 960; FIG. 11, procedures B-E; and description thereof).

In some examples, adjusting the downwards hydrofoil lift, $L_F$, generated by the hydrofoil(s) 130, 136 involves increasing the downwards hydrofoil lift, $L_F$, generated by the hydrofoil(s) 130, 136 in proportion to an increase in the upwards aero lift, $L_W$, generated by the wing(s) 104. (See also FIG. 9B, block 970; FIG. 11, procedures B-E; and description thereof).

In some examples, adjusting the downwards hydrofoil lift, $L_F$, generated by the hydrofoil(s) 130, 136 involves increasing the downwards hydrofoil lift, $L_F$, generated by the hydrofoil(s) 130, 136 to maintain a ride height of the craft 100.

In some examples, determining the upwards aero lift, $L_W$, generated by the wing(s) 104 involves determining a speed of the craft 100 and determining the upwards aero lift, $L_W$, generated by the wing(s) 104 based at least in part on the determined speed of the craft 100. (See also FIG. 9B, blocks 965 and 975; FIG. 11, procedures B-E; and description thereof).

In some examples, determining the upwards aero lift, $L_W$, generated by the wing(s) 104 involves determining an angle of attack of the wing(s) 104 and determining the upwards aero lift, $L_W$, generated by the wing(s) based at least in part on an angle of attack of the wing(s) 104. (See also FIG. 9B, blocks 965 and 975 and description thereof).

In some examples, determining the upwards aero lift, $L_W$, generated by the wing(s) 104 involves determining the angle of attack of one or more hydrofoils 130, 136, respective defections of one or more control surfaces 134, 140 of the one or more hydrofoils 130, 136, a water speed of the craft 100, and a density of water in which the craft 100 is moving.

In some examples, determining the upwards aero lift, $L_W$, generated by the wing(s) 104 involves determining a sensed load force on the hydrofoil(s) 130, 136 and determining the upwards aero lift, $L_W$, generated by the wing(s) 104 based at least in part on a sensed load force on the hydrofoil(s) 130, 136. (See also FIG. 9B, blocks 965 and 975 and description thereof).

In some examples, one or more of the hydrofoils 130, 136 comprise one or more flaperons and/or ailerons and/or elevators. In some of these examples, adjusting the downwards hydrofoil lift, $L_F$, generated by the hydrofoil(s) 130, 136 involves adjusting the respective deflections of the one or more flaperons and/or ailerons and/or elevators to thereby control the downwards hydrofoil lift, $L_F$, generated by the hydrofoil(s) 130, 136. (See also FIG. 9B, block 970; FIG. 11, procedures B-E; and description thereof).

In some examples, one or more of the hydrofoils 130, 136 are moveable. Some of these examples involve extending the hydrofoil(s) 130, 136 below the hull of the craft 100 for submersion in the water and at least partially retracting the hydrofoil(s) 130, 136 into the hull of the craft 100 after the craft is wing-borne. (See FIG. 10 and description thereof).

In some examples, respective angles of incidences of the one or more of the hydrofoils 130, 136 are adjustable. (See FIGS. 8D-8G and description thereof).

In some examples, adjusting the downwards hydrofoil lift, $L_F$, generated by the hydrofoil(s) 130, 136 involves adjusting an angle at which the hydrofoil(s) 130, 136 extends below the hull to thereby control the downwards hydrofoil lift, $L_F$, generated by the hydrofoil(s) 130, 136. (See also FIG. 9B, block 970; FIG. 11, procedures D-E; and description thereof).

While the systems and methods of operation have been described with reference to certain examples, it will be understood by those skilled in the art that various changes can be made, and equivalents can be substituted without departing from the scope of the claims. Therefore, it is intended that the present methods and systems not be limited to the particular examples disclosed, but that the disclosed methods and systems include all embodiments falling within the scope of the appended claims.

What is claimed is:

1. A craft comprising:
a hull;
a wing attached to the hull;
a hydrofoil attached to the hull;
at least one processor; and
tangible, non-transitory computer-readable media that comprises program instructions executable by the at least one processor to cause the craft to:
as the craft accelerates while the hydrofoil is at least partially submerged in water, maintain the hydrofoil at least partially submerged in the water, wherein maintaining the hydrofoil at least partially submerged in the water comprises causing a first adjustment of at least one control surface of the hydrofoil so as to maintain the hydrofoil at least partially submerged in the water;

while the hydrofoil is at least partially submerged in the water, determine that at least one takeoff condition is met; and
after determining that the at least one takeoff condition is met, cause the hydrofoil to exit the water and the craft to become wing-borne, wherein causing the hydrofoil to exit the water and the craft to become wing-borne comprises causing a second adjustment of the at least one control surface of the hydrofoil so as to allow the hydrofoil to exit the water and the craft to become wing-borne.

2. The craft of claim 1, wherein causing the first adjustment of the at least one control surface of the hydrofoil so as to maintain the hydrofoil at least partially submerged in the water comprises causing the first adjustment of the at least one control surface of the hydrofoil so as to adjust ride height of the craft to a given predetermined ride height.

3. The craft of claim 1, wherein causing the first adjustment of the at least one control surface of the hydrofoil so as to maintain the hydrofoil at least partially submerged in the water comprises causing the first adjustment of the at least one control surface of the hydrofoil so as to adjust an angle of attack of the craft to a given predetermined angle of attack.

4. The craft of claim 1, wherein causing the first adjustment of the at least one control surface of the hydrofoil so as to maintain the hydrofoil at least partially submerged in the water comprises causing the first adjustment of the at least one control surface of the hydrofoil so as to increase an amount of negative lift generated by the hydrofoil.

5. The craft of claim 1, wherein determining that the at least one takeoff condition is met comprises determining that the at least one takeoff condition is met based on one or more of: a weight of the craft, a speed of the craft, an angle of attack of the craft, a position of a control surface of the wing of the craft, and an air density measurement.

6. The craft of claim 1, wherein determining that the at least one takeoff condition is met comprises determining that the at least one takeoff condition is met based on at least a speed of the craft.

7. The craft of claim 1, wherein determining that the at least one takeoff condition is met comprises determining that the at least one takeoff condition is met based on at least a load force imparted on the craft.

8. The craft of claim 1, wherein determining that the at least one takeoff condition is met comprises determining that the at least one takeoff condition is met based on at least computing an estimated aero lift acting on the craft.

9. The craft of claim 1, wherein causing the second adjustment of the at least one control surface of the hydrofoil so as to allow the hydrofoil to exit the water and the craft to become wing-borne comprises causing the second adjustment of the at least one control surface of the hydrofoil so as to increase an angle of attack of the craft.

10. The craft of claim 1, further comprising program instructions executable by the at least one processor to cause the craft to:
after determining that the at least one takeoff condition is met, causing an adjustment to at least one control surface of the wing so as to increase a deflection angle of the at least one control surface of the wing.

11. The craft of claim 1, wherein causing the second adjustment of the at least one control surface of the hydrofoil so as to allow the hydrofoil to exit the water and the craft to become wing-borne comprises causing the second adjustment of the at least one control surface of the hydrofoil so as to decrease an amount of negative lift generated by the hydrofoil.

12. The craft of claim 1, wherein causing the second adjustment of the at least one control surface of the hydrofoil so as to allow the hydrofoil to exit the water and the craft to become wing-borne comprises causing the second adjustment of the at least one control surface of the hydrofoil so as to decrease a deflection angle of the at least one control surface.

13. The craft of claim 1, wherein causing the hydrofoil to exit the water and the craft to become wing-borne comprises causing the craft to further accelerate.

14. The craft of claim 1, further comprising program instructions executable by the at least one processor to cause the craft to:

after the craft becomes wing-borne, cause the hydrofoil to retract.

15. The craft of claim 14, further comprising program instructions executable by the at least one processor to cause the craft to:

after causing the hydrofoil to retract and while the hydrofoil is retracted, cause the craft to land such that the craft becomes hull-borne; and after the craft becomes hull-borne, (i) control a velocity of the craft and (ii) cause the hydrofoil to extend such that the craft becomes hydrofoil-borne.

16. The craft of claim 1, further comprising program instructions executable by the at least one processor to cause the craft to:

after the craft becomes wing-borne, determine a suggested location for landing the craft on the water.

17. A control system for a craft comprising a hydrofoil and a wing, wherein the control system comprises:

at least one processor; and tangible, non-transitory computer-readable media that comprises program instructions executable by the at least one processor to cause the craft to:

as the craft accelerates while the hydrofoil is at least partially submerged in water, maintain the hydrofoil at least partially submerged in the water, wherein maintaining the hydrofoil at least partially submerged in the water comprises causing a first adjustment of at least one control surface of the hydrofoil so as to maintain the hydrofoil at least partially submerged in the water;

while the hydrofoil is at least partially submerged in the water, determine that at least one takeoff condition is met; and after determining that the at least one takeoff condition is met, cause the hydrofoil to exit the water and the craft to become wing-borne, wherein causing the hydrofoil to exit the water and the craft to become wing-borne comprises causing a second adjustment of the at least one control surface of the hydrofoil so as to allow the hydrofoil to exit the water and the craft to become wing-borne.

18. Tangible, non-transitory computer-readable media comprising program instructions, wherein the program instructions, when executed by one or more processors cause a control system to perform functions for controlling a craft comprising a hydrofoil and a wing, wherein the functions comprise:

as the craft accelerates while the hydrofoil is at least partially submerged in water, maintain the hydrofoil at least partially submerged in the water, wherein maintaining the hydrofoil at least partially submerged in the water comprises causing a first adjustment of at least one control surface of the hydrofoil so as to maintain the hydrofoil at least partially submerged in the water;

while the hydrofoil is at least partially submerged in the water, determine that at least one takeoff condition is met; and after determining that the at least one takeoff condition is met, cause the hydrofoil to exit the water and the craft to become wing-borne, wherein causing the hydrofoil to exit the water and the craft to become wing-borne comprises causing a second adjustment of the at least one control surface of the hydrofoil so as to allow the hydrofoil to exit the water and the craft to become wing-borne.

19. A craft comprising:

a hull;

a wing attached to the hull;

a hydrofoil attached to the hull;

at least one processor; and tangible, non-transitory computer-readable media that comprises program instructions executable by the at least one processor to cause the craft to:

as the craft accelerates while the hydrofoil is at least partially submerged in water, maintain the hydrofoil at least partially submerged in the water;

while the hydrofoil is at least partially submerged in the water, determine that at least one takeoff condition is met;

after determining that the at least one takeoff condition is met, cause the hydrofoil to exit the water and the craft to become wing-borne;

after the craft becomes wing-borne, cause the hydrofoil to retract;

after causing the hydrofoil to retract and while the hydrofoil is retracted, cause the craft to land such that the craft becomes hull-borne; and after the craft becomes hull-borne, (i) control a velocity of the craft and (ii) cause the hydrofoil to extend such that the craft becomes hydrofoil-borne.

20. The craft of claim 19, wherein maintaining the hydrofoil at least partially submerged in the water comprises causing a first adjustment of at least one control surface of the hydrofoil so as to maintain the hydrofoil at least partially submerged in the water, and wherein causing the hydrofoil to exit the water and the craft to become wing-borne comprises causing a second adjustment of the at least one control surface of the hydrofoil so as to allow the hydrofoil to exit the water and the craft to become wing-borne.

21. The craft of claim 19, wherein determining that the at least one takeoff condition is met comprises determining that the at least one takeoff condition is met based on at least computing an estimated aero lift acting on the craft.

\* \* \* \* \*